United States Patent
Nagato et al.

[11] Patent Number: 6,123,415
[45] Date of Patent: Sep. 26, 2000

[54] INK JET RECORDING APPARATUS

[75] Inventors: Hitoshi Nagato, Kunitachi; Teruo Murakami; Shuzo Hirahara, both of Yokohama; Hideyuki Nakao; Koichi Ishii, both of Kawasaki; Yasuo Hosaka, Shinjuku-Ku, all of Japan

[73] Assignee: Kabushiki Kaisha Toshiba, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/774,072

[22] Filed: Dec. 23, 1996

[30] Foreign Application Priority Data

| Dec. 21, 1995 | [JP] | Japan | 7-333326 |
| Jan. 24, 1996 | [JP] | Japan | 8-010186 |
| Jan. 30, 1996 | [JP] | Japan | 8-014142 |
| Sep. 13, 1996 | [JP] | Japan | 8-243001 |

[51] Int. Cl.$^7$ .................................................. B41J 2/06
[52] U.S. Cl. ........................................... 347/55; 347/10
[58] Field of Search .......................... 347/55, 112, 141, 347/147, 151; 399/271, 290, 292, 293, 294, 295, 254, 260

[56] References Cited

U.S. PATENT DOCUMENTS

| 5,619,234 | 4/1997 | Nagato et al. | 347/55 |
| 5,835,113 | 11/1998 | Hirahara et al. | 347/55 |
| 5,835,114 | 11/1998 | Nagato et al. | 347/55 |

FOREIGN PATENT DOCUMENTS

| 703 080 A2 | 3/1996 | European Pat. Off. | 347/55 |
| WO 93/11866 | 6/1993 | WIPO . | |

*Primary Examiner*—John Barlow
*Assistant Examiner*—C. Dickens
*Attorney, Agent, or Firm*—Oblon, Spivak, McClelland, Maier & Neustadt, P.C.

[57] ABSTRACT

In the ink jet recording apparatus for recording an image by supplying ink obtained by dispersing color material components in a solvent to a head substrate and by jetting ink drops containing at least the color material components to a recording medium on the basis of electrostatic force applied to the color material components, the recording apparatus comprises a driving circuit (107) for applying voltages to electrodes of an electrode array (102) arranged on a head substrate (101), in such a way that a first potential difference whose potential level relationship is reversed at a predetermined period between the two adjacent electrodes can be applied when the color material components are cohered and/or stirred on the head substrate, and a second potential difference different from the first potential difference between the two adjacent electrodes can be applied when the ink drops are jetted toward a recording medium. In this ink jet recording apparatus, a stable recording can be made by uniformalizing the density of the ink color material components on the head substrate and further by preventing the color material components from adhering onto the electrode.

12 Claims, 38 Drawing Sheets

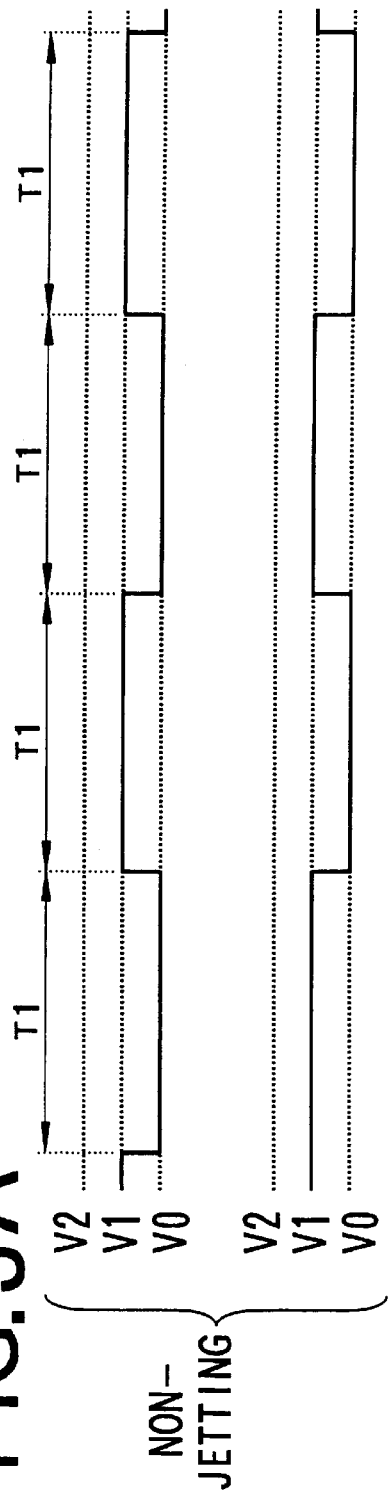
FIG.3A NON-JETTING
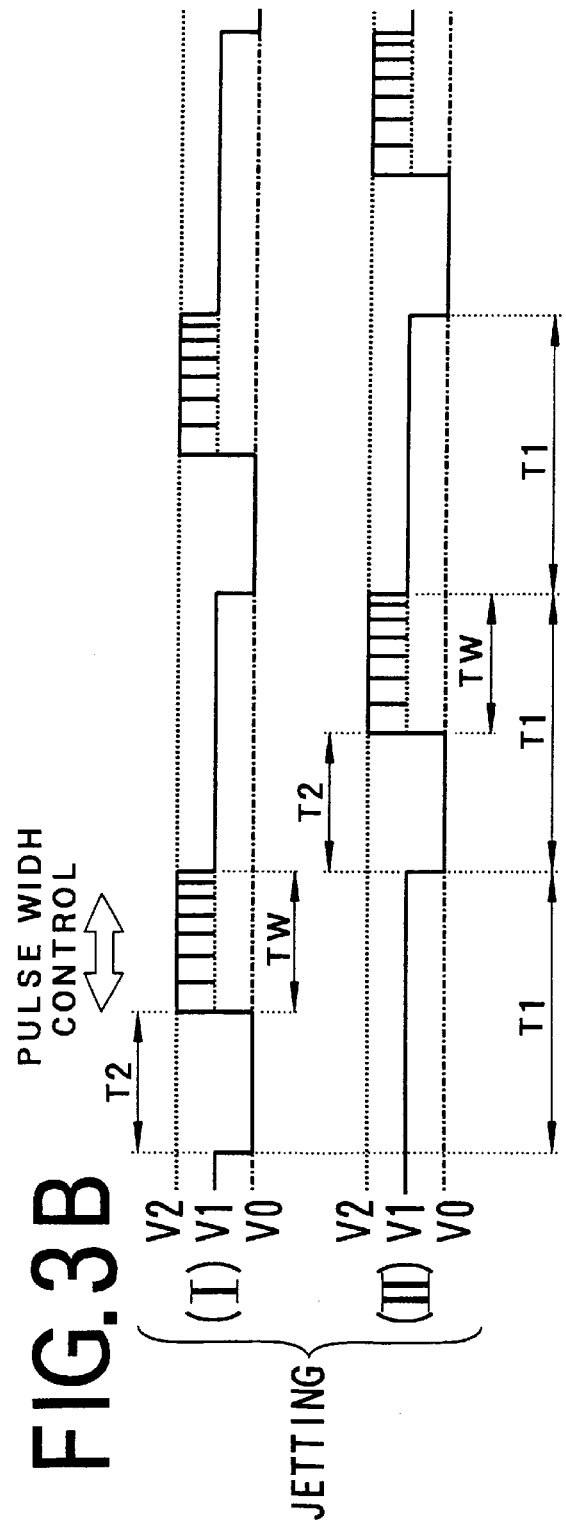
FIG.3B JETTING

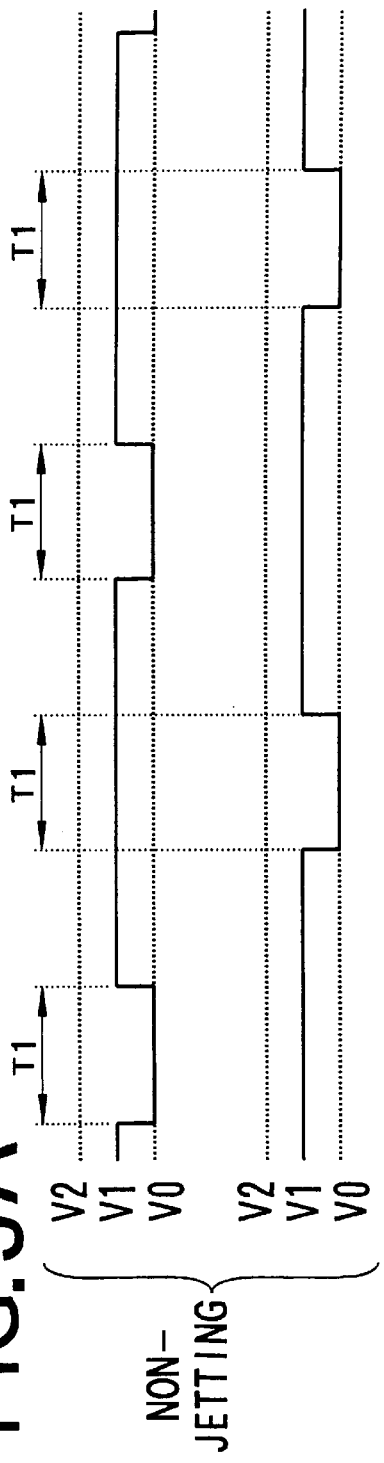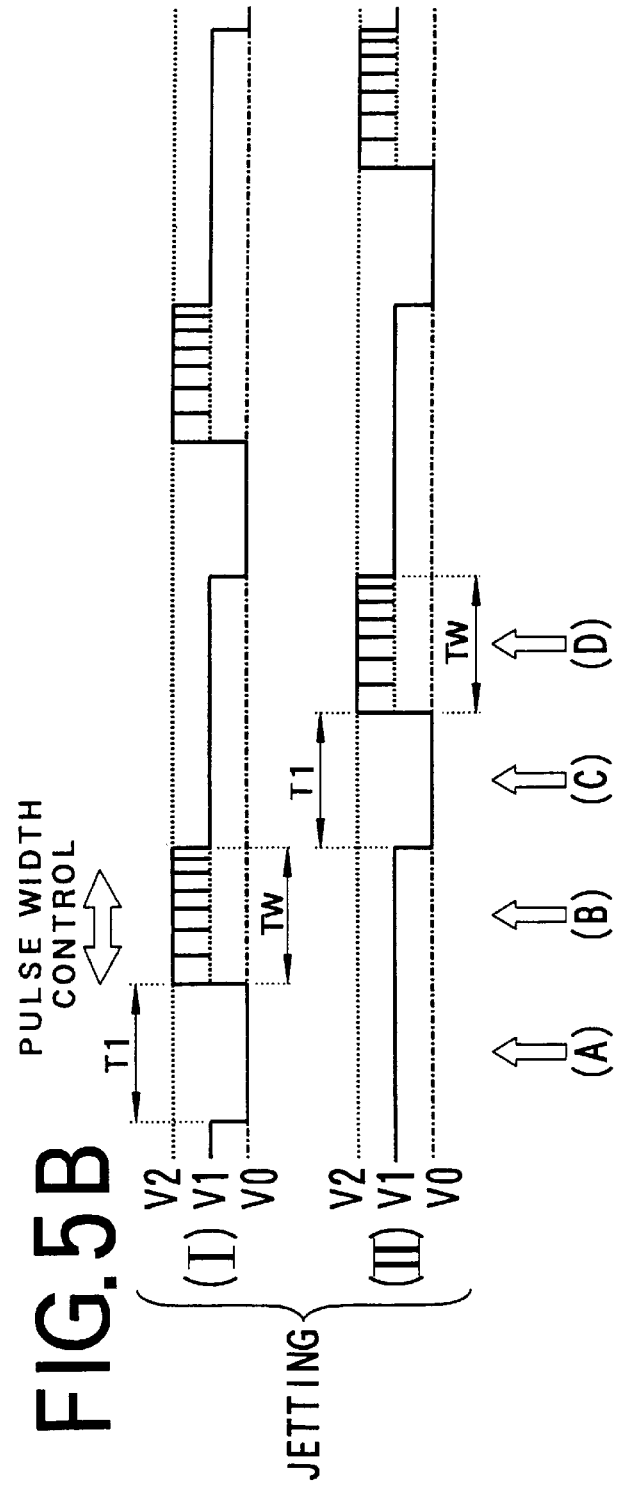

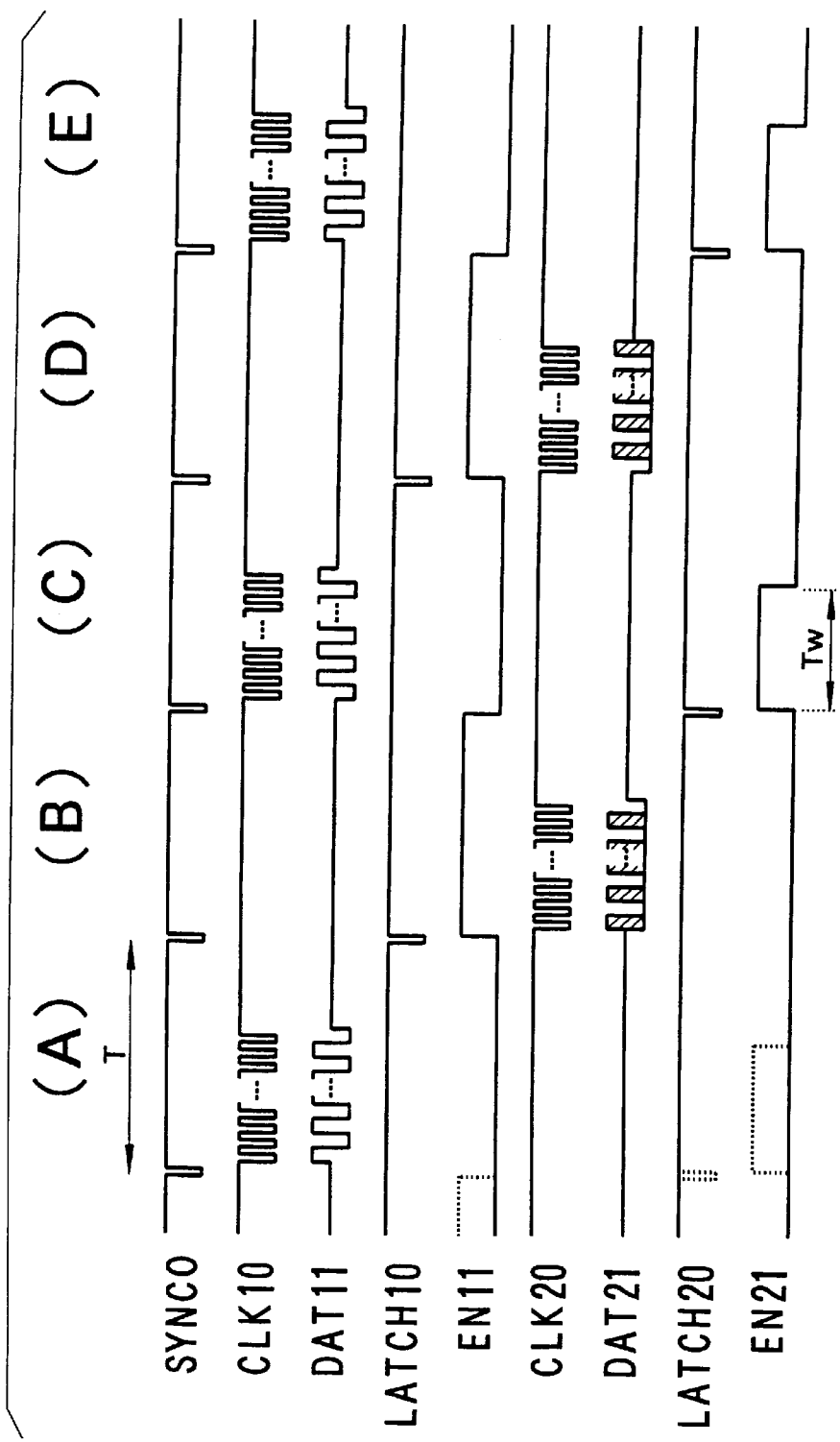

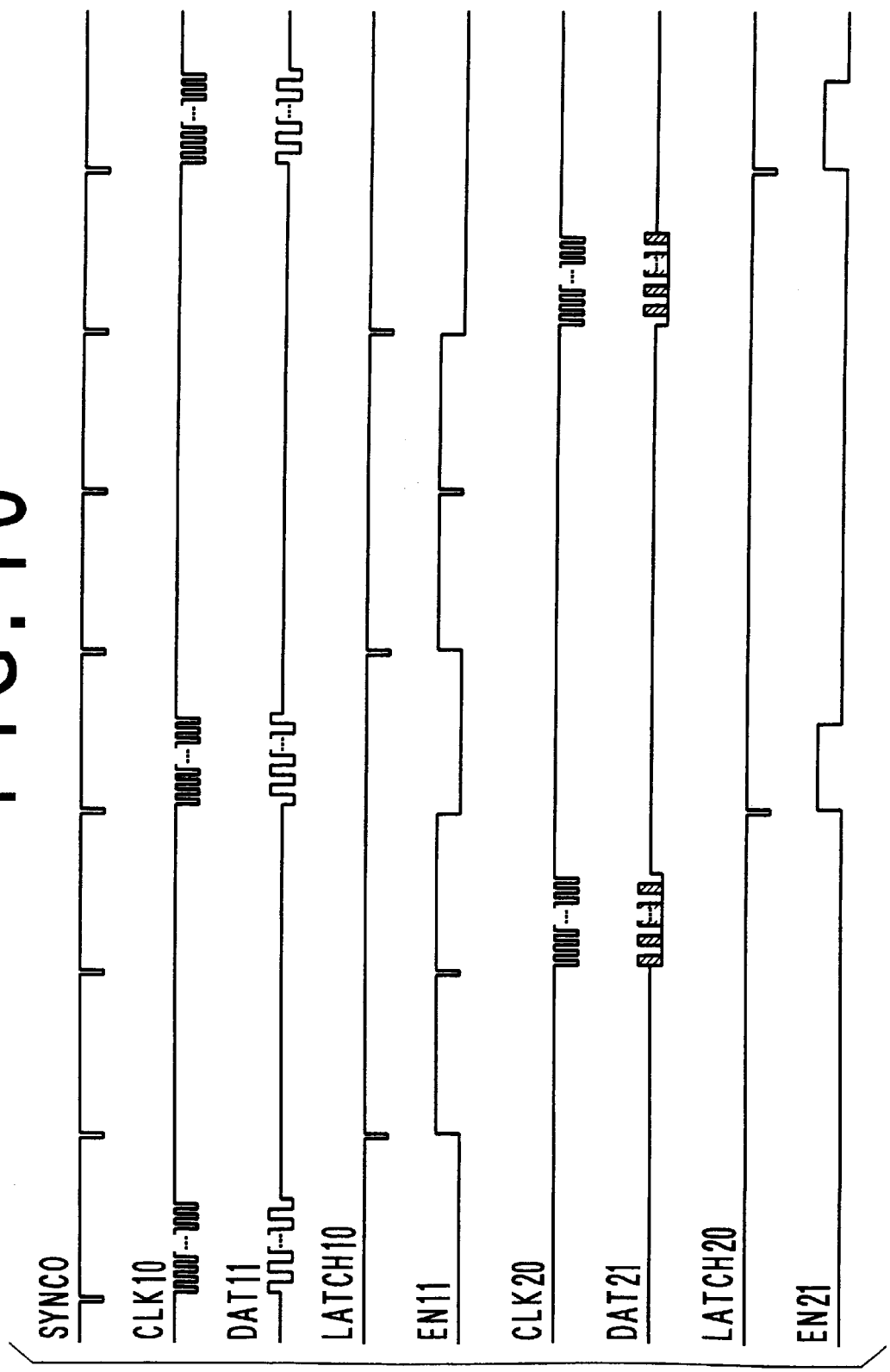

INK JET RECORDING APPARATUS

BACKGROUND OF THE INVENTION

1. Field of the Invention

The present invention relates to an ink jet recording apparatus, and more specifically to an ink jet recording apparatus for recording dots on a recording medium by jetting a liquid ink obtained by dispersing color material components in a solvent, as ink drops.

2. Description of the Prior Art

Conventionally, an ink jet type printer for forming recorded dots by jetting a liquid ink onto a recording medium has been well known. In the ink jet recording apparatus of this type, since there exists such advantages that noise is low, as compared with the other recording method and further since the development and fixing are both not required, this recording apparatus has been noticed, in particular as a recording technique for recording dots on plain paper.

At present, a number of ink jet recording methods have been so far proposed. For instance, Japanese Published Examined (Koho) Patent Application Nos. 56-9429 and 61-59911 disclose a method of jetting ink drops by pressure obtained by heat generated by a heating element. On the other hand, Japanese Published Examined (Koho) Patent Application No. 53-12138 discloses a method of jetting ink drops on the basis of a mechanical pressure pulse generated by a piezoelectric crystal element.

In particular, the former technique is a typical example of a multi-nozzle type recording apparatus for recording a plurality of dots by arranging a plurality of nozzle in parallel to each other. Further, as the recording head used for these techniques, a serial scanning type head mainly mounted on a carriage and repeating the scanning operation in a direction perpendicular to a moving direction of recording paper is put to a practical use.

On the other hand, in such a type that a multi-nozzle is arranged on a long recording head having a length the same as the width of recording paper, instead of mounting the recording head on the carriage, although the moving parts can be reduced and thereby the recording speed can be increased, it is not easy to manufacture a line-scanning type recording head as described above, in practice.

In other words, in the multi-nozzle type, there exist such a problem in that ink is easily enriched locally due to evaporation or volatilization of the solvent. Therefore, when independent slender nozzles are arranged to obtain a high resolution required for recording, these slender nozzles tend to be clogged. In particular, in the case of the type using steam pressure, there exists a problem in that insoluble substance is easily adhered onto the nozzle due to thermal or chemical reaction of the ink. On the other hand, in the type using a piezoelectric crystal element, since the ink flow paths are rather complicated, these ink flow paths are easily clogged.

In the case of the recording head of serial scanning type which requires several tens to one hundred and several tens of nozzles, however, owing to the advance of the recent technique. it is not difficult to suppress the frequent nozzle clogging. In the case of the line scanning type structure in which several thousands of nozzles are arranged, on the other hand, since the probability of nozzle clogging is still high, there exists a problem in that the reliability is low.

On the other hand, in the case of the ink jet type, another problem arises in that it is very difficult to increase the resolution. In more detail, in the case where stream pressure is used, it is very difficult to form an ink drop whose diameter is less than 20 $\mu$m. Here, since the ink drop having a diameter of 20 $\mu$m is recorded as a recorded dot having a diameter of about 50 $\mu$m, it impossible to increase the resolution more than this value in practice. Further, in the case where a piezoelectric crystal element is used, since the structure is rather complicated, there exists another problem in that it is difficult to manufacture a recording head of high resolution due to the restriction of manufacturing technique.

To overcome the above-mentioned various problems, a method of jetting ink or color material components contained in the ink, from an ink liquid surface, by use of an electrostatic force obtained by applying a voltage to a thin film electrode array has been proposed. For instance, Japanese Published Unexamined Patent Application Nos. 49-62024 and 56-4467 disclose a method of jetting ink by use of electrostatic force. Further, Japanese Published Unexamined Patent Application No. 7-502218 discloses a method of jetting ink containing charged color material components, in order to increase the density of the color material.

In these methods, since a slit-shaped nozzle or a nozzle-less structure can be adopted, without need of an independent nozzle for each dot or ink flow path partitions, the nozzle clogging (which is a serious problem caused when the recording dots are arranged in a straight line) can be prevented and restored effectively. In particular, in the method of using the ink containing charged color material components and jetting the ink containing a high density color material, ink particles having very small diameters can be formed and jetted stably, this method is suitable for high resolution recording apparatus.

(1A) Further, in the above-mentioned prior art ink jet recording apparatus for jetting ink drops by use of electrostatic force, the ink drops can be jetted when a pulse voltage varying according to image signals are applied to the electrode array. Here, the case where ink drops are jetted from the electrodes by applying the pulse voltages to only the alternately arranged electrodes of the electrode array will be considered. This corresponds to the case where vertical stripes are recorded along the sub-scanning direction. In this case, since an electric field can be generated from an electrode to which the pulse voltage is applied to the adjacent electrode to which no pulse voltage is applied, the color material components are moved by the electric field generated between the two adjacent electrodes from the voltage-applied electrode to the non-voltage-applied electrode. Therefore, when this status continues, since the density of the color material components of the ink becomes non-uniform on the respective electrodes, this causes a non-uniformity in the density of the recorded image. That is, since the quantity of the charged color material components moved by the electrostatic force lacks on the respective electrodes, the ink jet operation becomes unstable, so that the density of the recorded image is not only non-uniformalized but also the ink drops cannot be jetted at the worst.

(1B) Further, when the above-mentioned status continues for a long time, since the color material components are deposited onto the electrodes to which no pulse voltages are applied and thereby the viscosity of the ink is increased, electric charges are moved between the color material components and the electrodes, so that the electric charges of the color material components are lost. Under these conditions, since the color material components on the electrode to which no pulse voltage is applied cannot be moved by the electric force, the color material components adhere onto the electrode. As described above, the color material components adhered onto the electrodes causes a change in the electric field distribution or obstructs the movement of the other color material components, with the result that a continuous ink supply is not obtained.

(1C) Further, in the prior art ink jet recording apparatus for jetting color material components as ink drops by electrostatic force, in order to jet the ink drops stably, it is necessary to form an ink thin layer at the ink drop jetting position stably, and further to supply ink drops containing sufficient color material components at the ink jetting position. In the prior art ink jet recording apparatus, however, since the construction is such that the ink drop jetting position is determined in the ink flow path and the ink reaching this ink jetting position can be jetted onto the recording medium by the electrostatic force, the thickness of the ink layer is easily changed due to a slight change of the ink supply pressure or the influence of the atmospheric pressure, with the result that there exists a problem in that the ink drops cannot be jetted stably and thereby the recording of a stable ink density cannot be obtained.

(1D) Further, in the prior art ink jet recording apparatus for jetting color material components as ink drops by the electric field, in order to maintain the continuity of the ink drop jetting, since auxiliary electrodes are provided in addition to recording electrodes in order to control the inflow or outflow of the color material components from an ink holding portion, when the density of the color material increases within the ink holding portion, the color material is easily adhered onto the ink holding portion. As a result, there exists a problem in that the color material components cannot be supplied smoothly. On the other hand, after power of the recording apparatus has been turned off, since such a probability that the color material components adhere onto the ink holding portion is relatively high, there arises a problem in that the ink supply capability is not sufficient whenever the ink supply has been restarted.

SUMMARY OF THE INVENTION (2A) With these problems in mind, therefore, it is a first object of the present invention to provide an ink jet recording apparatus for jetting cohered color material components contained in ink onto a recording medium by electrostatic force, which can uniformalize the density of the color material components on each of the electrodes arranged on a head substrate and further can prevent the color material components from adhering onto the electrodes to stabilize the recording operation.

(2B) Further, a second object of the present invention is to provide an ink jet recording apparatus for jetting cohered color material components contained in ink onto a recording medium by electrostatic force, which can prevent the charged color material components from being scattered from the ink drop jetting position to obtain a stable recording without causing the density non-uniformity.

(2C) Further, a third object of the present invention is to provide an ink jet recording apparatus for jetting cohered color material components contained in ink onto a recording medium by electrostatic force, which can realize a stable density recording without causing nozzle clogging on the basis of a stable electrostatic force.

(2D) Further, a fourth object of the present invention is to provide an ink jet recording apparatus for jetting cohered color material components contained in ink onto a recording medium by electrostatic force, which can prevent the color material components from adhering to the ink holding portion or onto an insulating substance in the vicinity of the electrodes and further can supply the ink under excellent conditions by optimizing the ink condition whenever the apparatus power is turned on again, even after the power has been turned off and further kept unused for many hours.

(3A) To achieve the first object, in the ink jet recording apparatus according to the present invention, for supplying ink containing color material components dispersed in a solvent onto a head substrate and by jetting an ink drop containing at least the color material components toward a recording medium on the basis of an electrostatic force applied to the color material components of the ink, the recording apparatus comprises the voltage applying means for applying voltages to a plurality of electrodes arranged on the head substrate to stir the color material components contained in the ink supplied to the head substrate. In more detail, when at least first and second electrodes are arranged on the head substrate, the voltage applying means applies voltages to the first and second electrodes in such a way that a potential difference whose potential level relationship is reversed at a predetermined period between the first and second electrodes can be applied. Further, when the ink drop is not jetted, the voltage applying means applies the voltages to the first and second electrodes in such a way that a first potential difference whose potential level relationship is reversed at a predetermined period between the first and second electrodes can be applied; and when the ink drop is jetted, a second potential difference different from the first potential difference can be applied between both electrodes.

When the potential difference whose potential level relationship is reversed at a predetermined period is applied to the first and second adjacent electrodes on the head substrate, since the charged color material components contained in the ink supplied to the head substrate are moved reciprocatingly between the two electrodes, the ink can be stirred. Owing to this ink stirring function, the density of the color material components can be uniformalized at each electrode, so that the color material components can be prevented from adhering onto the electrodes.

Further, the present invention can be applied to the line-scanning type ink jet recording head provided with an electrode array obtained by arranging a plurality of electrodes on the head substrate. In this case, the voltage applying means applies voltages to the electrode array in such a way that a potential difference whose potential level relationship is reversed at a predetermined period can be generated between two adjacent electrodes. Further, when the ink drops are not jetted, the voltage applying means applies voltages to the electrode array selectively in such a way that a first potential difference whose potential level relationship is reversed at a predetermined period can be generated between the two adjacent electrodes; and when the ink drops are jetted, a second potential difference different from the first potential difference can be generated between the two adjacent electrodes.

Further, the voltage applying means is characterized by both the first and second modes. In the first mode, the voltage applying means applies voltages to the electrode array in such a way that the potential difference whose potential level relationship is reversed at a predetermined period can be applied between the two adjacent electrodes of the electrode array. In the second mode other than the first mode, the voltage applying means applies voltages to the electrode array in such a way that a potential difference large enough to jet the ink drops toward the recording medium can be applied between the two adjacent electrodes of the electrode array. In other words, the voltage applying means provides the first mode in which the voltages are applied to the electrode array to stir and cohere the color material components contained in the ink at the electrodes from which the ink drops are to be jetted (ink-jetting electrodes or a first half electrode group), and the second mode in which the voltages are applied to the electrode array to jet the ink containing the color material components cohered at the electrodes from which the ink drops are to be jetted (ink-jetting electrodes) toward the recording medium.

In more practical way, the voltage applying means is constructed so as to selectively apply at least three sorts of voltages of $V0<V1<V2$ to the respective electrodes. When these voltages are applied to the ink-jetting electrodes and the non ink-jetting electrodes (a second half electrode group) arranged adjacent to the ink-jetting electrodes, two steps of stirring and cohering the color material components at the ink-jetting electrodes and of jetting the cohered color material components toward the recording medium separately with respect to time. For instance, the ink-jetting electrodes (first half electrode group) and the non ink-jetting electrodes (second half electrode group) are arranged alternately in the electrode array. After the color material components have been cohered once at the first half electrode group, the ink drops are jetted therefrom. Successively, after the color material components have been cohered at the remaining second half electrode group, the ink drops are jetted therefrom in the same way. The above ink jetting operation is repeated separately and alternately.

In the case where the color material components are charged on the plus side, in the coherence process of the color material components, the first lowest voltage $V0$ is applied to the ink-jetting electrodes, and the second voltage $V1$ higher than $V0$ are applied to the non ink-jetting electrodes arranged on both sides of the ink-jetting electrodes, so that the color material components are cohered on the ink-jetting electrodes (the first mode). On the other hand, in jetting process of the cohered color material components, the third voltage $V2$ high enough to jet the ink drops is applied to the ink-jetting electrodes, and the second voltage $V1$ lower than $V2$ is applied to the non ink-jetting electrodes arranged on both sides of the ink-jetting electrodes. Therefore, the ink whose color material components have been cohered on the ink-jetting electrodes can be jetted (the second mode). In this case, since the voltage $V1$ is applied to the non ink-jetting electrodes arranged on both sides of the ink-jetting electrodes, it is possible to prevent the ink from being scattered from the ink-jetting electrodes. After the ink has been jetted, the second voltage $V1$ is applied to the ink-jetting electrodes, and the first voltage $V0$ is applied to the non ink-jetting electrodes adjacent to the ink-jetting electrodes to cohere the color material components on the adjacent electrodes, and the ink whose color material components have been cohered on the electrodes is jetted as the ink drops, respectively.

When the charged color material components are kept placed in a strong electric field for many hours, since the charged color material components are moved between the electrodes, the charges of the color material components are lost, with the result that the color material components cannot be moved by the electric force and thereby adhered onto the electrodes. In the present invention, however, since the voltage is applied to the electrodes in such a way that the first ink-jetting electrodes for cohering the color material components are changed alternately, it is possible to prevent the color material components from adhering at the electrodes, with the result that an excellent recording can be achieved stably for many hours.

(3B) To achieve the second object, in the ink jet recording apparatus according to the present invention, for recording an image by jetting ink drops containing at least color material components dispersed in ink and charged to a predetermined polarity in a solvent on the basis of electrostatic force, the basic features thereof are as follows: a plurality of electrodes are arranged at positions where the ink is to be supplied, and voltage applying means is provided for applying voltages to a plurality of the electrodes in such a way that a potential difference between the first electrodes the nearest to the ink-jet position and the recording paper becomes lower than the potential difference between the second electrodes adjacent to the first electrodes and the recording paper according to image signals. Here, a plurality of the electrodes are formed on the head substrate to which the ink is supplied or the electrodes of coaxial type.

In general, when a high voltage is applied to an electrode to jet an ink drop, since a strong electric field is generated in the direction toward the adjacent electrodes, the charged color material components supplied to the vicinity of the electrode from which the ink to be jetted tends to be moved and further scattered by electrophoresis in the direction toward the adjacent electrode (because work for overcome ink surface tension is not required in this direction).

In contrast with this, in the present invention, since the first potential difference between the first electrode the nearest to the position at which the ink drop is to be jetted and the recording medium is set to a potential difference large enough to jet the ink drop and further since the first potential difference is set lower than the second potential difference between the second electrode adjacent to the first electrode and the recording medium, the charged color material components supplied in the vicinity of the first electrode are jetted as an ink drop under such condition as to be surrounded by the electric field generated by the voltage applied to the second electrode. Therefore, the color material components supplied to the first electrode can be prevented from being scattered owing to the surrounding effect of this electric field upon the color material components, so that a sufficient amount of the color material components can be supplied to the position at which the ink is jetted at a high density. With the result that it is possible to record an image without causing any non-uniformity of color density and at a sufficient high density.

The recording apparatus according to the present invention can be applied to the ink jet recording head having a set of the first and second electrodes and the line-scanning type ink jet recording head having a plurality of electrodes arranged on the head substrate to which the ink is supplied. In the later case, the voltage applying means is provided for applying voltages to the electrode array in such a way that the first potential difference between the first electrodes the nearest to the positions at which the ink is jetted according to the image signals and the recording medium becomes lower than the second potential difference between the second electrodes adjacent to the first electrodes and the recording medium. Further, the voltage applying means preferably switches the voltage application operation to the first and second electrodes at a predetermined period alternately.

The second electrodes are not a part of the electrode array provided on the head substrate, or the plate-shaped common electrodes provided roughly in parallel to the head substrate so as to face the electrode array. In this case, the voltage applying means applies the voltages to the electrode array and the common electrodes in such a way that the first potential difference between the first electrodes the nearest to the position at which the ink drops are jetted according to the image signals and the recording medium becomes lower than the second potential difference between the common electrodes and the recording medium.

Further, the voltage applying means for applying the voltages to the electrode array can be constructed in such a way that the first potential difference becomes a potential difference low enough not to jet the ink drops, during the period other than the time during which the ink drops are required to be jetted. Further, it is also possible to apply the voltages to the electrode array in such a way that the first potential difference is first set to the value low enough not to jet the ink drop and then shifted to the value large enough to jet the ink drop.

(3C) To achieve the third object, in the ink jet recording apparatus according to the present invention, for recording an image by jetting the ink having the color material components dispersed in a solvent contained in the ink toward the recording medium on the basis of electrostatic force, the ink circulating system for circulating the ink is mounted on the head substrate having the array electrodes for applying an electrostatic force to the color material components in the ink; the slit-shaped nozzle branched from the ink circulating system is formed on the head substrate; and the ink drops are jetted toward the recording medium through the slit-shaped nozzle. Therefore, it is possible to stabilize the jetting of the ink drops.

In practice, the ink jet apparatus according to the present invention comprises a head substrate having the stripe-shaped array electrodes arranged in a predetermined direction to apply electrostatic force to the color material components of the ink; ink circulating means for circulating the ink to the ink supply position located behind the ink drop jetting position on the head substrate; and the nozzle forming surface for forming the slit-shaped nozzle extending in the array electrode arrangement direction between the ink supply position on the head substrate and the ink drop jetting position.

Further, in one embodiment thereof, the head substrate is provided in such a way that the end thereof is arranged so as to be opposed to the recording medium, and the ink circulating means is so constructed as to circulate the ink to the position located behind the end of the head substrate. Further, the nozzle forming surface is provided behind the end of the head substrate so as to be opposed to the head substrate, and the slit-shaped nozzle is formed so as to extend in the arrangement direction of the array electrodes between the head substrate and the nozzle forming surface of the head block.

In the ink jet recording apparatus according to the present invention, the ink supplied to the ink supply position on the head substrate by the ink circulating system is moved to the ink drop jetting position through the slit-shaped nozzle on the basis of capillary action, and then jetted by the electrostatic force toward the recording paper. Therefore, the nozzles are not clogged as with the case where the individual nozzles are arranged. Further, since the slit-shaped nozzle forms the ink circulating system as an independent ink path after having been branched from the ink supply position of the ink circulating system, it is possible to form a thin ink layer having a stable thickness without being subjected to the influence of the ink pressure and the atmospheric pressure, with the result that the ink drop jetting operation can be stabilized and thereby a high quality recording can be made.

(3D) To achieve the fourth object, the ink jet recording apparatus according to the present invention comprises the ink holding means for holding the ink obtained by dispersing the color material components in insulating solvent; the recording electrodes arranged in the ink holding means to jet the color material components dispersed in the solvent by electrostatic force; and the ink stirring means arranged in the vicinity of the recording electrodes to stir the ink. (4D) Further, the ink jet recording apparatus comprises the ink holding means for holding the ink obtained by dispersing the color material components in insulating solvent; the recording electrodes arranged in the ink holding means to jet the color material components dispersed in the solvent by electrostatic force; the carrying electrodes for carrying the ink within the ink holding means in the ink supplying direction and in the ink returning direction; and the ink stirring means arranged in the vicinity of the recording electrodes to stir the ink.

Further, the ink jet recording apparatus comprises the ink holding means for holding the ink obtained by dispersing the color material components in insulating solvent; the recording electrodes arranged in the ink holding means to jet the color material components dispersed in the solvent by electrostatic force; and the common carrying and stirring means having the electrode group region for carrying the ink within the ink holding means in the ink supplying direction and the ink returning direction and the electrode group region for stirring the ink.

BRIEF DESCRIPTION OF THE DRAWINGS

FIG. 3A is a timing chart of the voltages applied to the electrode array when the ink drops are not jetted, for assistance in explaining the first embodiment of the driving method according to the present invention;

FIG. 3B is a timing chart of the voltages applied to the electrode array when the ink drops are jetted, for assistance in explaining the first embodiment of the driving method according to the present invention;

FIG. 5A is a timing chart of the voltages applied to the electrode array when the ink drops are not jetted, for assistance in explaining the second embodiment of the driving method according to the present invention;

FIG. 5B is a timing chart of the voltages applied to the electrode array when the ink drops are jetted, for assistance in explaining the second embodiment of the driving method according to the present invention;

FIG. 9 is a timing chart showing an operation example of the third embodiment of the driving circuit according to the present invention;

FIG. 10 is a timing chart showing another operation example of the third embodiment of the driving circuit according to the present invention;

DETAILED DESCRIPTION OF THE PREFERRED EMBODIMENTS

I. The embodiments of the ink jet recording apparatus for achieving the first object will be described hereinbelow with reference to the attached drawings.

(First embodiment)

Figure 1:
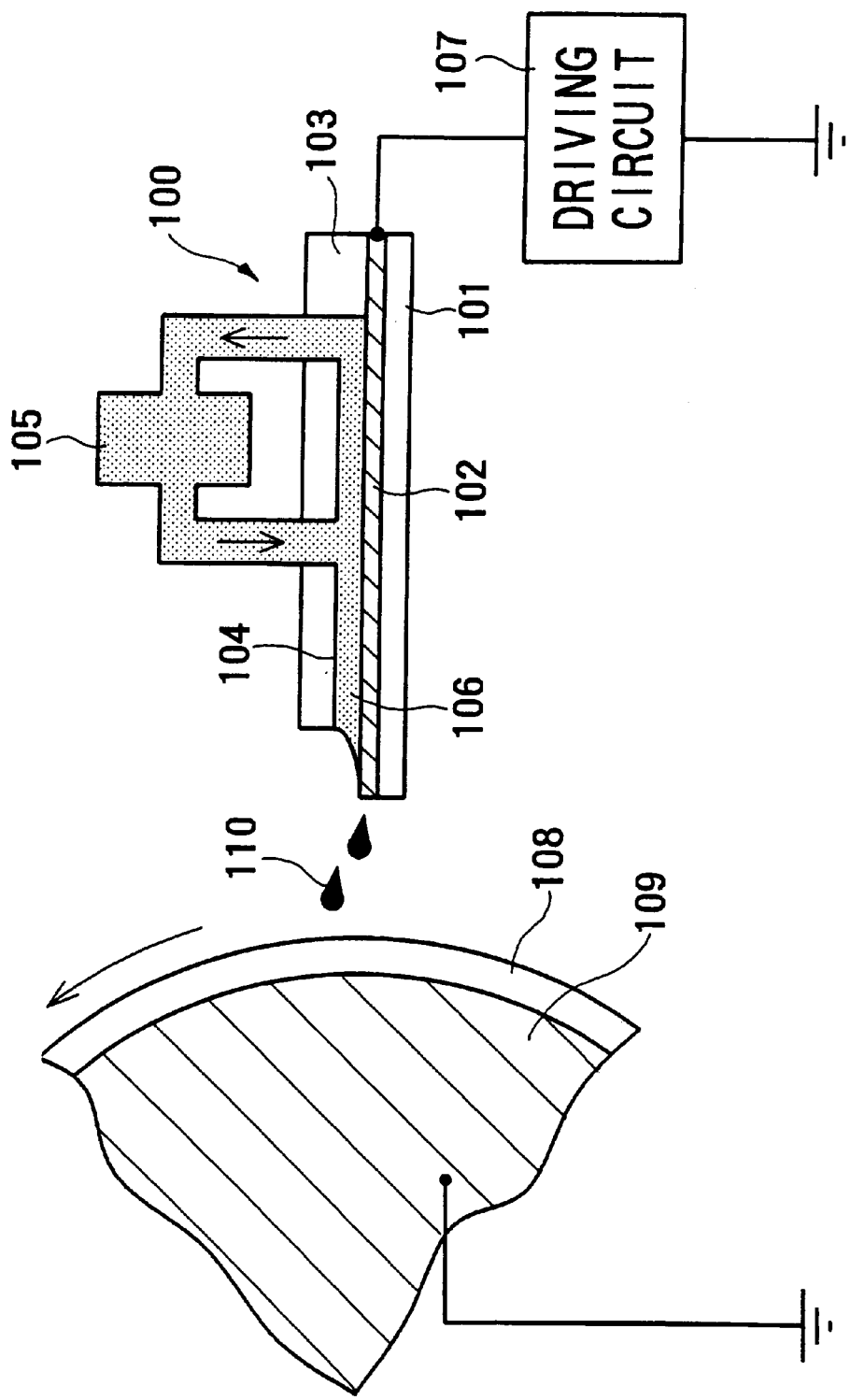
FIG. 1 is a partial cross-sectional view showing the construction of a first embodiment of the ink jet recording apparatus according to the present invention.

FIG. 1 shows the construction of an ink jet recording apparatus using a first embodiment of the line scanning type ink jet recording head according to the present invention. In the drawing, a recording head 100 is composed of a head substrate 101 having an electrode array 102 formed by arranging stripe-shaped individual electrodes each corresponding to each of pixels in a main scanning direction (perpendicular to the paper), and an upper lid 103 arranged on the head substrate 101. The head substrate 101 and the upper lid 103 form an ink flow path 104. To this ink flow path 104, ink 106 is supplied from an ink circulating mechanism 105 including a pump (not shown). This ink 106 is obtained by dispersing and floating plus-charged color material components in colloidal state in an insulation solvent having a resistivity of $10^8 \Omega$ cm or more, together with a charge control agent and a binder. The ink is carried to an ink drop jetting position through the ink flow path 104, and further a part of the jetted ink is returned to the ink circulating mechanism 105 through a return port.

A driving circuit 107 is connected to each electrode of the electrode array 102. The driving circuit 107 is constructed so that three different voltages, that is, a first voltage V0, a second voltage V1 and a third voltage V2 (V0<V1<V2) can be applied selectively to the electrodes, respectively. The levels of these three voltages V0, V1 and V2 are determined in such a way that the color material components can be cohered but not jetted when a first potential difference between (V1–V0) is generated between the two adjacent electrodes, but can be jetted when a second potential difference (V2–V1) or (V2–V0) is generated between the two adjacent electrodes.

In more detail, the driving circuit 107 selectively applies the first voltage V0 and the second voltage V1 to the electrode array 102 in such a way that when the color material components are required to be cohered (the ink drops are not jetted), a first potential difference between the two voltages V0 and V1 can be reversed alternately between the two adjacent electrodes at a predetermined period. Further, when the ink drops are required to be jetted, the third voltage V2 is applied in such a way as to jet the ink drops toward the recording medium. A more detailed construction of the driving circuit 107 will be explained in the second embodiment.

A recording medium, that is, a recording paper 108 arranged so as face the end of the recording head 100 is moved in the arrow direction shown in FIG. 1 in tight contact a recording drum 109 which functions also as an opposing electrode. In the state where the ink is moved to a predetermined position on the electrode array by the ink circulating mechanism 105, when the third voltage V2 is applied to a predetermined individual electrode (a noted electrode for jetting an ink drop) and another electrode adjacent thereto in accordance with image signals to be recorded, since ink drops 110 containing the color material components are jetted onto the recording pater 108 by an electric field generated between the electrode array 102 and the recording drum 109, an image can be formed on the recording paper 108.

The driving method of the electrode array 102 of the first embodiment according to the present invention will be described hereinbelow with reference to FIG. 2. In this drive example, all the individual electrodes of the electrode array 102 are divided into two groups and then driven. In other words, during driving, the electrode array 102 is divided into even-number individual electrode (201) group (hatched) and odd-number individual electrode (202) group (white), and the electrode array is driven in unit of group. Further, (A), (B), (C) and (D) shown in FIG. 2 show the voltages applied to each individual electrode in sequence at regular time intervals.

Figure 2:
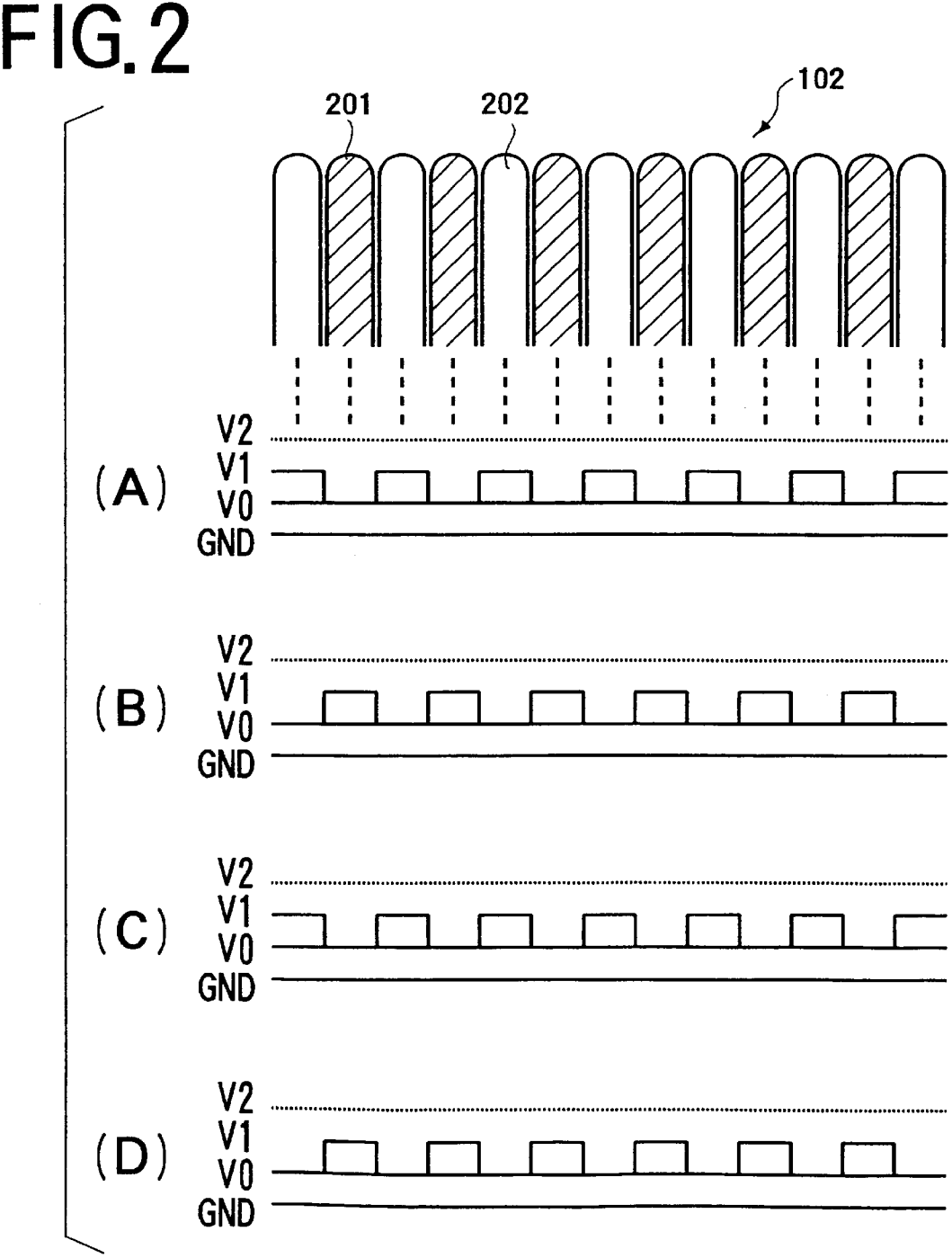
FIG. 2 is an illustration showing a voltage pattern applied to the electrode array, for assistance in explaining the first embodiment of the driving method according to the present invention.

Here, in a state, the assumption is made that the first voltage V0 is applied to the even-number individual electrode (201) group and the second voltage V1 is applied to the odd-number individual electrode (202) group at a timing as shown by (A) in FIG. 2 (where V1>V0). Since the ink 106 contains plus-charged color material components, the color material components are attracted to the even-number individual electrodes 201 and cohered thereat. When a constant time T1 has been elapsed from the state shown by (A) in FIG. 2, since the first voltage VO is then applied to the odd-number individual electrode (202) group and the second voltage V1 is applied to the even-number individual electrode (201) group as shown by (B) in FIG. 2 (where V1>V0), the color material components are attracted to the odd-number individual electrodes 202 and cohered thereat.

The state obtained when another constant time T1 has been further elapsed from the state shown by (B) is shown by (C) in FIG. 2, and the state obtained when still another constant time T1 has been further elapsed from the state shown by (C) is shown by (D) in FIG. 2. As understood above, the two voltages V0 and V1 are applied to both the odd-number individual electrode (202) group and the even-number individual electrode (201) group alternately at constant time intervals T1. In other words, the potential difference relationship between the two adjacent electrodes are reversed alternately at the time period of T1; that is, the two voltages V0 and V1 are applied to the electrodes in such a way that two voltage differences between (V1–V0) and between (V0–V1) can be generated at the two adjacent individual electrodes, alternately. On the basis of the voltage application as described above, since the color material components are cohered on the individual electrodes of lower voltage side at time intervals of T1, the color material components can be moved between the two adjacent individual electrodes alternately, with the result that the ink can be stirred. Therefore, it is possible not only to cohere the charged color material components effectively on any predetermined individual electrodes and but also to prevent the color material components from adhering on or in the vicinity of the individual electrodes.

After that, when an image is recorded, the third voltage V2 is applied to the predetermined individual electrodes by the driving circuit 107, in accordance with the image signals to be recorded, for each of the even-number individual electrode (201) group and the odd-number individual electrode (202) group. Then, since the ink drops 110 containing cohered color material components can be jetted from the respective individual electrodes onto the recording paper 108, it is possible to record an image on the recording paper 108.

FIG. 3A shows a timing chart of voltages applied to the electrode array when the ink drops are not jetted, and FIG. 3B shows a timing chart of voltages applied to the electrode array when the ink drops are jetted. Further, in FIG. 3B, (I) shows a change of the voltage applied to the even-number individual electrodes 201 (hatched portion in FIG. 2) with respect to time, and (II) shows a change of the voltage applied to the odd-number individual electrodes 201 (white portion in FIG. 2) with respect to time.

The apparatus becomes in a stand-by status shown in FIG. 3A. When image signals are inputted, the appratus operates as shown in FIG. 3B.

Upon the start of the recording, the first voltage V0 is applied to the even-number individual electrode (201) group to first jet the ink drops. On the other hand, the second voltage V1 is applied to the odd-number individual electrode (202) group adjacent to the even-number individual electrodes 201, respectively. Here, when the color material components of the ink 106 are charged to the plus side, since V1>V0, the color material components are attracted toward and cohered at the even-number individual electrode (201) group, so that the density of the color material components increases in the vicinity of the even-number individual electrodes 201. This is a first mode.

After the first voltage V0 has been applied for a time period T2 (coherence time), the third voltage V2 is applied to the even-number individual electrode (201) group. Here, since V2>V1, when the color material components are charged to the plus side, the color material components cohered in the vicinity of the even-number individual electrodes 201 are repelled by the third voltage V2 and at the same time attracted by the electric field generated between the even-number individual electrodes 201 and the ground potential of the recording drum 109, so that it is possible to jet dense color material components from the ends of the individual electrodes 201 to the recording paper 108 as the ink drops. This is a second mode.

The third voltage V2 is kept applied for a maximum time interval of Tw. Here, since the quantity of jetted ink can be changed according to the application time of the third voltage V2, it is possible to modulate the density at the pixel. Here, when the application time of the third voltage V2 is changed as shown in FIG. 3B according to the gradation data of the image signals within the time range from 0 to Tw (referred to as pulse width modulation), it is possible to realize a gradation recording. Further, in the even-number individual electrodes 201, the second voltage V1 is applied to the electrodes corresponding to the image signals of zero (i.e., from which the ink drops are not jetted).

After the ink drop jetting from the even-number individual electrodes 201 has been completed, the ink drops are then jetted from the odd-number individual electrodes 202. In this case, the first voltage V0 is applied to the odd-number individual electrode (202) group. On the other hand, the second voltage V1 is applied to the even-number individual electrodes 201 (from which the ink drop jetting has been already completed). In this case, since the color material components are cohered in the vicinity of the odd-number individual electrodes 202, the density of the color material increases (the first mode). Under these conditions, when only the voltage applied to the odd-number individual electrodes 202 is increased to the third voltage V2, it is possible to jet the dense color material components from the ends of the individual electrodes 202 to the recording paper 108 as the ink drops (the second mode).

By a series of the above-mentioned operations. the one-line image recording has been completed. By repeating the above-mentioned operation, the ink jetting are repeated alternately between the even-number individual electrodes 201 and the odd-number individual electrodes 202, to record an image line by line in sequence. As a result, a two-dimensional image can be recorded.

As described above, when a series of operation such that the color material components are cohered onto the even-number individual electrodes 201 (the first mode); the ink drops 110 are jetted from the predetermined electrodes in accordance with the image signal (the second mode); the color material components are cohered onto the odd-number individual electrodes 202 (the first mode); and the ink drops 110 are jetted from the predetermined electrode in accordance with the image signal (the second mode) is repeated at a period of (T1), it is possible to record an image whose resolution can be determined by the pattern of the electrode array, on the recording paper 108.

As described above, in the first embodiment of the present invention, since a sufficient quantity of the color material components can be supplied to the predetermined position of the electrode array and further the color material components can be prevented from adhering in the vicinity of the individual electrodes, it is possible to record a high resolution image without clogging of the ink.

Further, the coherence and stirring operation of the color material components as shown in FIG. 2 can be effected at any time (e.g., upon starting of the recording apparatus) or periodically during the recording operation of the recording apparatus.

(Second embodiment)

Figure 4:
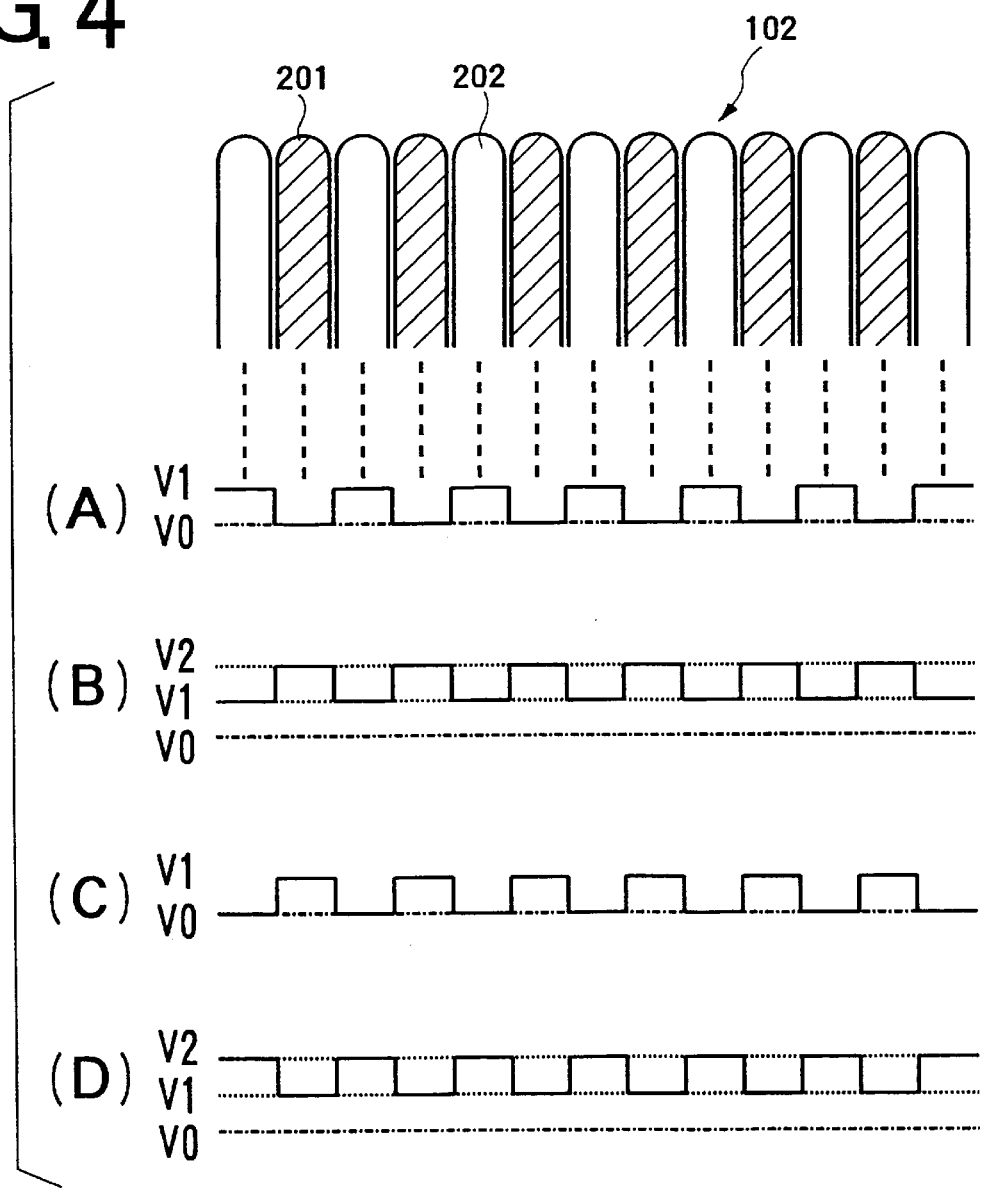
FIG. 4 is an illustration showing a voltage pattern applied to the electrode array, for assistance in explaining a second embodiment of the driving method according to the present invention.

The driving method of the electrode array 102 of a second embodiment according to the present invention will be described hereinbelow with reference to FIG. 4, which show the voltages applied to the respective individual electrodes at predetermined time intervals. In the same way as with the case of the first embodiment, all the individual electrodes of the electrode array 102 are driven being divided into two groups. In this second embodiment, the recording operation is different from that of the first embodiment. In more detail, (A) and (B) or (C) and (D) shown in FIG. 2 correspond to (A) and (C) shown in FIG. 4, respectively. This second embodiment is different from the first embodiment in that after the first mode of the applied voltage patterns as shown by (A) and (C) in FIG. 4, the second mode of the applied voltage patterns as shown by (B) and (D) in FIG. 4 are inserted. Here, the first mode is a mode in which the color material components are cohered and stirred, and the second mode is a mode in which the ink drops having the cohered color material components are jetted.

FIG. 5A shows a timing chart of voltages applied to the electrode array when the ink drops are not jetted, and FIG. 5B shows a timing chart of voltages applied to the electrode array when the ink drops are jetted. Further, in FIG. 5B, (I) shows a change of the voltage applied to the even-number individual electrodes 201 (hatched portion in FIG. 2) with respect to time, and (II) shows a change of the voltage applied to the odd-number individual electrodes 201 (white portion in FIG. 2) with respect to time.

In FIG. 5B, the timings shown by (A), (B), (C) and (D) correspond to the timings shown by (A), (B), (C) and (D) in FIG. 4, respectively.

The apparatus becomes in a stand-by status shown in FIG. 5A. When image signals are inputted, the apparatus operates to record as shown in FIG. 5B.

Upon the start of the recording, the first voltage V0 is applied to the even-number individual electrode (201) group to first jet the ink drops, as shown by (A) in FIG. 5B. On the other hand, the second voltage V1 is applied to the odd-number individual electrode (202) group adjacent to the individual electrode (201) group, respectively. When the color material components of the ink 106 is charged to the plus side, since V1>V0, the color material components are attracted toward and cohered at the even-number individual electrode (201) group, so that the density of the color material components increases in the vicinity of the even-number individual electrode (201) group (the first mode).

After the first voltage V0 has been applied for a time period T1 (coherence time), the third voltage V2 is applied to the even-number individual electrode (201) group, as shown by (B) in FIG. 5B. Here, since V2>V1, when the color material components are charged to the plus side, the color material components cohered in the vicinity of the even-number individual electrodes 201 are repelled by the third voltage V2 and at the same time attracted by the electric field generated between the individual electrodes 201 and the ground potential of the recording drum 109, so that it is possible to jet dense color material components from the ends of the individual electrodes 201 to the recording paper 108 as ink drops (the second mode).

The third voltage V2 is kept applied for a maximum time interval of Tw. Here, since the quantity of jetted ink can be changed according to the application time of the third voltage V2, it is possible to modulate the density at the pixels. In other words, it is possible to record an image with gradation by changing the application time (jetting time) of the third voltage V2 in a range between 0 and Tw, that is, by pulse width modulation. Further, in the individual electrodes 201, the second voltage V1 is applied to the electrodes corresponding to the image signals of zero (i.e., from which the ink drops are not jetted).

After the ink drop jetting from the even-number individual electrodes 201 has been completed, the ink drops are then jetted from the odd-number individual electrodes 201. In this case, the first voltage V0 is applied to the odd-number individual electrode (202) group, as shown by (C) in FIG. 4. On the other hand, the second voltage V1 is applied to the even-number individual electrodes 201 (from which the ink drop jetting has been completed). In this case, since the color material components are cohered in the vicinity of the odd-number individual electrodes 202, the density of the color material components increases (the first mode). Under these conditions, when only the voltage applied to the odd-number individual electrodes 202 is increased to the third voltage V2, it is possible to jet the dense color material components from the ends of the odd-number individual electrodes 202 to the recording paper 108 as the ink drops (the second mode).

By a series of the above-mentioned operations as shown by (A), (B), (C) and (D) in FIG. 4, the one-line image recording has been completed. By repeating the above-mentioned operation, the ink jetting is repeated alternately between the even-number individual electrodes 201 and the odd-number individual electrodes 202, to record an image line by line in sequence. As a result, a two-dimensional image can be recorded.

In the above-mentioned driving method, at least a time period of (coherence time T1+jetting time Tw) is necessary as a recording time T0 for forming one pixel. Further, since a single individual electrode is used in common for both the cohering and jetting electrodes; that is, since it is impossible to jet the ink when the color material components are being cohered by the adjacent electrode, the electrode array must be divided into at least two groups, so that a time at least twice the recording time T0 is required to record one line. Here, since the electrodes are divided and the ink coherence time T1 is set, although the recording time is lengthened, it is possible to effectively cohere the color material components in the vicinity of the electrodes used for recording, by applying a relatively high voltage to the adjacent cohering electrodes. Further, since the coherence time T1 is additionally provided, it is possible to supply the ink stably and continuously.

As described above, in the driving method according to the present invention, it is possible to record the dense pixels stably and continuously due to a large ink coherence effect. Further, during recording, since the individual electrodes to which the first voltage V0 is applied are always switched and thereby the color material components can be stirred, it is possible prevent the color material components from being kept cohered on the same individual electrodes for many hours. Therefore, since the ink will not be adhered onto the individual electrodes, a stable recording can be realized for a long time.

Figure 6:
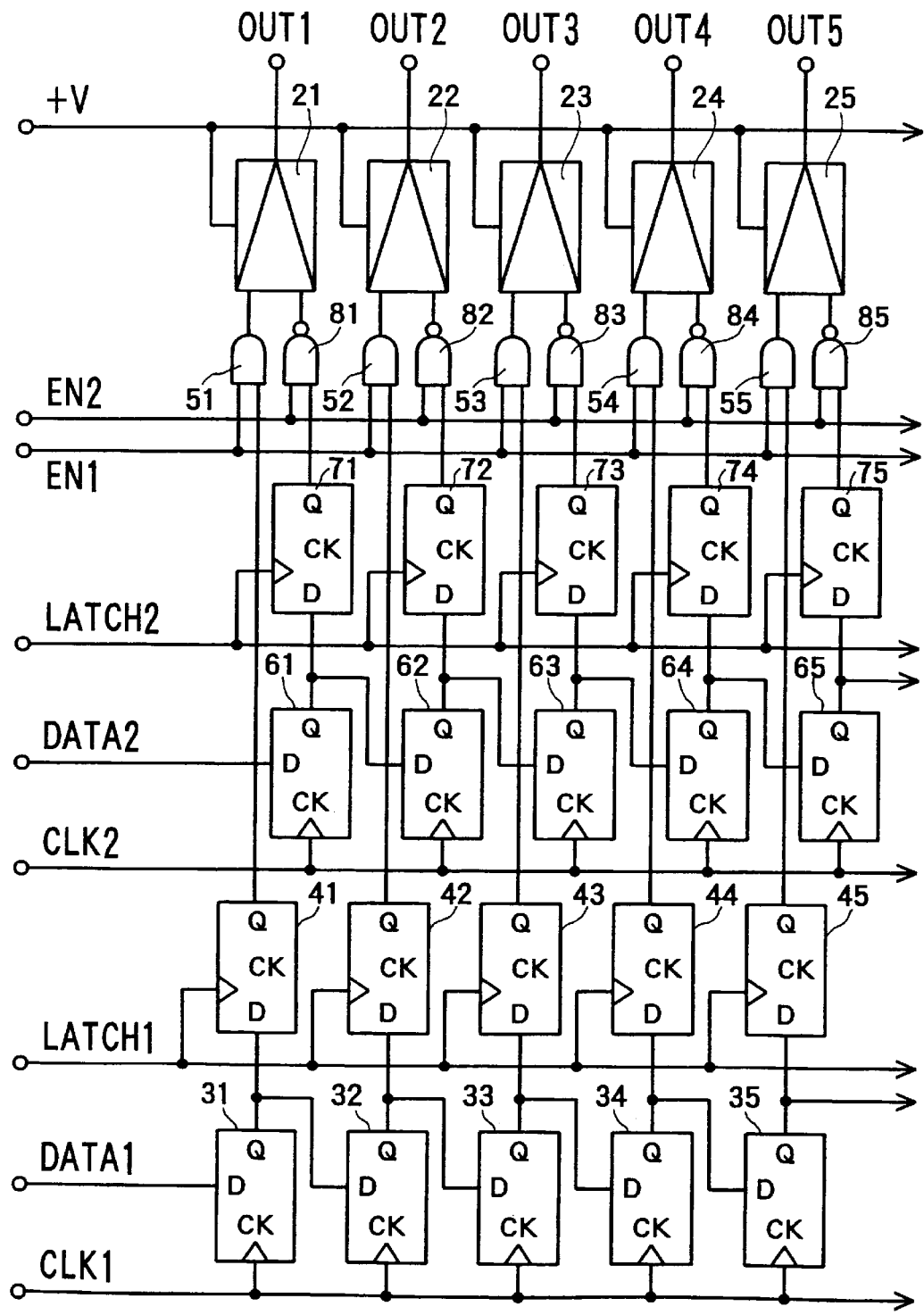
FIG. 6 is a block diagram showing a practical construction of the driving circuit shown in FIG. 1.

The construction of the driving circuit 107 for realizing the above-mentioned driving method according to the present invention will be described hereinbelow with reference to FIGS. 6 and 7. FIG. 6 is a block diagram showing the entire construction of the driving circuit 107. In FIG. 6, the respective individual electrodes of the electrode array 102 are connected to output terminals OUT1 to OUT5 of the driving circuit 107, respectively. To the output terminals OUT1 to OUT5, high output voltages are applied from high voltage drivers 21 to 25, respectively. Further, in FIG. 6, although only five output terminals OUT1 to OUT5 are shown by way of example, in practice, the output terminals whose number is the same as that of the individual electrodes to be driven at the same timing are necessary. Further, in FIG. 6, the electric parts other than the high voltage drivers 21 to 25 are all logical control circuit sections operative at a voltage less than 5 V, respectively.

First, the logical control circuit sections will be explained hereinbelow. Here, since the high voltage drivers 21 to 25 must output at least three sorts of the first voltage V0, the second voltage V1 and the third voltage V2, at least two bit data are required to control the switching of these three voltages. Here, the two bit data are shown in FIG. 6 by two input data DAT1 and DAT2 which are supplied from another front stage circuit (not shown). These data DAT1 and DAT2 are converted into control signals for controlling the high voltage drivers 21 to 25, by use of the circuits of quite the similar circuit construction as shown in FIG. 6.

First, the operation related to the input data DAT1 will be explained. The input data DAT1 whose number is the same as that of the individual electrodes to be driven at the same timing are supplied from a front stage circuit to a shift register composed of a cascade-connected latch circuits 31 to 35, together with a clock signal CLK1, and then transferred through the shift register on the basis of the clock signal CLK1. After a predetermined number of the input data DAT1 have been supplied, a latch signal LATCH1 is supplied, so that the data transferred through the latch circuits 31 to 35 for constituting the shift register are outputted from the output terminals of the latch circuits 41 to 45, respectively. The control data outputted by the output terminals of the latch circuits 41 to 45 are gated by gates 51 to 55 in response to a recording timing signal EN1, and then supplied to one input terminals of the high voltage drivers 21 to 25, respectively.

The operation related to the input data DAT2 is quite the same as above. That is, the input data DAT2 whose number is the same as that of the individual electrodes to be driven at the same timing are supplied from another front stage circuit to a shift register composed of a cascade-connected latch circuits 61 to 65, together with a clock signal CLK2, and then transferred through the shift register on the basis of the clock signal CLK2. After a predetermined number of the input data DAT2 have been supplied, a latch signal LATCH2 is supplied, so that the data transferred through the latch circuits 61 to 65 for constituting the shift register are outputted from the output terminals of the latch circuits 61 to 65, respectively. The control data outputted by the output terminals of the latch circuits 61 to 65 are gated by gates 81 to 85 in response to a recording timing signal EN2, and then supplied to the other input terminals of the high voltage drivers 21 to 25, respectively.

Figure 7:
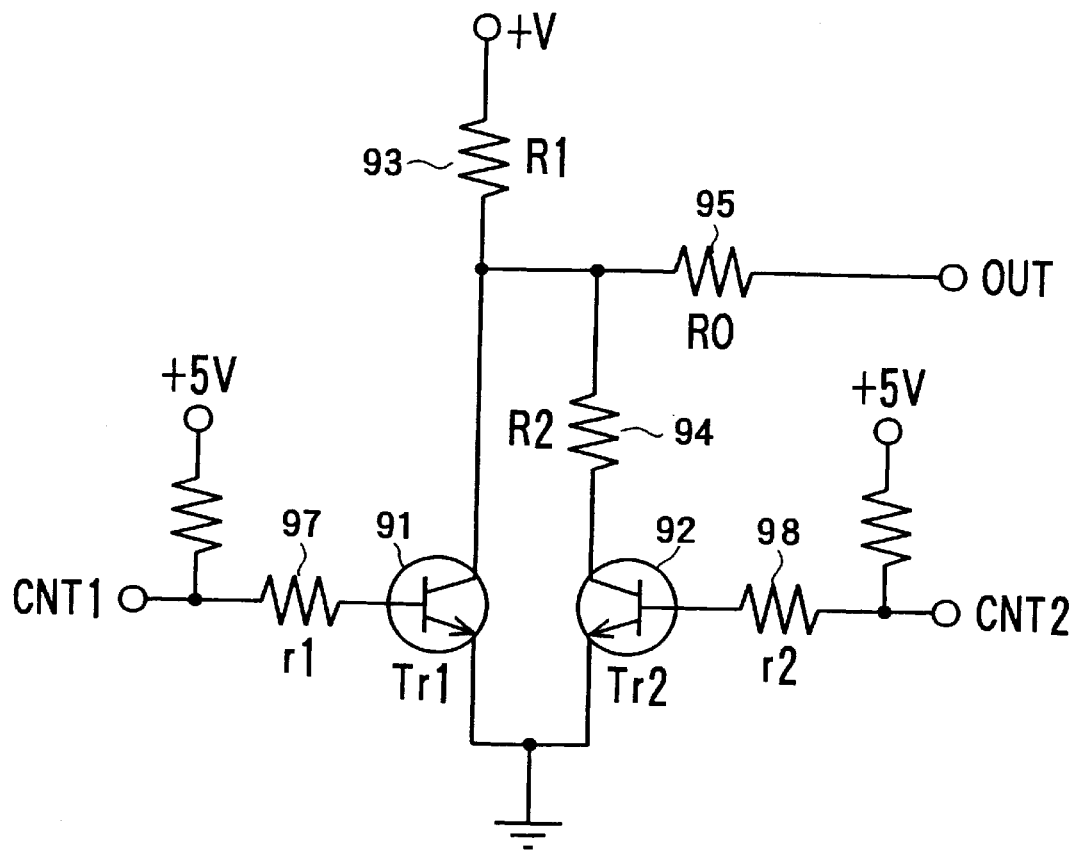
FIG. 7 is a block diagram showing a practical construction of each of the high voltage drivers shown in FIG. 6.

FIG. 7 shows one of the practical high voltage drivers 21 to 25. This high voltage driver will be explained briefly hereinbelow. When the control signal CNT1 supplied by one of the gates 51 to 55 changes to a high level, since a base current flows through the base of a first transistor (Tr1) 91 via a control resistance 97, the transistor 91 is turned on. When the transistor 91 is turned on, since the collector voltage of the transistor 97 (to which a supply voltage (+V) is applied through a load resistor 93 (resistance value is R1) drops to 0 V, a voltage of 0 V is outputted to the output terminal OUT via a resistor 95 (the resistance value is R0). Further, since the collector of a second transistor 92 (Tr2) is connected to the collector of the transistor 91 via a resistor 94 (the resistance value is R2), when the transistor 91 is turned on, the voltage outputted from the output terminal OUT becomes 0 V, irrespective of the turn-on/off of the transistor 92. On the other hand, to the base of the transistor 92, a control signal CNT2 is inputted from one of the gates 81 to 85 via a current limit resistor 98.

When the transistor 91 is turned off and the transistor 92 is turned off, a voltage roughly the same as the supply voltage +V develops at the output terminal OUT. This is because the load connected to the output terminal OUT of the high voltage driver is an individual electrode of the electrode array 102 so that the load is almost a capacitive load and further the resistance value R0 of the resistor 95 (which serves as a discharge prevention) is very large as compared with the resistance value R1 of the load resistor 93. On the other hand, when the transistor 91 is turned off and the transistor 92 is turned on, a voltage of roughly V *R2 /(R1+R2) develops at the output terminal OUT. Table 1 lists the above-mentioned relationship.

TABLE 1

|  | Tr2 | |
| --- | --- | --- |
| Tr1 | ON | OFF |
| ON | 0 | 0 |
| OFF | V * R2/(R1 + R2) | +V |

Therefore, it is possible to obtain the first voltage V0 of 0 V, the second voltage V1 of V *R2 /(R1+R2), and the third voltage V2 of +V at the outputs of the high voltage drivers, respectively. Further, the practical example values are as follows: if +V=400 V; R1=R2=1MΩ; and R0=10 MΩ, it is possible to obtain V0=0 V; V1=200 V; and V2=400 V, respectively.

In practice, when an ink drop is jetted, a dc bias voltage (Vb) of about 1 KV is superposed upon the signal voltage of several hundred volts outputted by the high voltage driver as shown in FIG. 7, and then an addition of these two voltages is applied between the individual electrodes of the electrode array 102 and the recording drum 109. Here, in order to superpose the dc bias voltage Vb, the recording drum 109 is insulated from the grounded potential and then connected to a dc bias voltage of about −1 kV. Or else, the surface of the recording drum 109 is formed by an insulating substance, and a recording paper brought into pressure contact with the surface of the insulating substance or the recording drum 109 is charged to about −1 kV by use of a wire charger or a solid ion generator.

As described above, since a voltage of about (Vb +V1=1.2 kV) is applied during standby operation, it is possible to obtain the same effect as: a voltage of (Vb+V0=1 kV) is applied to the individual electrodes when the color material components are being cohered, and further a voltage of (Vb+V2=1.4 kV) is applied when the ink drops are being jetted. In addition, since the voltages used for the driving circuit can be suppressed at about several hundred volts by the above-mentioned construction, the driving circuit can be manufactured as an IC chip easily. When the driving circuit is integrated as an IC, since a number of driving circuits can be arranged on the head, it is possible to realize a small-sized ink jet recording apparatus.

(Third embodiment)

In the second embodiment, all the individual electrodes of the electrode array 102 are divided into two groups alternately, and the two-division driving method has been explained such that after one of the groups has been used for recording, the other of the groups is used for the succeeding recording. In this method, both the time T1 for cohering the color material components and the time Tw for applying the third voltage (i.e., ink jet time) (the maximum value) can be determined freely. This two-division driving method can be adopted in practice without causing any problem. However, when considering the peripheral situation such as the video data forming circuit, etc., it is desirable that the cohering time T1 is determined as a value integer times longer than the third voltage (V2) application time Tw.

Figure 8A:
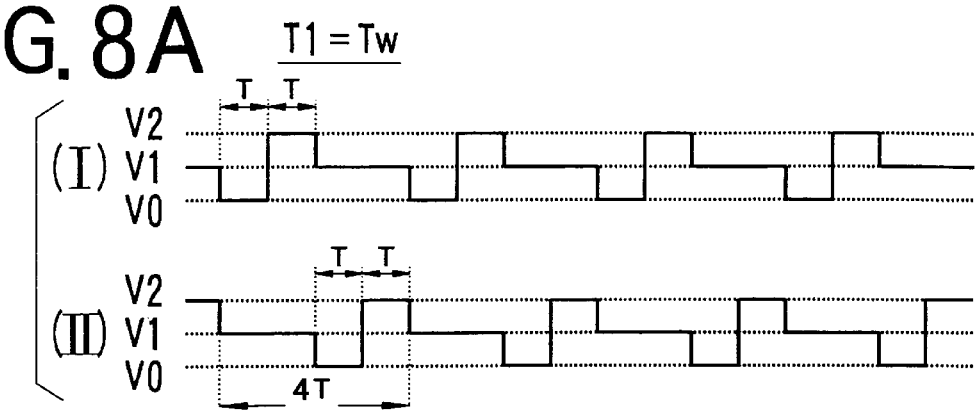
FIGS. 8A, 8B and 8C are timing charts of the voltages applied to the electrode array, for assistance in explaining a third embodiment of the driving method according to the present invention.
Figure 8B:
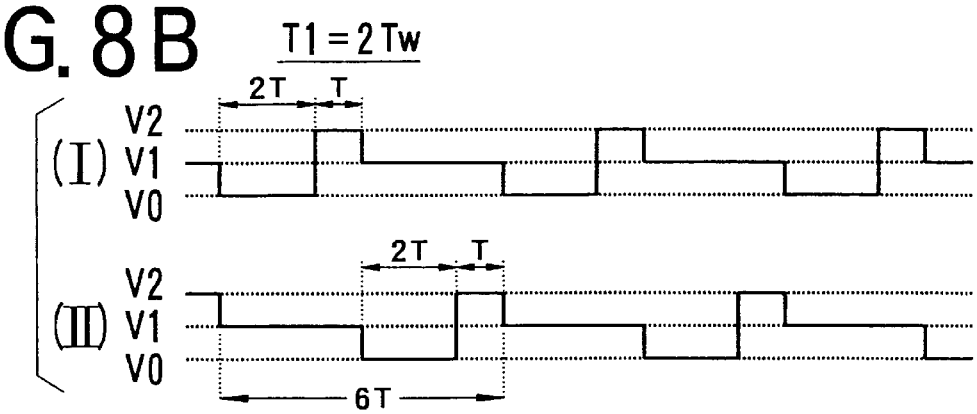
Figure 8C:
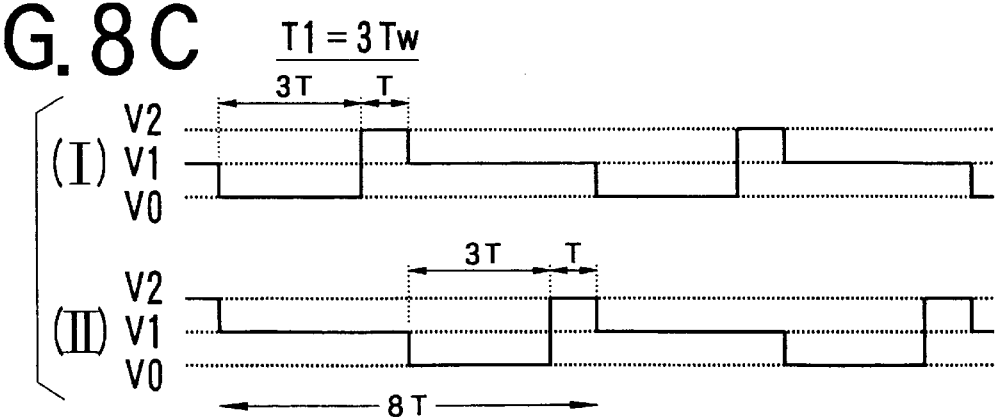

In this third embodiment, the time T1 is determined as a time integer times longer than Tw, as shown in FIGS. 8A to FIG. 8C.

In the case shown in FIG. 8A, T1=Tw=T. In this method, since the time 2T is required to form an pixel and further the two-division driving method is adopted, the time 4T is necessary to record one line. In the case shown in FIG. 8B, T1=2Tw, and in the case shown in FIG. 8C, T1=3Tw. When the density of the used ink is low or when the third voltage V3 is determined high, it is preferable to increase the cohering time T1. Further, in both the cases of FIGS. 8B and 8C, the time for recording one line is six or eight times longer than the time T for recording one pixel.

With reference to FIG. 9, the drive timing of the driving circuit 107 as shown in FIGS. 6 and 7 will be explained hereinbelow. In FIG. 9, the driving circuit 107 operates on the basis of a synchronous signal SYNCO having a period T.

Timing (A): when the synchronous signal SYNCO rises, a data DAT11 is supplied to latch circuits 31 to 35 for constituting a shift register shown in FIG. 6, together with a clock signal CLK10. Here, the data DAT11 is a signal for selecting electrodes for cohering the color material components. Further, since the two-division driving method is adopted, this data signal, DAT11 is a series of "1" and "0" as 1010 . . . in which "1" and "0" are arranged alternately.

Timing (B): at the timing of the synchronous signal SYNCO, a latch signal LATCH10 is supplied. By the latch signal LATCH10, the data transferred to the output sides of the latch circuits 41 to 45 are outputted. When the latch signal LATCH10 rises, an enable signal EN11 is outputted. This enable signal EN11 is a pulse signal for setting the time for cohering the color material components of the ink. In this example, the pulse width of the enable signal EN11 is roughly the same as the pulse period of the synchronous signal SYNCO. When the enable signal EN11 is outputted, since the output of each of the gates 51 to 55 to which the data DAT11 are transferred becomes "1", the transistors 91 are all turned on, so that the individual electrodes are 0 V; that is, the first voltage V0 can be supplied. Here, when the output of each of the gates 51 to 55 to which the data DAT11 is transferred becomes "0", since the transistors 91 are all turned off. Further, since the enable signal EN21 is not outputted and always at "0", the transistors 92 are all turned on, so that the individual electrodes are V1; that is, the second voltage V1 can be supplied. In other words, in the timing (B), the color material components of the ink are cohered in the vicinity of the electrodes for jetting the ink drops, respectively.

Further, at the same timing as the timing (B), data DAT21 is transferred to the latch circuits 61 to 65. In this case, the data DAT21 transfers "1" to the electrodes for jetting the ink drops and "0" to the electrodes for jetting no ink drops, according to the image signals. In this case, however, the image data are transferred to only the electrodes at which the color material components are now being cohered, alternately. On the other hand, "0" data are transferred to the other electrodes at which the color material components are not being cohered.

Timing (C): at this timing (C), the data transferred at the timing (B) are outputted from the latch circuits 71 to 75 on the basis of the latch signal LATCH20. Here, the enable signal EN21 which is a plus signal having a pulse width Tw is supplied to apply the third voltage V2 to the individual electrodes for a time Tw. Here, although the time Tw can be determined on the basis of the ink jetting characteristics, the maximum value of the time Tw is roughly the same as the recording time T of one pixel. On the other hand, since the enable signal EN11 is not outputted and therefore kept at "0", the transistors 91 are all kept turned off, so that the first voltage V0 is not applied to the individual electrodes.

The voltage of each of the individual electrodes can be controlled when the transistor 92 is turned on or off. That is, the third voltage V2 can be outputted to the electrode for jetting the ink drop, and the second voltage V1 is outputted to the electrode for jetting no ink. Here, the output time of the third voltage V2 is Tw. Therefore, after the time Tw has elapsed, the second voltage V1 is outputted to all the individual electrodes. Further, since the data DAT21 transferred at the timing (B) is "0" at the electrodes other than those to which the first voltage V0 is being applied at the timing (B), even if the third voltage V2 is applied during the period Tw, the electrodes other than the electrodes for jetting the ink drop are all kept at the second voltage V1.

On the basis of the above-mentioned operation, a first half (alternate pixels) of one line can be recorded. Successively, a second half (remaining alternate pixels) of the one line are recorded. At the timing (C), when the first half of one line are being recorded, the data for recording the remaining second half are transferred at the same time. The data DAT11 is supplied to the latch circuits 31 to 35 for constituting the shift register, together with the clock signal CLK10. The data DAT11 is a signal for selecting the electrodes for cohering the color material components. Here, since the electrodes for cohering the color material components at the succeeding timing (D) are the remaining half electrodes other than the electrodes which first cohere the color material components, this data DAT11 becomes a series of "0" and "1" as 0101 . . . in which "0" and "1" are arranged alternately.

Timing (D): at the timing of the synchronous signal SYNCO, the latch signal LATCH10 is supplied. By this latch signal LATCH10, the data transferred to the output sides of the latch circuits 41 to 45 are outputted. When the latch signal LATCH10 rises, the enable signal EN11 is outputted again. When the enable signal EN11 is outputted, since the transistors 91 connected to the gates 51 to 55 to which the data DAT11 are transferred are turned on, so that the first voltage V0 (0 V) is supplied to the individual electrodes. Further, the transistors 91 connected to the gates 51 to 55 to which the data DAT11 of "0" are transferred are turned off. Further, since the enable signal EN21 is always at "0", the transistors 92 are all turned on, so that the outputs of the individual electrodes to which the data DAT11 of "0" is supplied become the second voltage V1. With the result that, at the timing (D), the color material components of the ink are cohered in the vicinity of the remaining electrodes other than the electrodes which have first cohered the color material components.

Further, at the timing the same as the timing (D), the data DAT21 is transferred to the latch circuits 61 to 65. In this case, the data DAT21 of "1" is transferred to the electrodes for jetting the ink drop and "0" is transferred to the electrodes for jetting no ink drop, according to the image signals. In this case, however, the image data are transferred to only the electrodes at which the color material components are now being cohered, alternately; that is, the image data are transferred to the electrodes other than the electrodes at which the color material components are first cohered and then the ink drop is jetted. On the other hand, "0" data is transferred to the electrodes other than the above.

Timing (E): at this timing (E), the data transferred at the timing (D) are first outputted from the latch circuits 71 to 75 on the basis of the latch signal LATCH20. At the same time, the enable signal EN21 is supplied. Since the enable signal EN21 is always at "0", the transistors 91 are kept turned off, so that the first voltage V0 is not applied to the individual electrodes. The voltages of the respective individual electrodes are controlled by the turn-on or -off of the transistors 92 in such a way that the third voltage V2 is applied to the electrodes for jetting the ink drop, and the second voltage V1 is applied to the electrodes for jetting no ink drop, respectively. The time during which the third voltage V2 is being outputted is a time Tw. When this time Tw has been elapsed, the second voltage V1 is applied to all the individual electrodes. Further, since the DAT21 transferred at the timing (D) is "0" for the electrodes other than the electrodes to which the first voltage V0 is applied at the timing (D), even if the third voltage V2 is applied during this period Tw, the electrodes for jetting the ink drop are kept at the second voltage V1.

By the above-mentioned operation, the remaining alternate pixels of one line have been recorded, so that the recording of one line have been all recorded. Further, at the timing (E), since the coherence data for the second line is transferred at the same time, a plurality of lines of an image can be formed by repeating the similar operation.

Further, in FIG. 9, although the timing beginning from the one-line recording start is shown, in the state where the lines are recorded continuously, the timing can be shown by dashed lines. Further, the timing chart shown in FIG. 9 is only one example, so that it is possible to consider the other timings by the same construction of the driving circuit 107. For instance, the driving method the same as above can be realized by always outputting the enable signals EN11 and EN21 and setting the data DAT11 and DAT21 to "0" alternately for each recording period.

Further, when a more longer ink cohering time is required as shown in FIGS. 8B and 8C, a timing at which only the enable signal EN11 can be outputted is inserted between the timings (A) and (B) and the timings (C) and (D) in the timing chart shown in FIG. 9.

FIG. 10 shows an example of the timing chart in which the ink coherence time is determined twice longer than the ink jetting time, as shown in FIG. 8B. In the same way as above, it is possible to realize another driving method in which the coherence time is further lengthened, by increasing the period of the enable signal EN11.

(Fourth embodiment)

As explained in the third embodiment, when the cohering time T1 of the color material components is determined as an integer times of the ink jetting time Tw, this driving is substantially the same as the multi-division driving method. In the case shown in FIG. 8A, for instance, the recording time T for each pixel is ¼ of the one-line recording time, so that this method is substantially the same as the four-division driving method. Therefore, since the recording speed is not lowered, the four-division driving method can be adopted. Further, the case shown in FIG. 8B is equivalent to the six-division driving, and the case shown in FIG. 8C is equivalent to the eight-division driving.

In this fourth embodiment, since the color material components can be cohered under more random condition, it is possible to increase the effect of preventing the color material components from adhering onto the electrodes.

The driving method of the fourth embodiment will be explained in further detail with reference to timing charts shown in FIGS. 11, 12 and 13, respectively, in which the relationship between the electrode array 102 and the voltages applied at the respective timings is shown.

Figure 11:
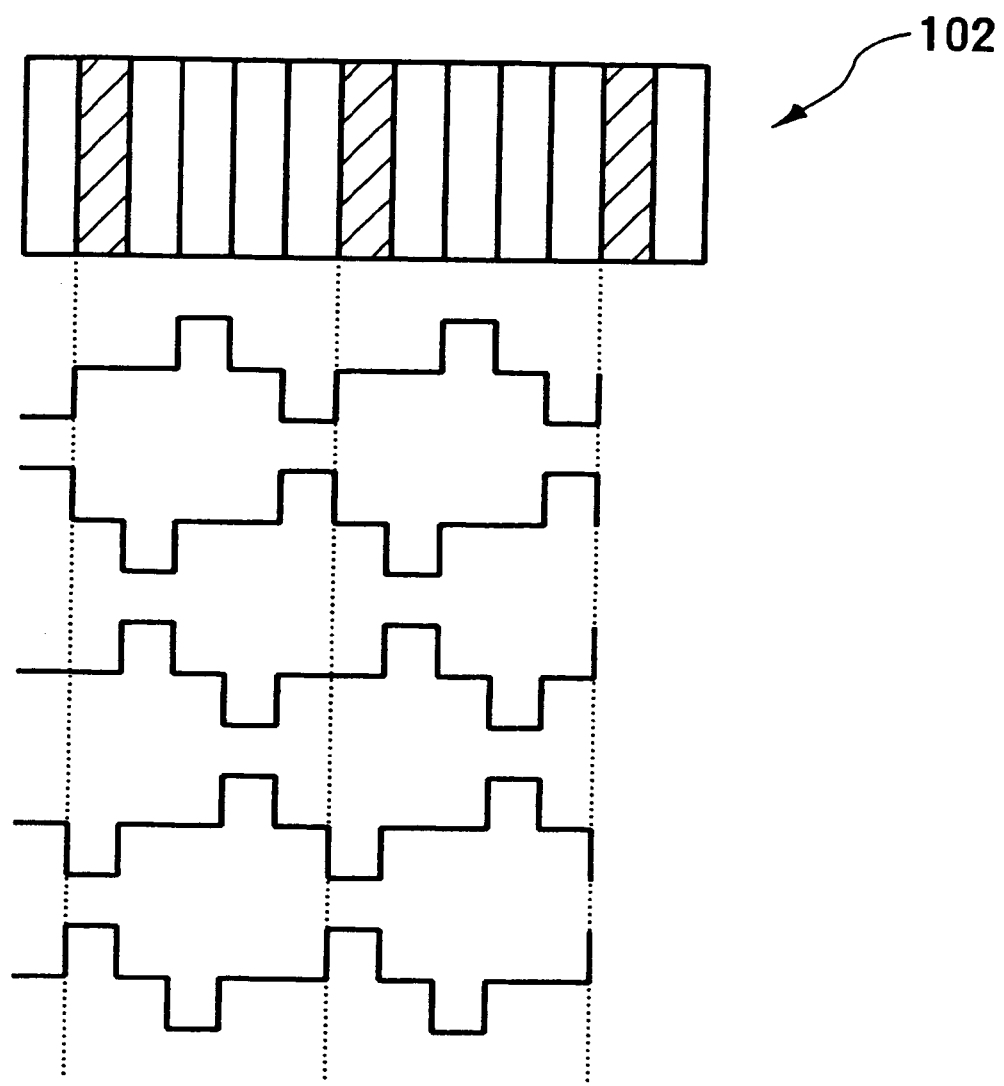
FIG. 11 is an illustration showing a voltage pattern applied to the electrode array, for assistance in explaining a first example of the driving method of a fourth embodiment according to the present invention.

FIG. 11 is an example of five-division driving, in which the same voltage is applied for each five electrodes beginning from the hatched individual electrode. In the case shown in FIG. 8A, when one period is necessary to cohere the color material components, although the recording can be made by the four-division driving, in the case of the driving method as shown in FIG. 11, the five-division driving can be made. In the same way, FIG. 12 shows an example in which the color material components are cohered for over three periods. Although this example corresponds to the eight-division driving shown in FIG. 8C, it is also possible to realize the ten-division driving as shown in FIG. 12. Further, FIG. 13 shows an example in which the ink is cohered for each five periods by driving the electrodes for each seven electrodes at the same timing. In this case, the driving method is 14-division driving.

As described above, in the fourth embodiment, since the color material components can be cohered under more random condition, it is possible to further increase the effect of preventing the color material components from adhering onto the individual electrodes.

Figure 12:
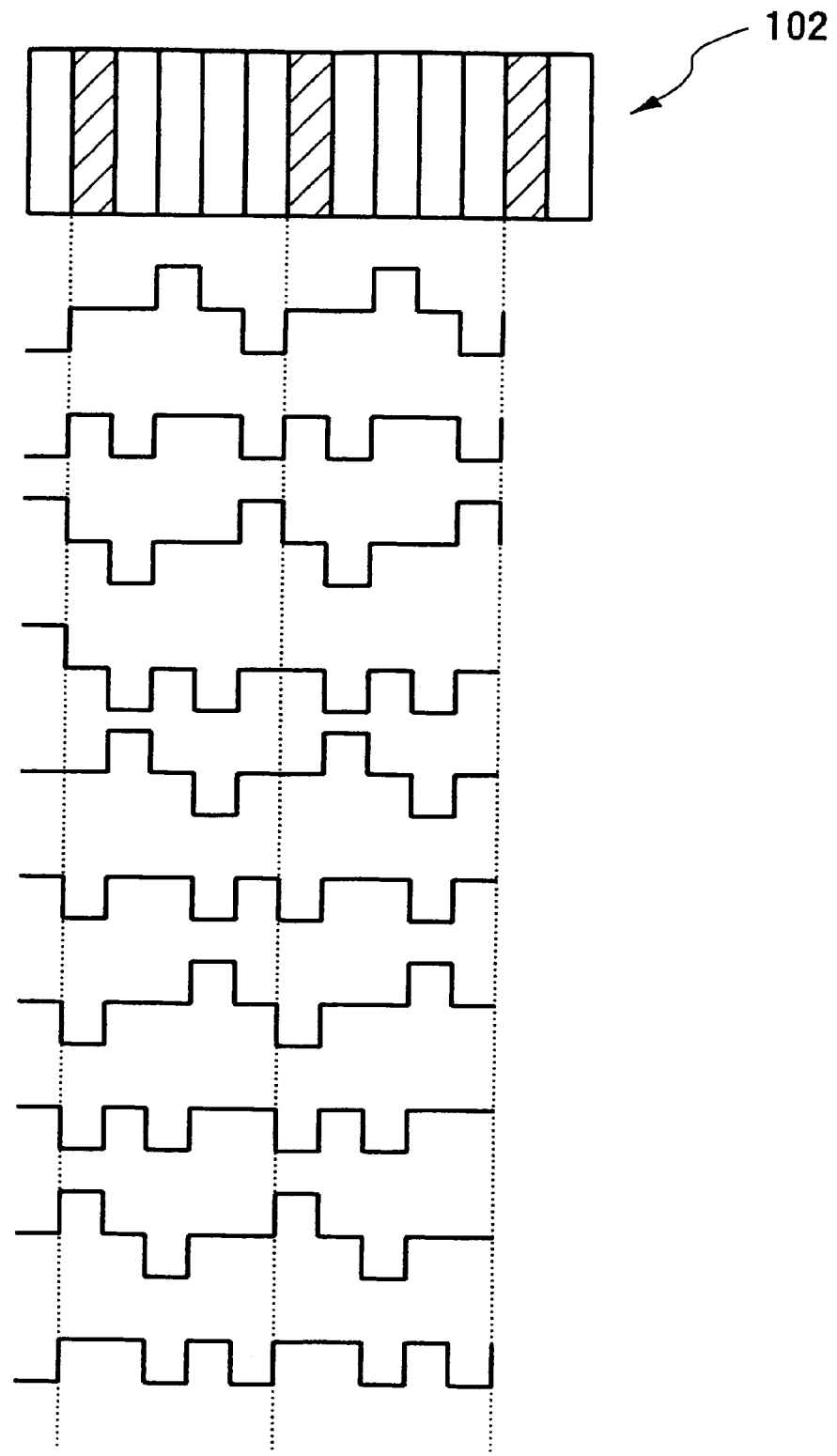
FIG. 12 is an illustration showing a voltage pattern applied to the electrode array, for assistance in explaining a second example of the driving method of a fourth embodiment according to the present invention.
Figure 13:
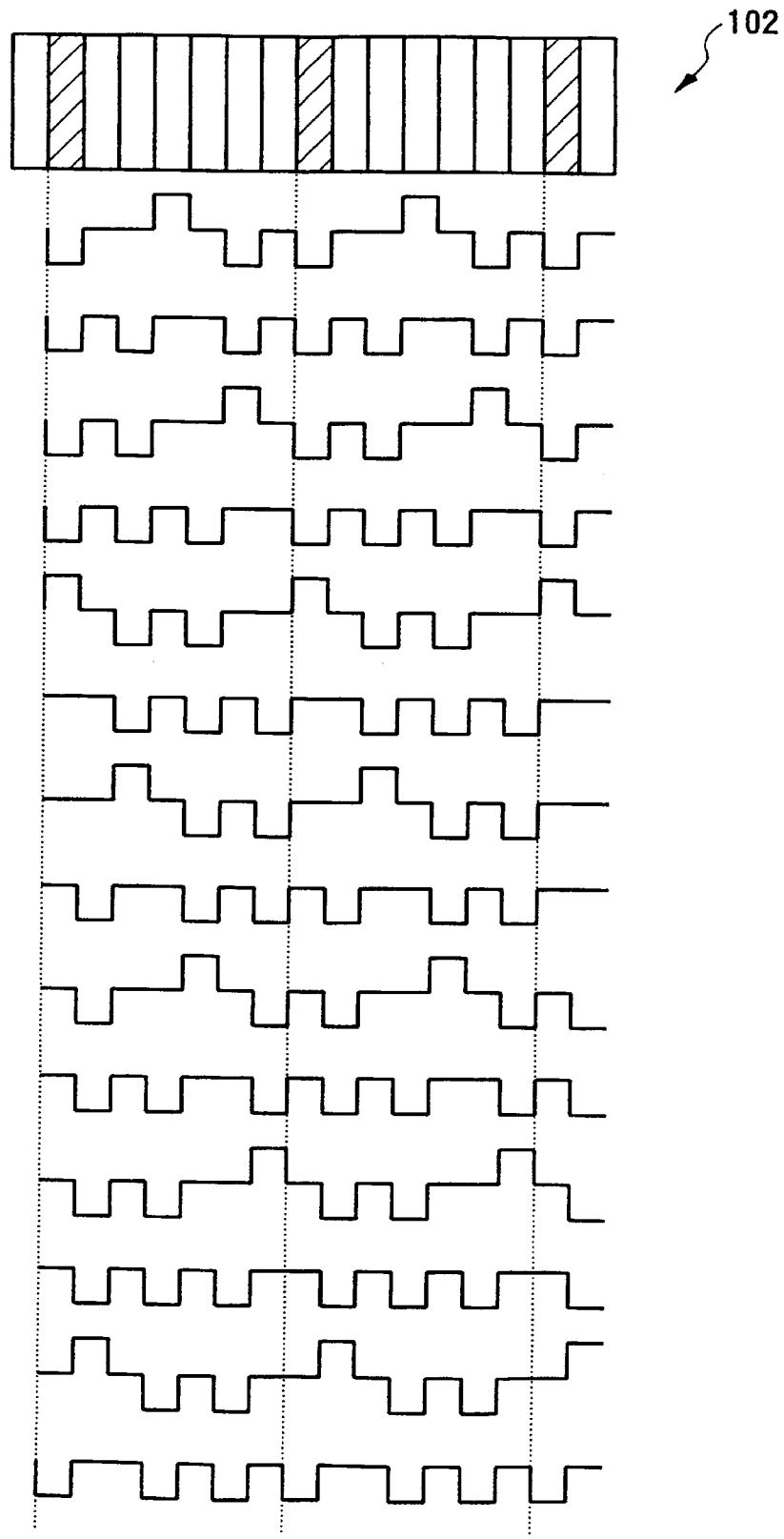
FIG. 13 is an illustration showing a voltage pattern applied to the electrode array, for assistance in explaining a third example of the driving method of a fourth embodiment according to the present invention.

Further, the driving method as shown in FIGS. 11 to 13 can be realized simply by use of the construction of the driving circuit as shown in FIG. 6. In more detail, in the timing chart shown in FIG. 9, the cohering signal and the recording data are transferred for each period, and further the ink coherence enable signal EN11 and the ink jetting enable signal EN21 are both outputted at two different timings. By modifying this timing slightly, it is possible to realize the driving method as shown in FIG. 11, by transferring and latching the cohering data and the recording data for each period and by outputting the enable signals EN11 and EN12 for each period over all the periods. Further, the driving methods shown in FIGS. 11 to 13 are only some examples, so that the other driving methods can be considered. That is, as far as the voltages applied to the jetting electrodes and the adjacent electrodes are changed and further the ink is jetted after having been cohered, even if the timings are different from those as shown in FIGS. 11 to 13, the same effect can be obtained.

The present invention is not limited to only the above-mentioned embodiments, and the various modification can be made without departing from the spirit thereof. For instance, in the above-mentioned embodiments, the line-scanning type ink jet recording head is used such that the electrode array is formed by arranging a number of stripe-shaped individual electrodes, and one-line is recorded at the same time or being separated into several times. However, without being limited only to the multi-head for jetting an ink drop from a plurality of positions, the present invention can be applied to the single head for recording one line by jetting an ink drop from a single position and by moving the head in the main scanning direction relative to the recording medium. In the case of the single head, it is possible to obtain the same effect by cohering and stirring the color material components, by use of at least two adjacent individual electrodes arranged on the head substrate and by applying voltages to these two electrodes in such a way that a potential difference between the two electrodes can be reversed at a predetermined period.

II. The embodiment of the ink jet recording apparatus for achieving the second object will be described hereinbelow with reference to the attached drawings.

(Fifth embodiment)

Figure 14:
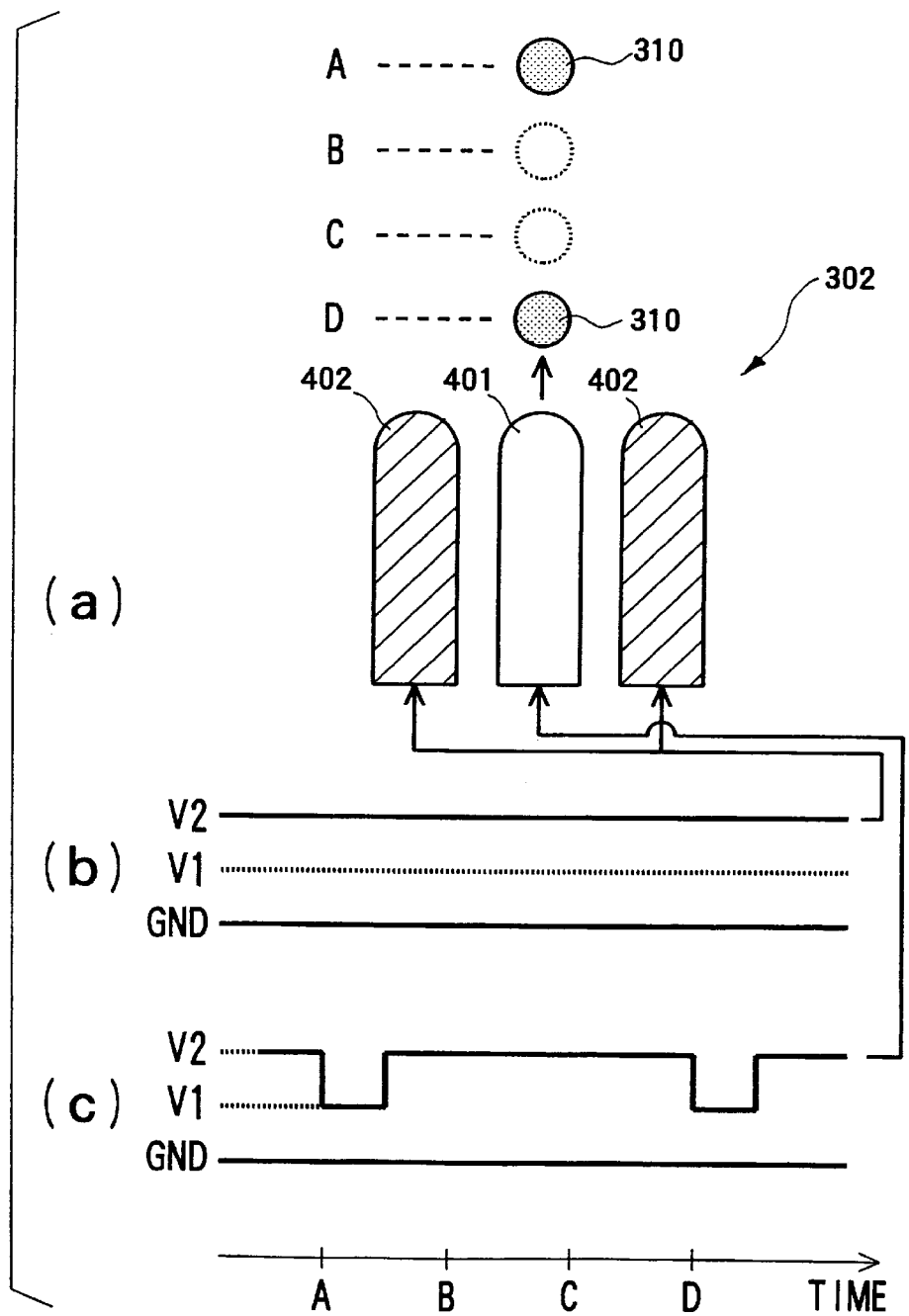
FIG. 14 is a pattern of voltages applied to the electrode array, for assistance in explaining the fifth embodiment of the driving method of the ink jet recording apparatus according to the present invention.

The fifth embodiment of the driving method of the electrode array 102 of the ink jet recording apparatus according to the present invention will be described hereinbelow with reference to FIG. 14. In FIG. 14, the electrodes of the electrode array 102 are divided into a first individual electrode 401 (shown by white) and two second individual electrodes 402 (shown by hatched lines) arranged on both sides of the first individual electrode 401. Further, in FIG. 14, voltages are applied from the driving circuit 107 (as shown in FIG. 1) to the three individual electrodes 401 and 402 during four periods A, B, C and D to jet an ink drop.

First, during the periods A and D, a voltage V1 is applied to the first individual electrode 401, and a voltage V2 higher than V1 is applied to the two second individual electrodes 402, respectively as shown. Therefore, the first potential difference between the first individual electrode 401 and the recording paper 108 (the grounded potential GND in this embodiment) is V1 and the second potential difference between the second individual electrodes 402 and the recording paper 108 (the grounded potential GND in this embodiment) is V2. Therefore, when this voltage V1 is set to a voltage value high enough to discharge the ink drop 310, the ink drop 310 can be discharged from the vicinity of the first individual electrode 401 and then jetted toward the recording paper 108.

In contrast with this, during the periods B and C, when the voltage V2 is applied to both the first and second individual electrodes 401 and 402, the first potential difference between the first individual electrode 401 and the recording paper 108 is equal to the second potential difference between the second individual electrodes 402 and the recording pater 108. Or else, when the voltage V2 is applied to the first individual electrode 401 and the voltage VI is applied to the second individual electrodes 402, respectively, since the first potential difference is V2 and the second potential difference is V1; that is, since the firs potential difference (V2) is higher than the second potential difference (V1), the ink drop 310 is not ejected.

Therefore, when the voltage V2 is always kept applied to the second individual electrodes 402 as shown by (b) in FIG. 14 and when the voltage and further voltages changing according to image signals to be recorded are applied to the first individual electrode 401 as shown by (c) in FIG. 14, it is possible to form an image dot. In other words, when an image dot is required to be formed, the voltage V1 is applied to the first individual electrode 401 to discharge and the ink drops 310 from the first individual electrode 401; and when an image dot is not required to be formed, the voltage V2 is applied to the first individual electrode 401 so as not to eject and the ink drop 310 from the first individual electrode 401.

As described above, the recording can be made when voltages are applied to the first and second individual electrodes 401 and 402 in such a way that the potential difference between the first individual electrode 401 (arranged the nearest to the ink eject position) and the recording paper 108 is determined lower than the potential difference between the second individual electrodes 402 (adjacent to the first individual electrode 401) and the recording paper 108. In this case, since the charged color material components supplied to the vicinity of the first individual electrode 401 can be ejected as the ink drop 310 under such a condition as to be surrounded by an electric field formed by the voltage V2 applied to the second individual electrodes 402, it is possible to prevent the color material components from being scattered onto the adjacent second individual electrodes 402. Therefore, since the charged color material components can be supplied to the vicinity of the first individual electrode 401 for discharging the ink drop at a relatively high density, it is possible to form an image on the recording paper 108 at a high density without causing a density non-uniformity.

Figure 15:
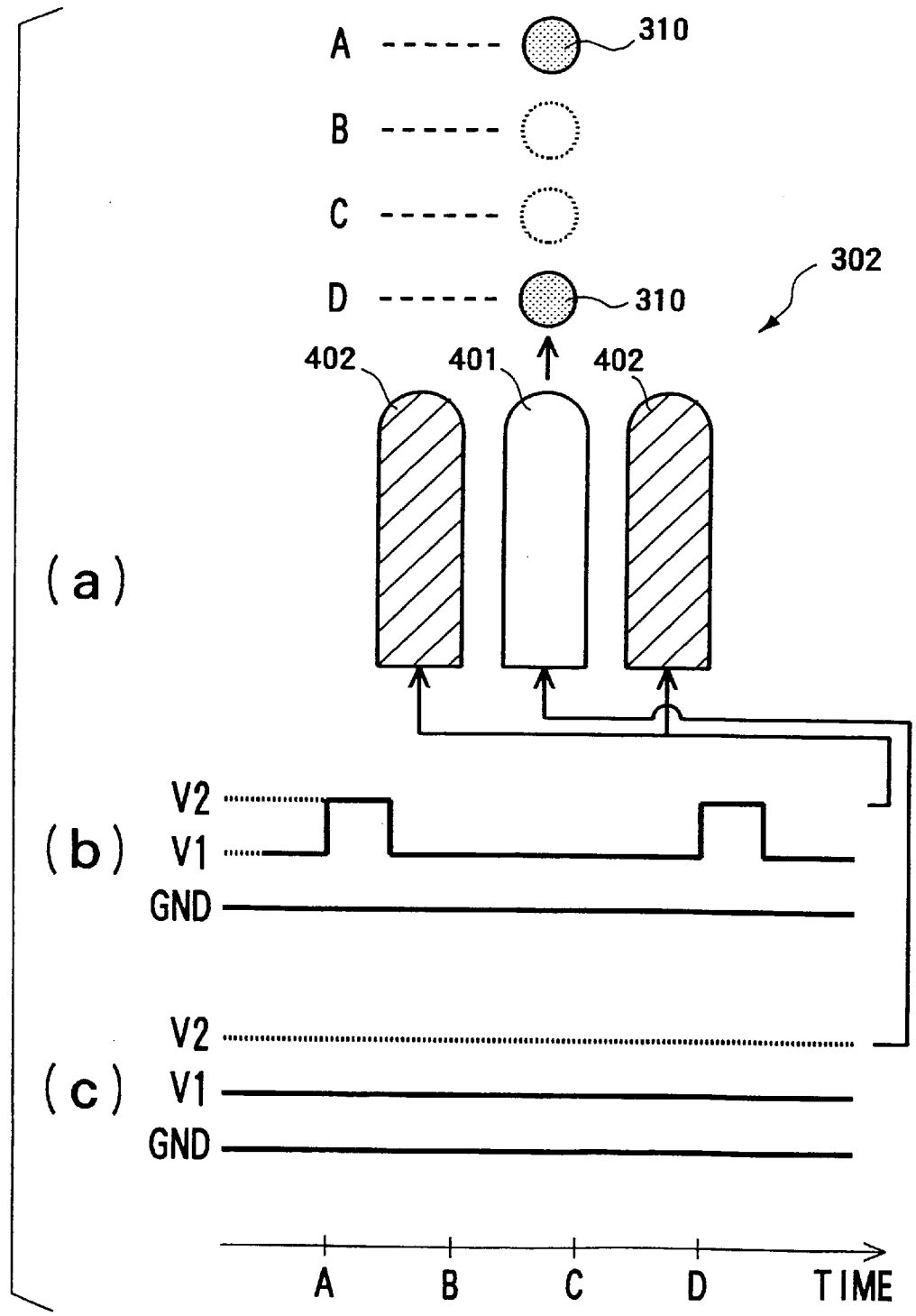
FIG. 15 is a pattern of voltages applied to the electrode array, for assistance in explaining a modification of the sixth embodiment of the driving method of the ink jet recording apparatus according to the present invention.

FIG. 15 shows another modification of the driving method according to the present invention. In the same way as with the case shown FIG. 14, the electrodes of the electrode array 102 is divided into a first individual electrode 401 (shown by white) and two second individual electrodes 402 (shown by hatched lines) arranged on both sides of the first individual electrode 401, and further voltages are applied from the driving circuit 107 (as shown in FIG. 1) to the three individual electrodes 401 and 402 during four periods A, B, C and D to ejected and jet an ink drop.

In this example, as understood by comparison of FIG. 14 with FIG. 15, the voltage applied to the first individual electrode 401 nearest to the ink discharging position is kept constant, and the voltage applied to the second individual electrodes 402 is varied according to recorded image signals, to form each pixel. In more detail, a constant voltage V1 is kept applied to the first individual electrode 401. When a pixel is required to be formed, the voltage V2 is applied to the two second individual electrodes 402, to eject and jet the ink drop from the first individual electrode 401; and when a pixel is not required to be formed, the voltage V1 is applied to the second individual electrodes 402, so as not to eject and jet the ink drop from the first individual electrode 401. Even in this driving method as shown in FIG. 15, it is possible to obtain the same effect as that shown in FIG. 14.

(Sixth embodiment)

Figure 16:
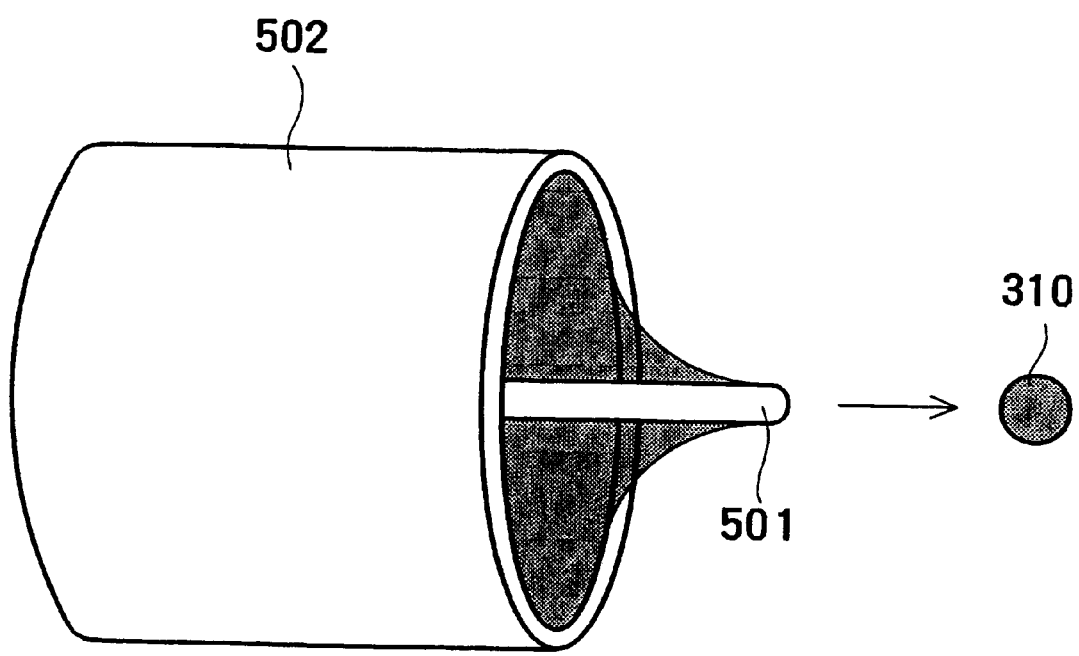
FIG. 16 is a perspective view showing a structure of a sixth embodiment of a recording head of the ink jet recording apparatus according to the present invention.

FIG. 16 shows a construction of the essential portion of the ink jet recording head related to a sixth embodiment of the ink jet recording apparatus according to the present invention.

In the fifth embodiment, although the electrode array 102 is mounted on the head substrate 101 as shown in FIG. 1, in this embodiment the recording head portion is formed as an coaxial structure. In more detail, the first individual electrode 501 is formed as a wire-shape electrode, and the second electrode 502 is formed as a pipe-shaped electrode arranged so as to surround the first individual electrode 501.

In this embodiment, when the voltages are applied to the first and second individual electrodes 501 and 502, respectively in the same way as with the case of the fifth embodiment, it is possible to obtained the same effect as that of the fifth embodiment.

The above-mentioned fifth and sixth embodiments are effective when a single head is used in such a way that ink is ejected and jetted from a point of the ink jet recording head and further the head is moved relative to the recording paper 108 in the main scanning direction in order to record an image line by line.

(Seventh embodiment)

In the fifth embodiment, the operation has been explained by using the three individual electrodes of the electrode array 102. However, the following driving method is adopted for the whole electrode array 102. This driving method is effective when one line is recorded at the same time or being divided into several times by use of a line-scanning type ink-jet recording head.

Figure 17:
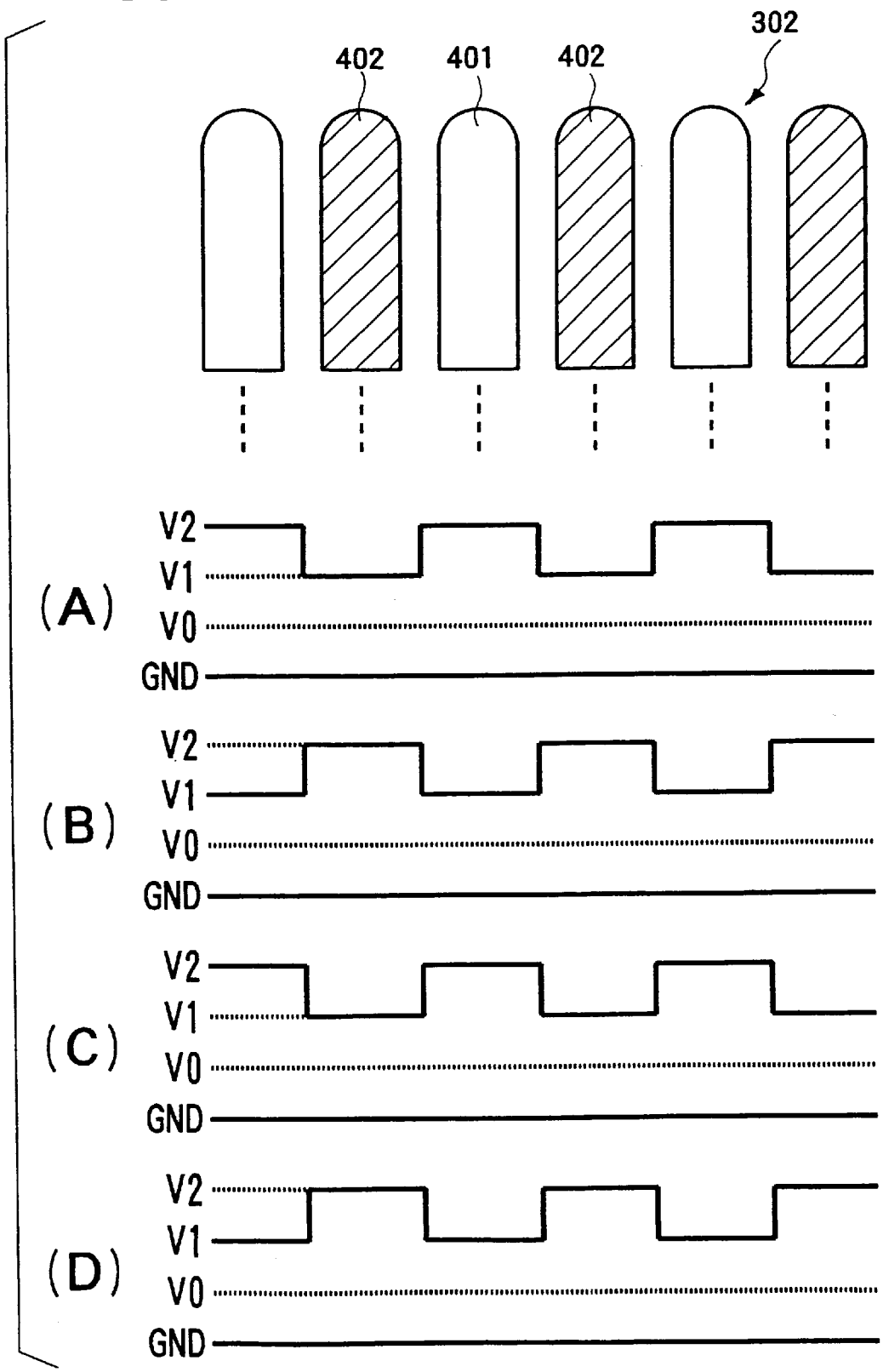
FIG. 17 is a timing chart of voltages applied to the electrode array, for assistance in explaining the seventh embodiment of the driving method of the ink jet recording apparatus according to the present invention, when all-marked recording is made.

The driving method of the electrode array 102 will be explained with reference to FIG. 17, in which the whole individual electrodes of the electrode array 102 are driven being divided into two groups. For facilitating understanding of the operation, FIG. 17 shows the case of all-mark recording such that all over the surface of the recording paper 108 is entirely recorded out in black. The electrode array 102 is divided into even-number individual electrode group shown by hatched lines and odd-number individual electrode group shown by white, as shown by (a) in FIG. 17, and driven in unit of the divided group. Further, A, B, C and D shown in FIG. 17 show voltages applied to the respective individual electrode groups at predetermined time intervals.

Now, as shown by the timing A in FIG. 17, when a first voltage V1 is applied to the even-number individual electrode group and a second voltage V2 is applied to the odd-number individual electrode group, since V1<V2, if the ink 106 contains the color material components charged on the plus side, the color material components are attached toward the even-number individual electrodes and then cohered thereat. After a predetermined time period T1 has elapsed, that is, at the timing shown by B in FIG. 17., the second voltage V2 is applied to the even-number individual electrode group and the first voltage V1 is applied to the odd-number individual electrode group, so that the color material components are attached toward the odd-number individual electrodes and then cohered thereat.

In FIG. 17, C shows the state obtained after another predetermined time period T1 has elapsed after B; and D shows the state obtained after still another predetermined time period T1 has elapsed after C, respectively.

As described above, in this embodiment, the two voltages V1 and V2 are applied to the even-number individual electrode group and the odd-number individual electrode group alternately at constant time (T1) intervals. In other words, the two voltages V1 and V2 are applied to the electrode array 102 in such a way that a potential difference (V1) between the first individual electrodes nearest to the positions at which ink drops are to be ejected and the recording paper 108 becomes lower than a potential difference (V2) between the second individual electrodes adjacent to the first individual electrodes 401 and the recording paper 108. Here, the first individual electrodes are the even-number individual electrodes 402 during the periods of A and C but the odd-number individual electrodes 401 during the periods of B and C; and the second individual electrodes are the odd-number individual electrodes 401 during the periods of A and C but the even-number individual electrodes 402 during the periods of B and C, respectively.

In other words, the above-mentioned voltage application operation is repeated periodically by changing the positions of the first and second individual electrodes alternately at a period of T1. Owing to the above-mentioned operation, the charged color material components are discharged at a period T1 from the first individual electrodes having a lower potential difference V1 relative to the recording paper 108 toward the recording paper 108 as ink drops 310. On the other hand, in the vicinity of the second individual electrodes having higher potential difference V2 relative to the recording paper 108, since the charged color material components are scattered along the divergent electrostatic force lines and thereby a sufficient electrostatic force is applied to the ink, the ink drops are not ejected and jetted. As described above, it is possible to form pixels on the recording paper 108 at positions corresponding to all the individual electrodes of the electrode array 102.

Figure 18:
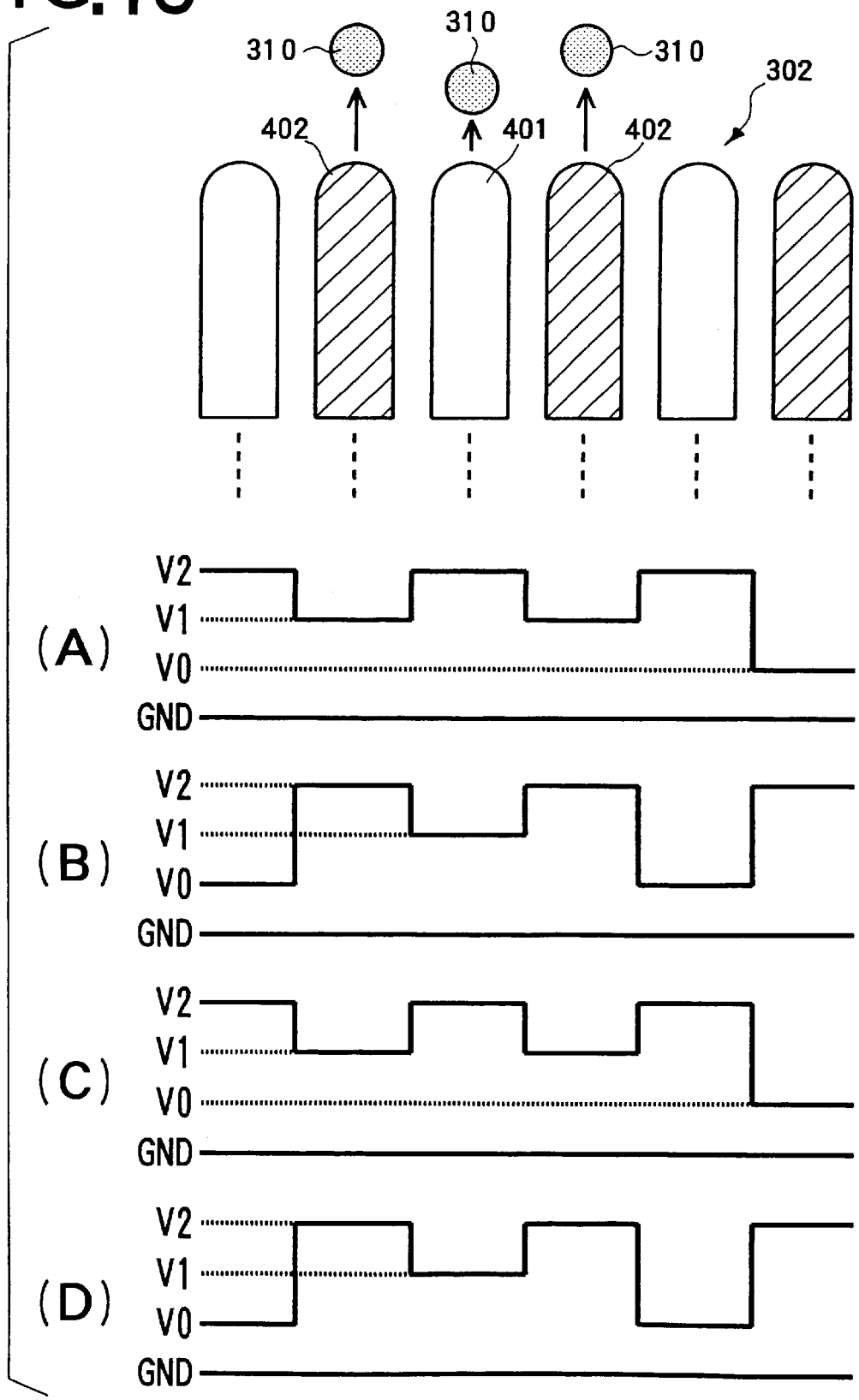
FIG. 18 is a timing chart of voltages applied to the electrode array, for assistance in explaining the seventh embodiment of the driving method of the ink jet recording apparatus according to the present invention, in which the actual recording is made.

The practical image recording operation will be explained hereinbelow. In the actual recording, as shown in FIG. 18, a third voltage V2 or the first voltage V1 are applied from the driving circuit 107 to the even-number individual electrode group and the odd-number individual electrode group, respectively in accordance with recorded image signals, so that ink drops 310 containing the cohered color material components are ejected from the vicinity of the individual electrodes (to which the third voltage V2 is applied) and then jetted toward the recording paper 108, to record an image on the recording paper 105.

As described above, a series of the operations are repeated at a period of (T1+T1) in such a way that the color material components are cohered at the even-number individual electrodes and then the ink drops are jetted from the predetermined electrodes in accordance with the image signals. After that, the color material components are cohered at the odd-number individual electrodes and then ink drops are jetted from the predetermined electrodes in accordance with the image signals, with the result that an image can be recorded on the recording paper 108 at a resolution decided by a pattern of the electrode array 102.

(Eighth embodiment)

The eighth embodiment of the electric array driving method according to the present invention will be described hereinbelow with reference to FIG. 19. This eighth embodiment is different from the seventh embodiment shown in FIG. 18 in the following points:

In the seventh embodiment shown in FIGS. 18, the second voltage V1 is applied to the first individual electrodes (the nearest to the positions at which ink drops are ejected) continuously for a period T1 in such a way that the first potential difference relative to the recording paper 108 becomes a potential difference high enough to jet the ink drops 310.

Figure 19:
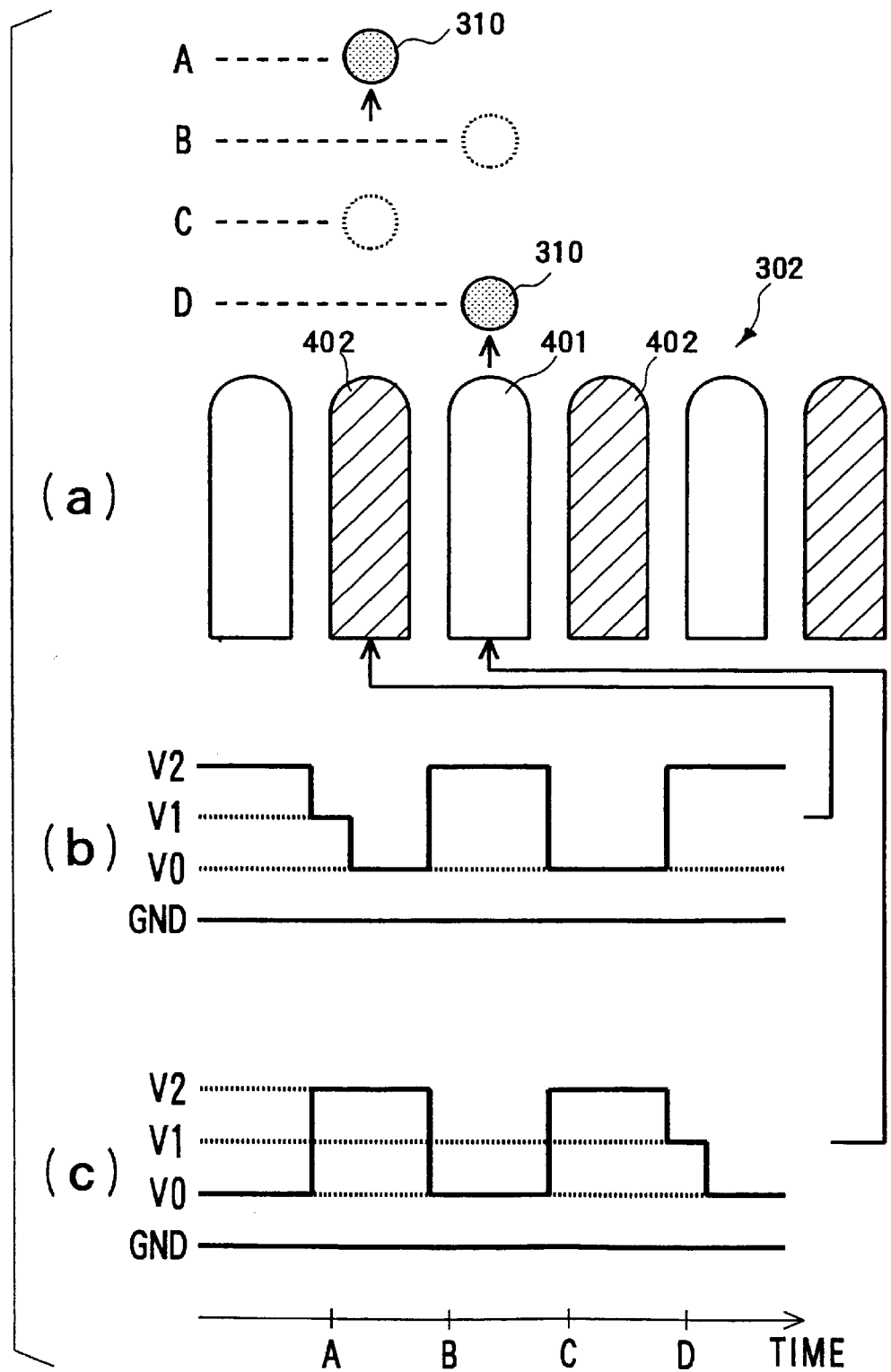
FIG. 19 is a timing chart of voltages applied to the electrode array, for assistance in explaining the eighth embodiment of the driving method of the ink jet recording apparatus according to the present invention, in which the actual recording is made.

In contrast with this, in this eighth embodiment shown in FIG. 19, the voltage applied to the first individual electrodes is further lowered in the time periods other than the time periods during which the ink drops are jetted, in such a way that the first potential difference between the first individual electrodes (the nearest to the positions at which ink drops are ejected) and the recording paper 108 becomes a potential difference low enough not to jet the ink drops 310; that is, a third voltage V0 is applied. Further, in FIG. 19, the first individual electrodes are the even-number individual electrodes 402 during the periods of A and C but the odd-number individual electrodes 401 during the periods of B and C; and the second individual electrodes are the odd-number individual electrodes 401 during the periods of A and C but the even-number individual electrodes 402 during the periods of B and C, respectively.

In this eighth embodiment of the driving method, since the time period during which the voltage V1 is kept applied can be minimized, the fluctuation of the averaged value of the applied voltages (which depends upon the recorded pattern) can be reduced, so that the charged color material components are less biased and thereby it is possible to obtain such a practical effect that an image of less density non-uniformity can be recorded. Further, when the time duration during which the voltage V1 is kept applied is controlled according to the gradation data of the image signals; that is, when the pulse width modulation control is effected, there exists such an advantage that it is possible to record an image with gradation.

(Nine embodiment)

The ninth embodiment of the electric array driving method of the ink jet recording apparatus according to the present invention will be described hereinbelow with reference to FIG. 20. This ninth embodiment is different from the eighth embodiment shown in FIG. 19 in the following points:

In the seventh and eighth embodiments shown in FIGS. 18 and 19, the second voltage V1 is applied to the first individual electrodes (the nearest to the positions at which ink drops are discharged) from the start of the period T1 in such a way that the first potential difference between the first individual electrodes and the recording paper 108 becomes a potential difference V1 high enough to eject the ink drops 210.

Figure 20:
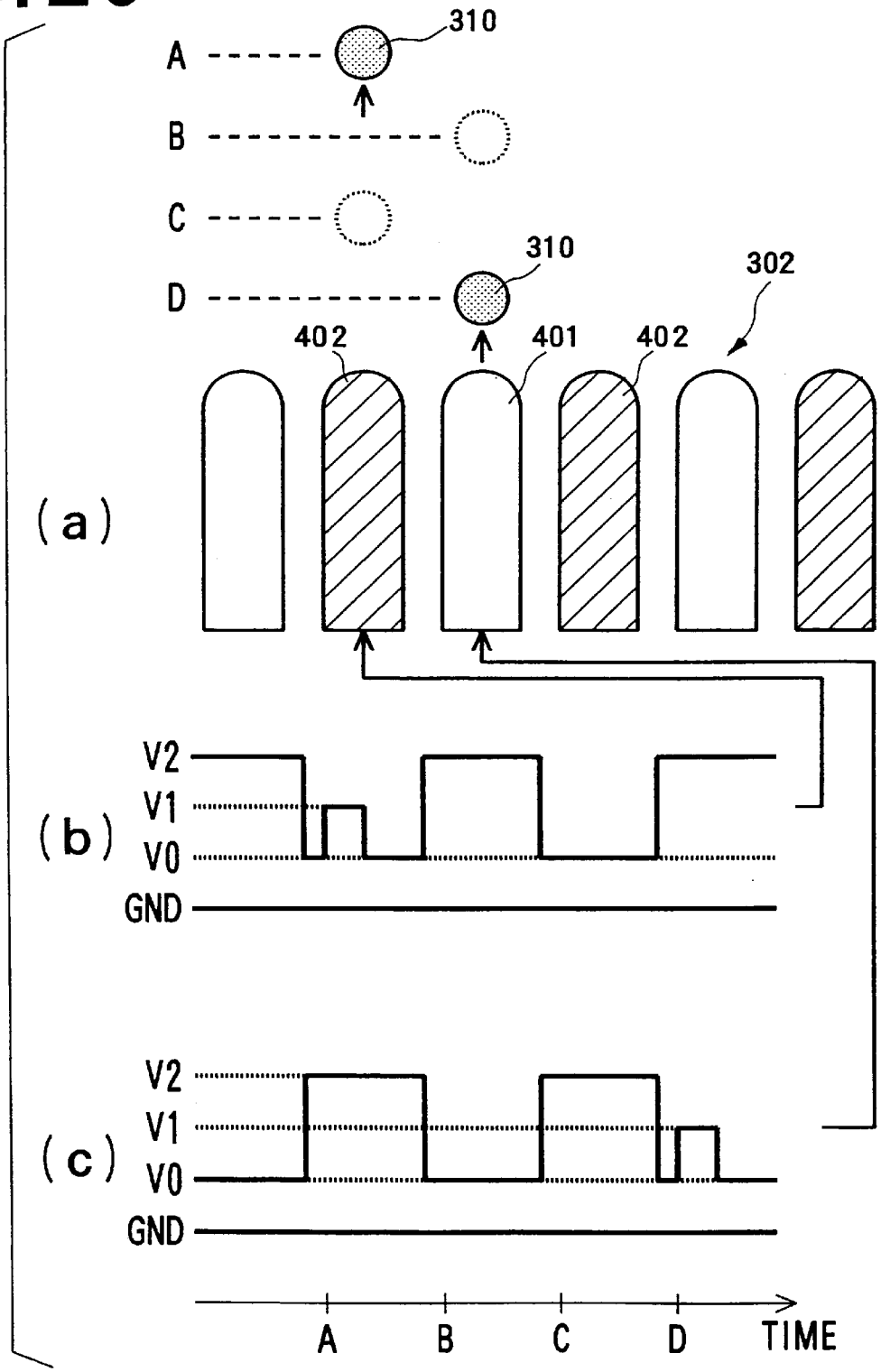
FIG. 20 is a timing chart of voltages applied to the electrode array, for assistance in explaining the ninth embodiment of the driving method of the ink jet recording apparatus according to the present invention, in which the actual recording is made.

In contrast with this, in this ninth embodiment shown in FIG. 20, at the start of the period T1, the voltage V0 is applied to the first individual electrodes to lower the first potential difference (V0) to such an extent as not to eject the ink drops 310, and further after this potential difference has been kept applied at a constant time (a delay time), the voltage V1 is applied to the first individual electrodes, by slightly shifting the timing, so that the first potential difference becomes V1 high enough to eject ink drops. Further, in FIG. 20, the first individual electrodes are the even-number individual electrodes 402 during the periods of A and C but the odd-number individual electrodes 401 during the periods of B and C; and the second individual electrodes are the odd-number individual electrodes 401 during the periods of A and C but the even-number individual electrodes 402 during the periods of B and C, respectively.

In this ninth embodiment of the driving method, since the ink drops can be discharged and jetted at an appropriate timing after the color material components have been sufficiently cohered on the first individual electrodes by electrophoresis, it is possible to obtain further stable ink jetting characteristics.

(Tenth embodiment)

In the seventh to ninth embodiments, the first individual electrodes which are set to the first potential difference relative to the recording paper (high enough to eject ink drops) and the second individual electrodes (adjacent to both the first electrodes) which are set to the second potential difference relative to the recording paper (low enough not to eject ink drops) are switched alternately at a constant period T1. In this tenth embodiment, however, the electrodes which serve as the first individual electrodes and the electrodes which serve as the second individual electrodes are formed independently from each other.

Figure 21:
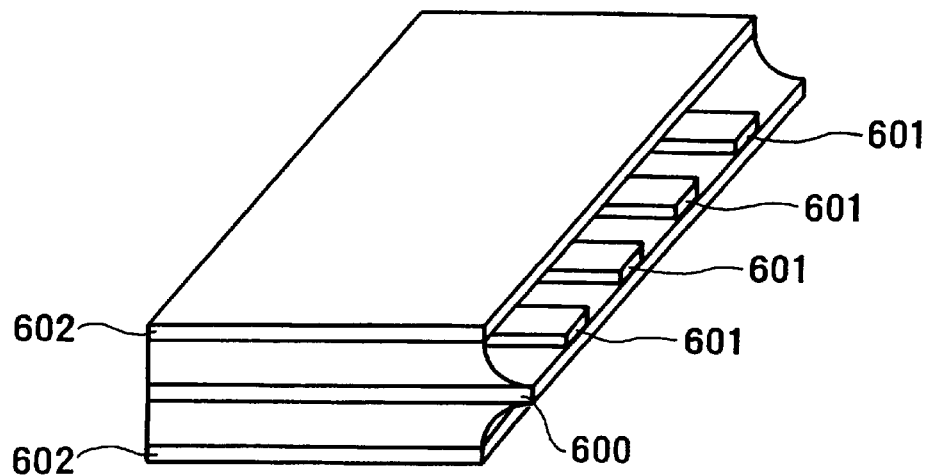
FIG. 21 is a perspective view showing a structure of a tenth embodiment of the recording head of the ink jet recording apparatus according to the present invention.

FIG. 21 shows an essential portion of this tenth embodiment of the ink jet recording head, in which an electrode array 601 is arranged on a head substrate 600. Further, two plate-shaped common electrodes 602 are arranged in parallel to the head substrate 600 and so as to face the electrode array 601. Here, a plurality of the individual electrodes constituting the electrode array 601 are used as the first individual electrodes of the seventh embodiment, and the common electrodes 601 are used as the second individual electrodes of the seventh embodiment. Further, voltages are applied to the electrode array 601 and the common electrodes 602, respectively by the driving circuit (shown in FIG. 1) in such a way that the first potential difference between the first individual electrodes (the nearest to the ink ejecting positions) and the recording paper becomes lower than the second potential difference between the common electrodes 602 and the recording paper.

Figure 22:
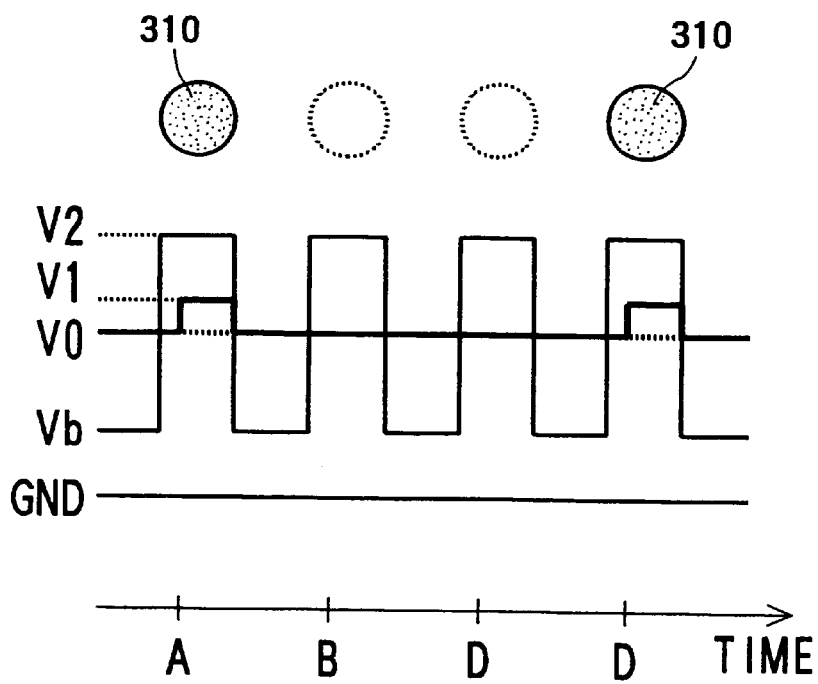
FIG. 22 is a pattern of voltages applied to the electrode array, for assistance in explaining the tenth embodiment of the driving method of the ink jet recording apparatus according to the present invention.

FIG. 22 shows a voltage pattern of this tenth embodiment, in which the thin solid lines denote the voltage applied to the individual electrodes of the electrode array 601 and the thick solid lines denote the voltage applied to the common electrodes 602. As understood by FIG. 22, this driving method is basically the same as with the case of the seventh embodiment. Further, the point that after the first potential difference between the individual electrodes of the electrode array 601 (which corresponds to the first individual electrodes) and the recording paper has been once set to a potential difference low enough not to eject the ink drops for a constant period (during which the voltage VO is kept applied), this potential difference is shifted to another potential difference high enough to eject the ink drops for a period (during which the voltage V1 is kept applied) with a time delay is quite the same as with the case of the ninth embodiment.

Further, the driving circuit for applying the first to third voltages to the respective individual electrodes is basically the same as that already explained with reference to FIGS. 6 and 7.

III. The embodiment of the ink jet recording apparatus for achieving the third object will be described hereinbelow with reference to the attached drawings.

(Eleventh embodiment)

Figure 23:
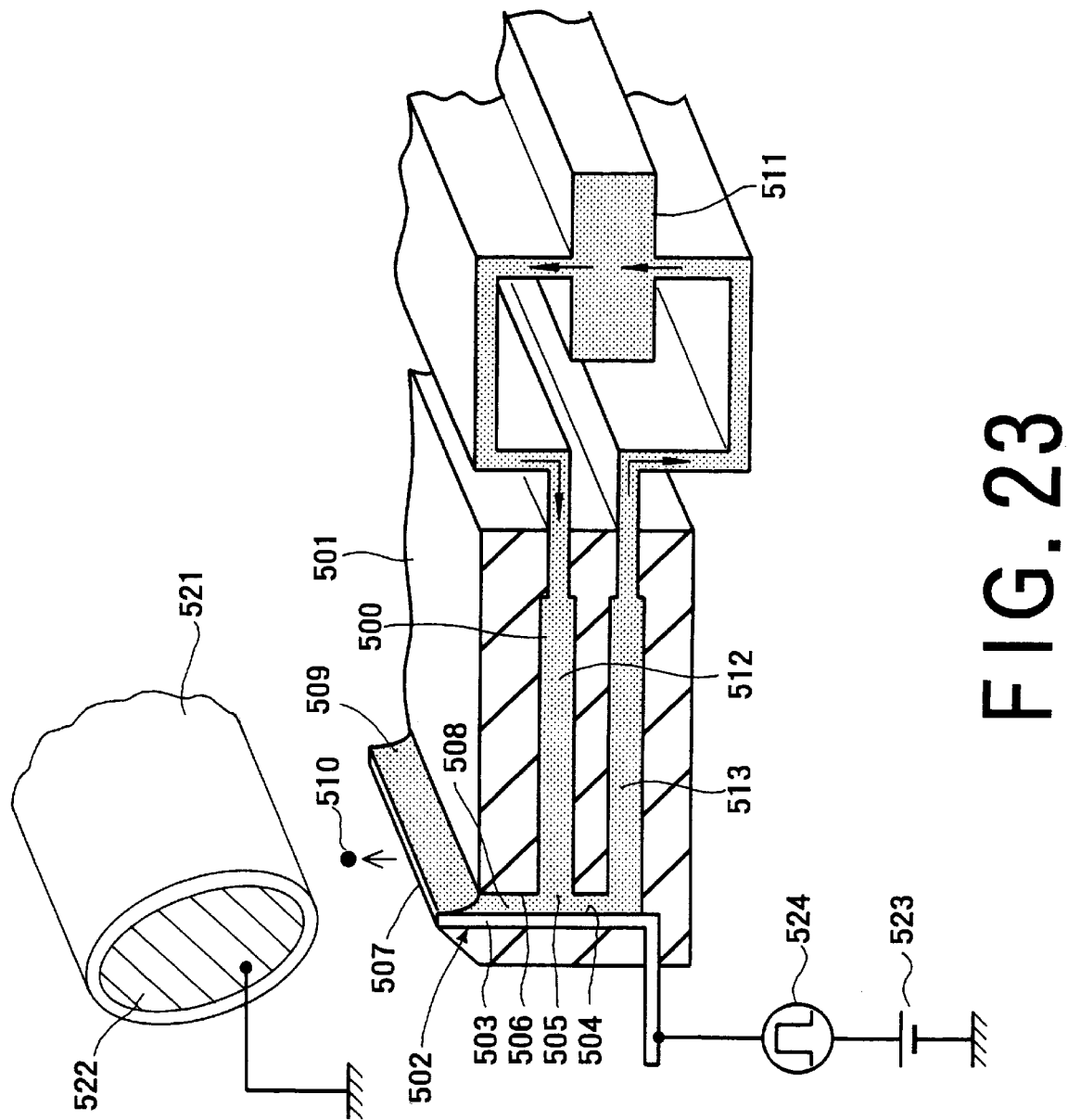
FIG. 23 is a perspective cross-sectional view showing an eleventh embodiment of the line-scanning type ink jet head section of the ink jet recording apparatus according to the present invention.
Figure 24:
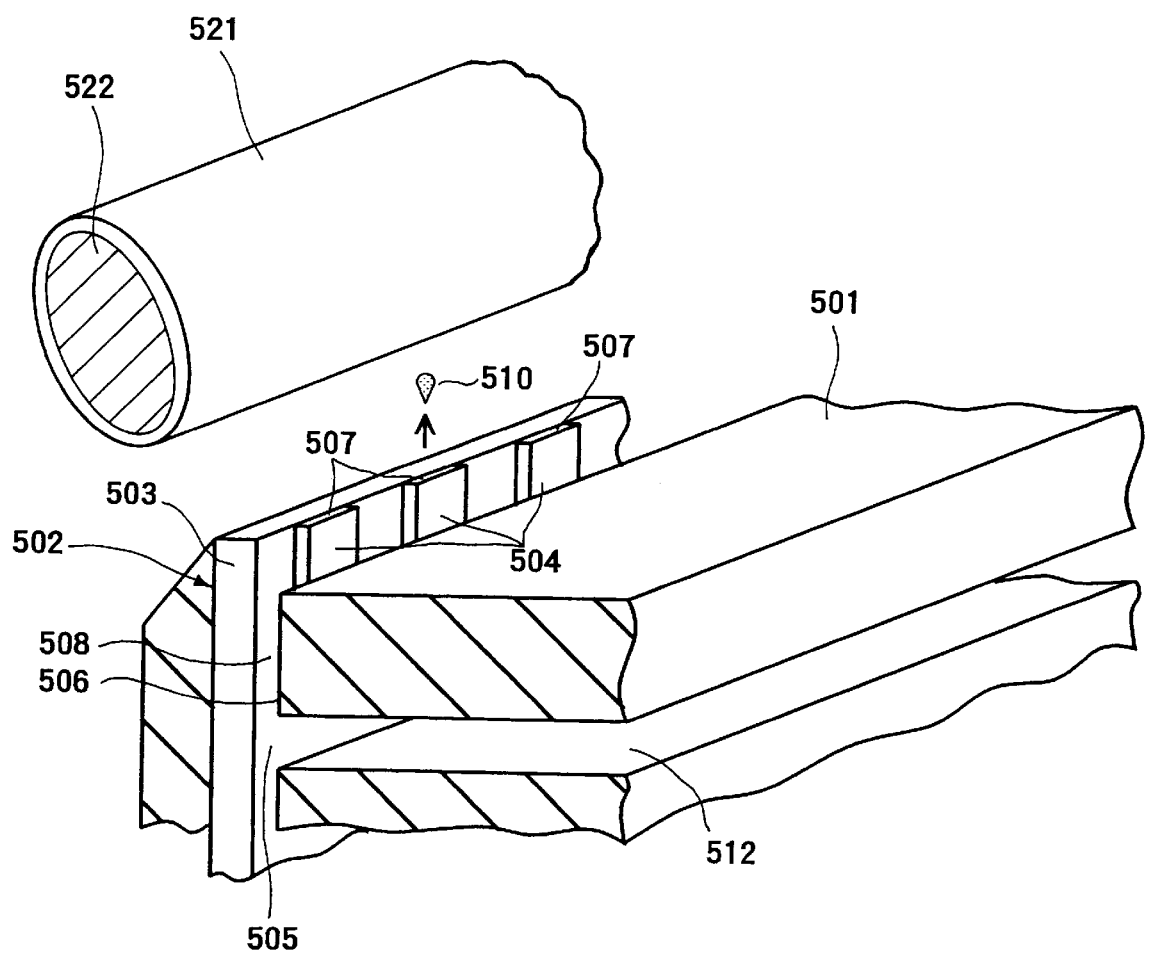
FIG. 24 is an enlarged perspective cross-sectional view showing only the essential portion of the ink jet head section shown in FIG. 23.

FIG. 23 shows the construction of an eleventh embodiment of the line-scanning type ink jet head of the ink jet recording apparatus according to the present invention, and FIG. 24 shows an essential enlarged portion thereof. In these drawings, ink 500 is obtained by dispersing and floating plus-charged color material components in colloidal state in an insulation solvent having a resistivity of $10^8 \Omega$ cm or more, together with a charge control agent and a binder. The ink is moved from a circulating mechanism 511 composed of a pump and an ink path to the upper portion of a head substrate 502 through an ink supply path 512 formed in a head block 501; and further returned to the ink circulating mechanism 511 through an ink returning (collecting) path 513 formed in the head block 501.

As shown in FIG. 24, the head substrate 502 is formed with an electrode array 504 composed of a plurality of stripe-shaped individual electrodes 507 extending in the vertical direction on the insulation substrate 503 and arranged in correspondence to respective pixels arranged in the horizontal direction (the main scanning direction). In this embodiment, the head substrate 502 is arranged roughly in the vertical direction. The ink circulating mechanism 511, an ink supply path 512 and an ink returning (collecting) path 513 constitute an ink circulating mechanism for circulating the ink to an ink supply position 505 located downward from the upper end of the head substrate 502.

On the other hand, a part of the vertical end surface (facing the head substrate 502) of the head block 501 forms a nozzle forming surface 506. Between this nozzle forming surface 506 and the head substrate 502, a slit-shaped nozzle 508 is formed so as to extend from the ink supply position 505 of the head substrate 502 to the ink drop jetting position at an end (the upper end) of the head substrate 502. This slit-shaped nozzle 508 extends in the horizontal direction, that is, the arrangement direction of the electrode array 504. The thickness of the slit is determined 1 mm or less, for instance so as to move the ink 500 on the basis of capillary action. Further, the slit-shaped nozzle 508 is formed at such a position as to be located on the rear side of the ink drop jetting position 507 (at the end of the head substrate 502). In other words, the ink drop jetting position 507 at the end of the head substrate 502 projects from the nozzle forming surface at the end surface of the head block 501.

A recording medium (paper) 521 is arranged at such a position as to be opposed to the end of the head substrate 502. On the back side of the recording medium 521 remote from the head substrate 502, an opposing electrode 522 used in common as a platen is arranged to guide the recording medium 521.

The recording operation of this embodiment of the ink jet recording apparatus will be described hereinbelow.

In recording, the ink 500 is supplied from the ink circulating mechanism 511 to the ink supply position 505 on the head substrate 502 through the ink supply path 512. In the ink supplied to the ink supply position 505, the unused ink which cannot be jetted from the slit-shaped nozzle 508 without contributing to the recording, that is, the ink containing much solvent components (the density of the color material components is reduced) is returned from the ink supply position 505 to the ink circulating mechanism 511 through the ink returning (collecting) path 513.

Further, after having moved vertically along the slit-shaped nozzle 108 on the basis of capillary action, part of the ink supplied to the ink supply position 505 is adhered onto the electrode array 504 of the head substrate 502 at the uppermost position of the slit-shaped nozzle 508 by the surface tension, so that a thin ink layer 509 can be formed.

Here, a DC voltage of 1.5 kV, for instance is always applied from a bias voltage supply 523 to the electrode array 504, and in addition pulse voltage signals of 500 V, for instance is superposed upon this bias voltage as the signal voltages corresponding to image signals supplied from a signal voltage source 524. On the other hand, the opposing electrode 522 provided on the back side of the recording medium 521 is connected to the ground potential (0 V).

Now, when the individual electrodes of the electrode array 504 are turned on (500 V is applied) and further this voltage of 500 V is superposed upon the bias voltage of DC 1.5 kV (2 kV in total), since a thin ink layer 509 is cohered on the turned-on individual electrodes of the electrode array 504, the cohered color material components are jetted from the ink drop jetting position 507 of the upper ends of the individual electrode as the ink drops, and then attracted by the opposing electrodes 522 toward the recording medium 521, so that an image can be formed on the recording medium 521.

As described above, in this embodiment, the slit-shaped nozzle 508 is formed independently from the ink circulating system composed of the ink returning (collecting) mechanism 511, the ink supplying path 512 and the ink returning (collecting) path 513, between the head substrate 502 and the nozzle forming surface 506; the thin ink layer 509 is formed by passing the ink through the slit-shaped nozzle 508 on the basis of capillary action to the ink drop jetting position 507; and the ink drops 110 are jetted from the thin ink layer 509 toward the recording paper 521.

In this embodiment, since the thickness of the thin ink layer 509 formed at the ink drop jetting position 507 at the end of the head substrate 502 is not subjected to the influence of the pressure of the ink 500 supplied onto the head substrate 502 and the atmosphere, it is possible to maintain the ink layer thickness at a constant very thin value. Therefore, it is possible to stabilize the jetting of the ink drops 510, so that an excellent image of stable density can be obtained on the recording medium 521.

Further, in this embodiment, the head substrate 502 and the nozzle forming surface 506 are formed in the vertical direction, that is, the nozzle 508 is formed extending in the vertical direction. Therefore, After having moved upward on the basis of the capillary action through the slit-shaped nozzle 508, the ink forms the thin ink layer 509 on the head substrate by the surface tension. Therefore, there exists another effect such that the ink supplied to the upper end of head substrate 502 is not dropped by gravity and vibrations, so that it is possible to prevent the recording density from being reduced or the recording paper from being stained by the ink.

(Twelfth embodiment)

Figure 25:
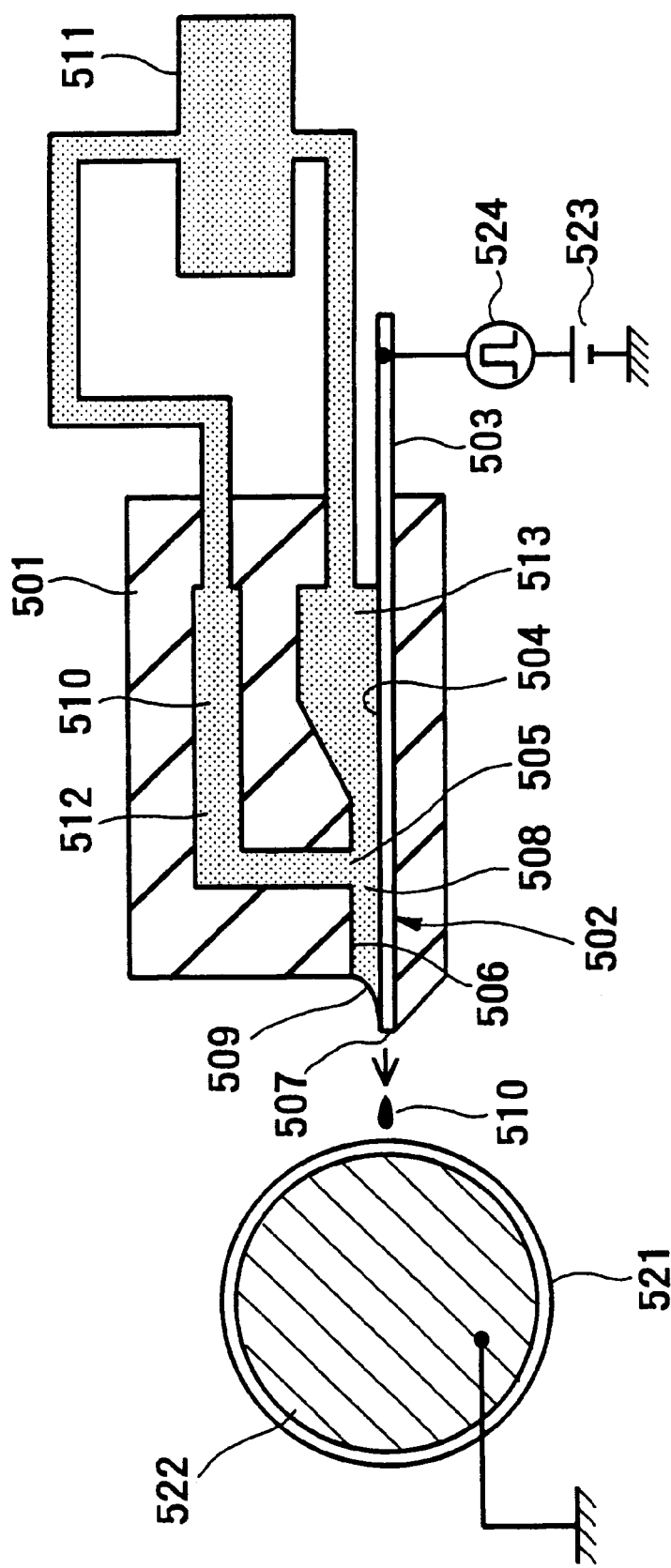
FIG. 25 is a cross-sectional view showing a twelfth embodiment of the line-scanning type ink jet head section of the ink jet recording apparatus according to the present invention.
Figure 26:
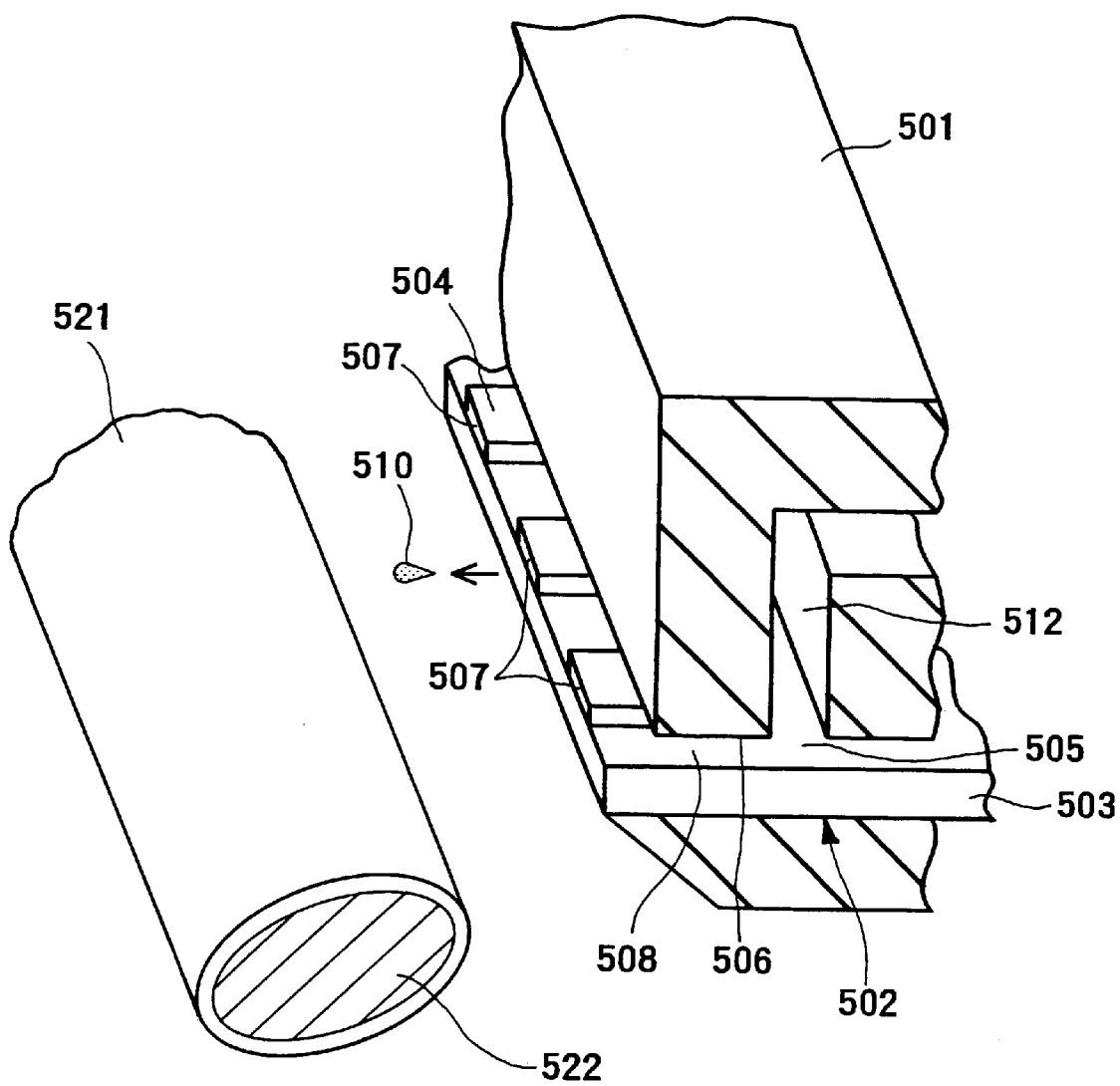
FIG. 26 is an enlarged perspective cross-sectional view showing only the essential portion of the ink jet head section shown in FIG. 25.

FIG. 25 shows the construction of a twelfth embodiment of the line-scanning type ink inject head of the ink jet recording apparatus according to the present invention, and FIG. 26 shows an essential enlarged portion thereof, in which the same reference numerals have been retained for similar parts or elements having the same functions as with the case of the eleventh embodiment shown in FIGS. 23 and 24, without repeating the similar description thereof.

This twelfth embodiment is different from the eleventh embodiment in that the head substrate 502 having the electrode array 504 arranged on the upper surface thereof and the slit-shaped nozzle 508 are both disposed roughly horizontally. The effect and the function of this embodiment are basically the same as with the case of the eleventh embodiment.

(Thirteenth embodiment)

Figure 27:
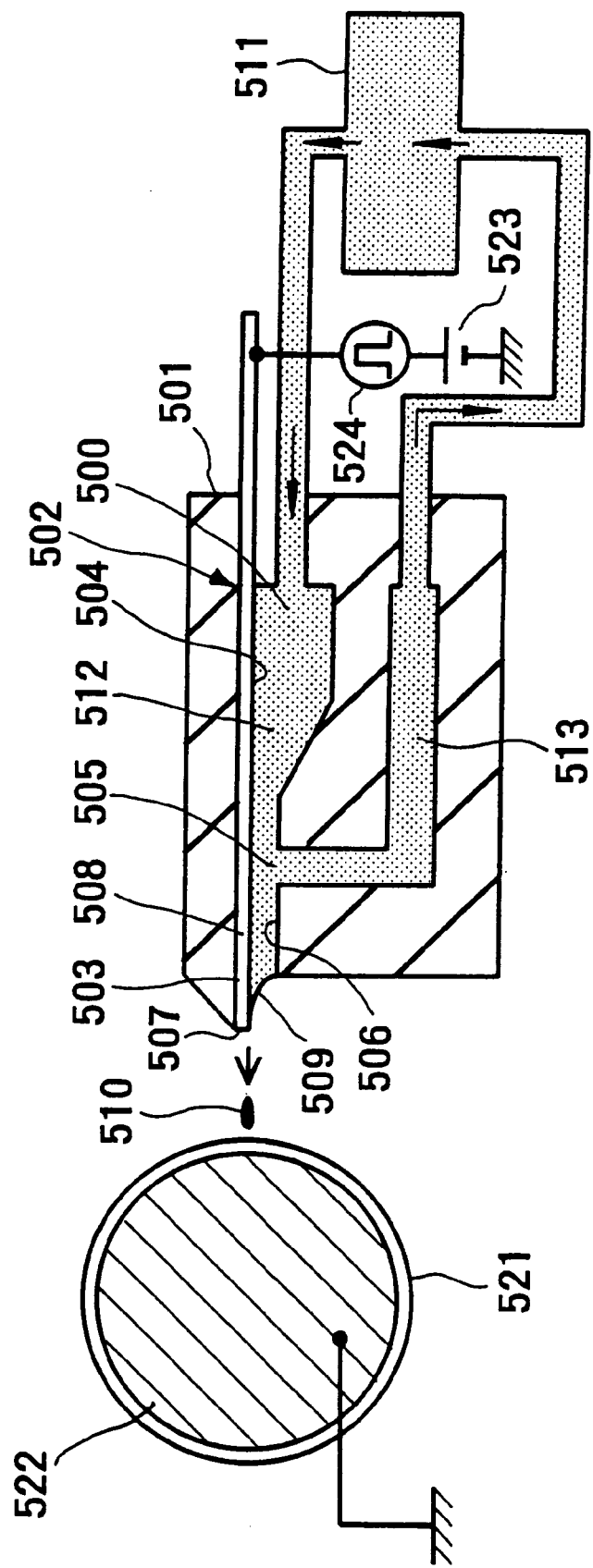
FIG. 27 is a cross-sectional view showing a thirteenth embodiment of the line-scanning type ink jet head section of the ink jet recording apparatus according to the present invention.
Figure 28:
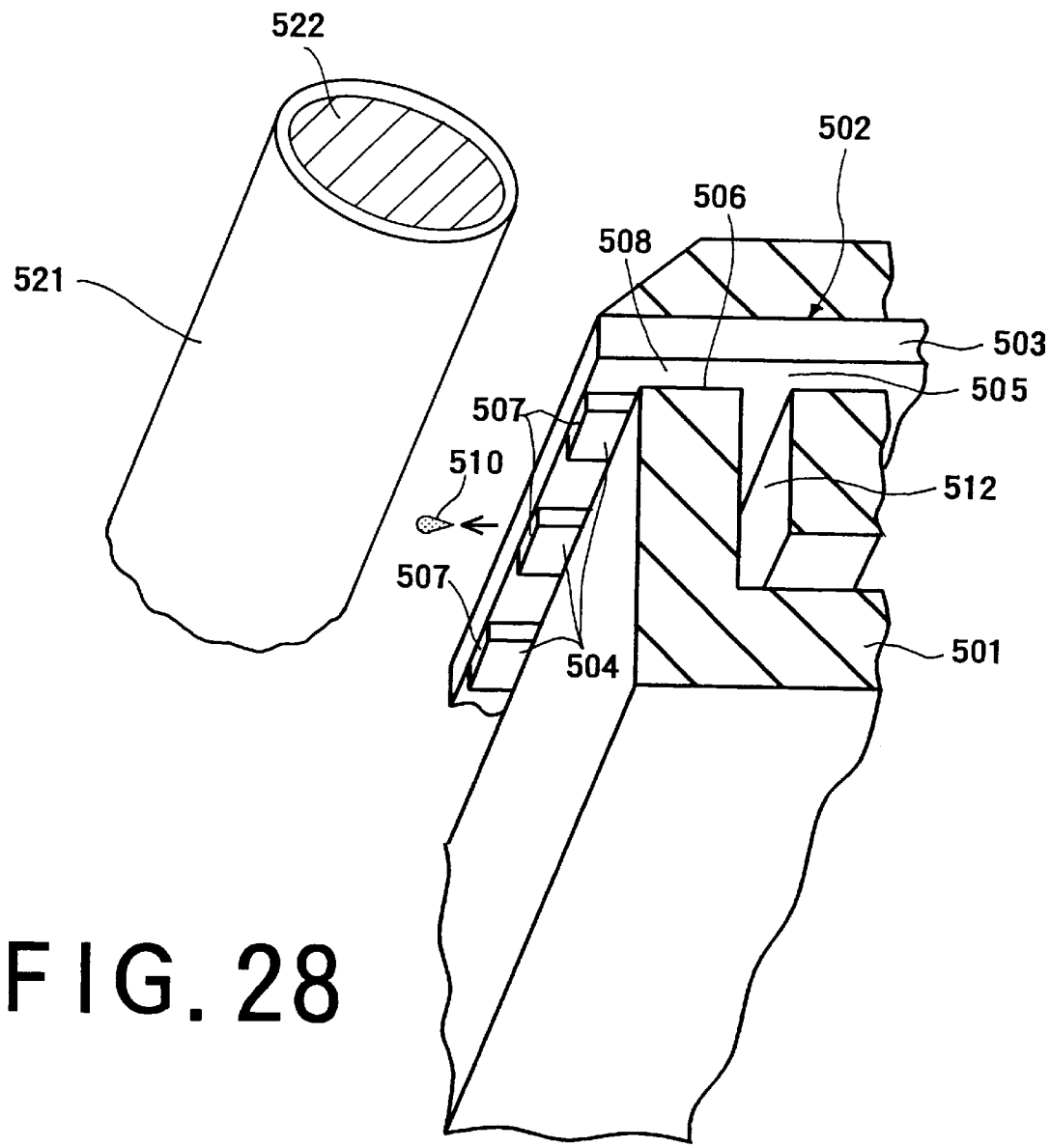
FIG. 28 is an enlarged perspective cross-sectional view showing only the essential portion of the ink jet head section shown in FIG. 27.

FIG. 27 shows the construction of a thirteenth embodiment of the line-scanning type ink inject head of the ink jet recording apparatus according to the present invention, and FIG. 28 shows an essential enlarged portion thereof, in which the same reference numerals have been retained for similar parts or elements having the same functions as with the case of the embodiments shown in FIGS. 23 to 26 without repeating the similar description thereof.

This thirteenth embodiment is different from the eleventh embodiment in that the head substrate 502 having the electrode array 504 arranged on the lower surface thereof (which is opposite to the twelfth embodiment) and the slit-shaped nozzle 508 are both disposed roughly horizontally. The effect and the function of this embodiment are basically the same as with the case of the eleventh embodiment.

(Fourteenth embodiment)

Figure 29:
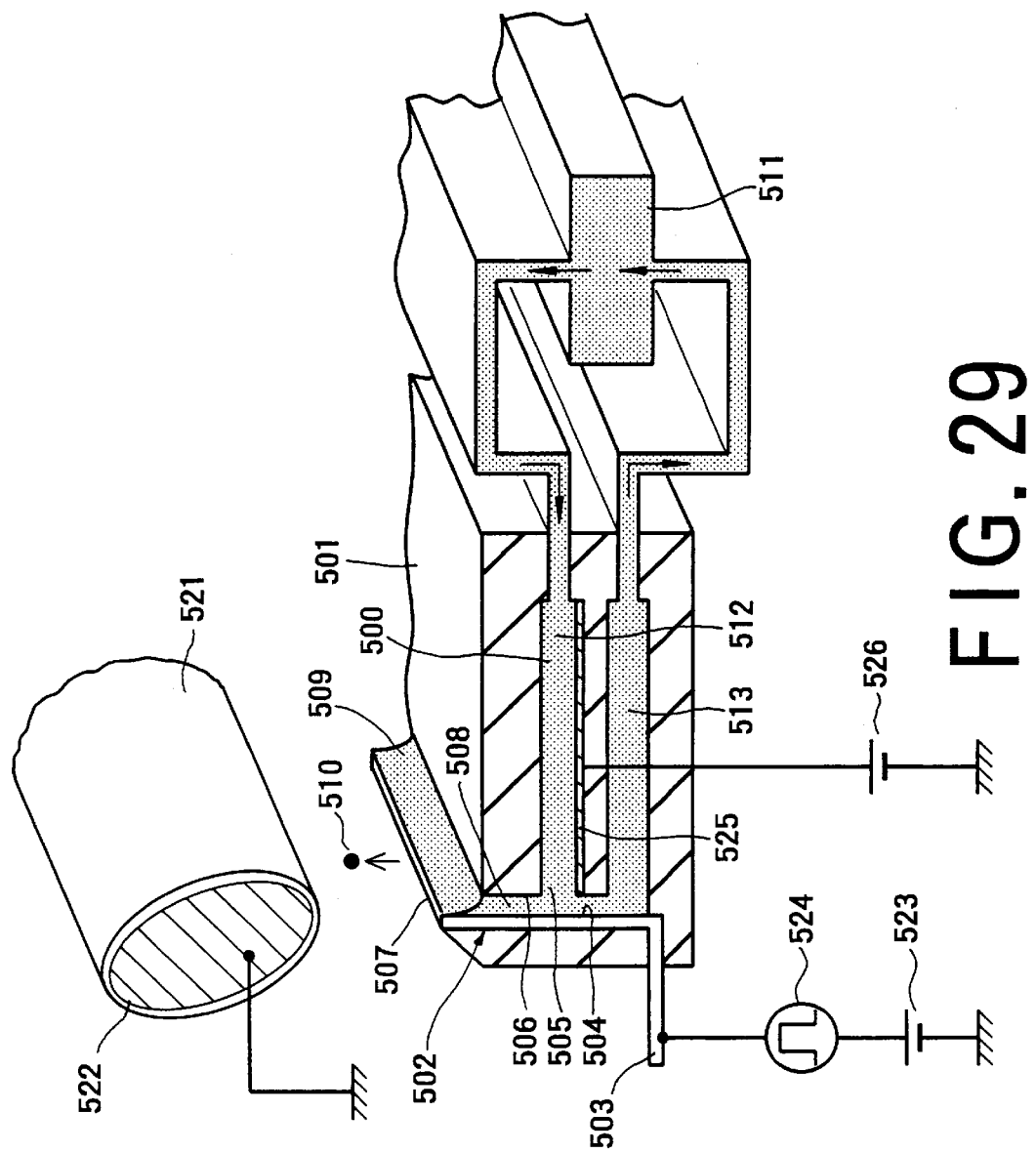
FIG. 29 is a perspective cross-sectional view showing a fourteenth embodiment of the line-scanning type ink jet head section of the ink jet recording apparatus according to the present invention.

FIG. 29 shows the construction of a fourteenth embodiment of the line-scanning type ink inject head of the ink jet recording apparatus according to the present invention, in which the same reference numerals have been retained for similar parts or elements having the same functions as with the case of the eleventh embodiment shown in FIGS. 23 and 24 without repeating the similar description thereof.

This fourteenth embodiment is different from the eleventh embodiment in that the cohering electrode 525 is disposed in the ink supply path 512. A DC voltage the same in polarity (plus in this embodiment) as the charged polarity of the color material components of the ink 500 is applied to this cohering electrode 525 by a DC voltage supply 525. Therefore, in this embodiment, since the plus-charged color material components in the ink 500 receives an electrostatic repellent force of an electric field generated by the cohering electrode 525, the color material components are supplied to the ink supply position 505 on the head substrate 502, and further toward the slit-shaped nozzle 508 under coherence conditions. Accordingly, since the density of the color material components can be reduced in the ink returning (collecting) path 513, it is possible to return the ink containing the large amount of solvent components to the ink returning (collecting) path 513.

In this embodiment, in addition to the effects of the eleventh embodiment, there exists such an advantage that it is possible to jet the ink drops 510 having the color material components of high density and thereby to record an image of high contrast on the recording medium 521. Further, the cohering electrode 525 of this embodiment can be of course assembled with the twelfth and thirteenth embodiments.

IV. Prior to the description of the invention for achieving the fourth object, a related art thereof will be first explained with reference to the attached drawing for facilitating understanding thereof.

Figure 30:
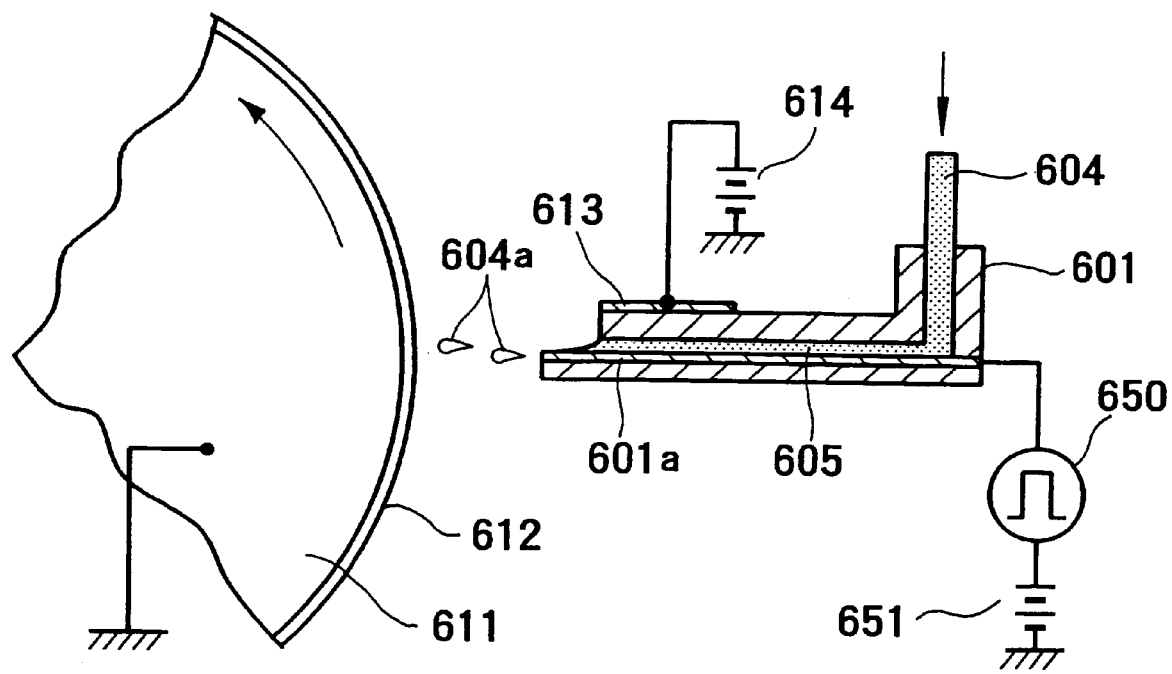
FIG. 30 is a diagrammatical view showing an ink jet recording apparatus related to the present invention.

FIG. 30 shows an ink jet recording apparatus related to the present invention, in which ink which contains charged color material components mixed with a solvent is used and further the ink is jetted after the density of the color material components have been increased.

As shown in FIG. 30, on a recording head 601, ink 604 containing charged color material components is supplied from an ink tank (not shown) in the arrow direction in an ink holding portion 605 constructed by a substrate and an upper lid.

Further, on the substrate of the recording head 601, a number of recording electrodes 601a are arranged as an electrode array, and connected to a control circuit 650.

On the other hand, on the upper lid of the recording head 601, an auxiliary electrode 613 for moving a color material components toward the end of the recording head 601 is provided. This auxiliary electrode 613 is connected to an auxiliary electrode voltage supply 614.

Further, a recording medium 612 is moved near the recording head 614 in the arrow direction in tight contact with a recording drum 611 connected to the ground potential.

The ink 604 contains color material components. As an example of the ink, a liquid development toner used for a liquid development type electronic photograph recording apparatus is well known. Here, the color material components contained in the ink 604 are charged to the pulse side, for instance.

Here, two bias voltages different from each other (e.g., 1.4 kV and 2.0 kV) are applied to the recording electrodes 601a and the auxiliary electrode 613, respectively, so that the charged color material components can be moved by electric field generated between these two electrodes.

In this case, since the potential of the auxiliary electrode 613 is set to a voltage higher than that of the recording electrode 601*a*, the plus-charged color material components are collected to near the recording electrode 601*a*, so that the density of the ink can be increased. Under these conditions, when a pulse signal voltage is supplied to the recording electrodes 601*a*, the collected color material components are discharged from the ends of the recording electrodes 601*a* by a repellent force of the recording electrodes 601*a* and an attractive force of the recording drum 611. The discharged ink drops 604*a* are jetted toward the recording medium 612 in the electric field between the recording electrodes 601*a* and the recording drum 611 by the electrostatic force, so that an image can be formed.

In the ink jet recording apparatus as described above, although the color material components in the ink holding portion can be moved to the end of the recording head 601 by the electric field formed between the recording electrodes 601*a* and the auxiliary electrode 613, when the direction of the electric field is reversed, it is possible to reversely collect the color material into the ink holding portion 605. In other words, one feature of this apparatus is that the color material can be controllably moved from and to the ink holding portion 605 according to the apparatus conditions.

In this apparatus, however, when the color material components are collected, since the ink density increases in the ink holding portion 605, there exists a possibility that the color material components adhere onto the inner portion of the ink holding portion 605. Once the color material components adhere thereto, since the quantity of the color material components to be discharged decreases and further since the adhered color material components obstruct the movement of the moving color material components, there exists a problem in that it is difficult to supply the color material components to end of the ink holding portion continuously.

Further, when the apparatus is left for many hours on condition that the power is kept turned off, since the ink color material components tend to adhere inside the ink holding portion 605, even if the power is turned on again, the capability of supplying the ink color material components is reduced markedly, thus causing a problem in that the apparatus reliability deteriorates.

To overcome the above-mentioned problem, in the ink jet recording apparatus according to the present invention, a liquid ink containing color material components dispersed in an insulation solvent is used, and the liquid ink or the color material components contained in the ink are jetted by electric force. In this case, the ink is stirred by ink stirring means provided in the vicinity of the ink holding portion, so that the ink condition can be kept under an excellent condition. In particular, when the stirring means are stirring electrodes, since the potential difference is applied to the two ink stirring electrodes in such a way as to be reversed at a constant period, it is possible to realize the ink stirring operation by the electric field.

As a result, since the liquid ink can be always kept moved, it is possible to stir the liquid ink and thereby to prevent the color material components from adhering onto the ink holding portion.

Further, the ink can be stirred by use of an ultrasonic generating apparatus, instead of the stirring electrodes. In this case, it is possible to apply an ink stirring effect upon the ink without direct contact therewith.

Here, since a plurality of the stirring electrodes and the ultrasonic generating means are arranged, it is possible to prevent the color material components from adhering onto the whole recording apparatus.

Here, in the structure having the stirring electrodes, when the stirring electrodes are arranged in the vicinity of the recording electrodes for ejecting ink drops, the average voltage of the stirring electrodes is set higher than that of the recording voltage when the ink is being supplied but lower than that of the recording voltage when the ink is returned. As described above, it is possible to control the movement of the ink color material components by controlling the potential relationship between the stirring electrodes and the recording electrodes.

Further, in the structure having the stirring electrodes, when the recording electrodes for ejecting the ink drops and the ink carrying electrodes for carrying the ink to the recording electrodes are provided, if the stirring electrodes are arranged in the vicinity of the ink carrying electrodes, the average voltage of the stirring electrodes is set to higher than that of the ink carrying electrodes when the ink is supplied, but lower than that of the ink carrying electrodes when the ink is returned. As described above, when the potential relationship between the stirring electrodes and the carrying electrodes is controlled, it is possible not only to control the movement of the ink color material components but also to prevent the color material components from being moved by the carrying electrodes.

Further, the ink carrying electrodes and the stirring electrodes can be constructed in common. In this case, one of the common electrodes are used as the carrying electrodes and the other of the common electrodes are used as the stirring electrodes. In addition, the common electrodes can be constructed in such a way that the function boundary between both, that is, the combination of both can be changed freely. As a result, it is possible to eliminate the special stirring electrodes.

Further, in the structure having at least the ink stirring electrodes or the ultrasonic generating means for stirring the ink, it is preferable to arrange density detecting means in the vicinity of the stirring means. In this case, on the basis of the data of the density detecting means, the control signals applied to the stirring means can be adjusted. Further, a plurality of density detecting means are preferably arranged.

As described above, when the density detecting means are provided, since the actual status of the color material components can be observed, the presence or absence of the color material components or the effect of the stirring function can be verified. When the obtained data are feed-backed to control the stirring means, it is possible to prevent the color material components from adhering at a high reliability. Further, when a plurality of the density detecting means are provided, the reliability can be further increased.

Further, it is preferable that the density detecting means is composed of a light emitting section and a light receiving section. In this case, a part or all of the ink holding portion is formed so as to have light transmission characteristics, and the density detecting means can detect the ink density on the basis of the light transmission status obtained through the ink holding portion. Further, it is also preferable that a part or all of the stirring means are formed so as to have light transmission characteristics, and the density detecting means can detect the ink density on the basis of the light transmission characteristics obtained through the ink stirring means.

On the other hand, the density detecting means can be constructed by resistance measuring means for measuring a resistance between the two electrodes. In this case, a special large space is not required for the density detection. Further, when the electrodes for stirring the ink and the density detecting electrodes can be constructed by a single common electrode, there exists an advantage that the additional electrode for detecting the ink density is not required.

The embodiment of the ink recording apparatus for achieving the fourth object will be described hereinbelow with reference to the attached drawings.

(Fifteenth embodiment)

Figure 31:
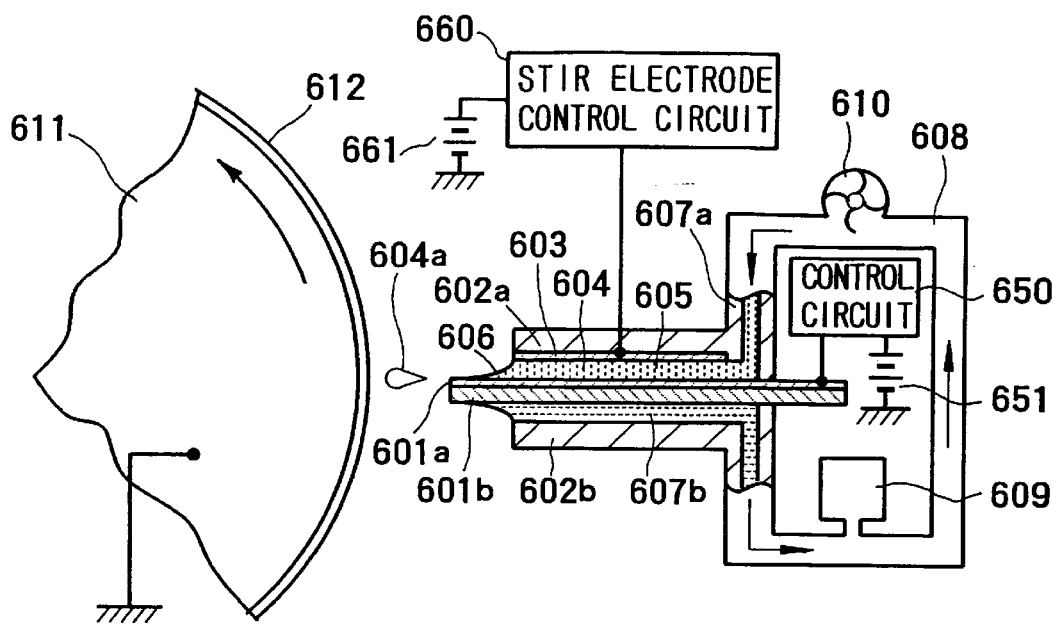
FIG. 31 is a diagrammatical view showing a fifteenth embodiment of the ink jet recording apparatus according to the present invention.

FIG. 31 shows the construction of the fifteenth embodiment of the ink jet recording apparatus according to the present invention.

In the drawing, the recording head comprises a head substrate 601b, an upper substrate 602a provided over the head substrate 601b, and a lower substrate 602b provided under the head substrate 601b. On the head substrate 601a, recording electrodes 601a are arranged to eject an ink drop 604a, respectively. The recording electrodes 601a are connected to a control circuit 650 to which a recording voltage supply 651 is connected.

An ink holding portion 605 is formed between the head substrate 601b and the upper substrate 602a and between the head substrate 601b and the lower substrate 602b, so that the ink 604 can be carried freely in the ink holding portion 605. To form the ink holding portion 605, the upper and lower substrates 602a and 602b are both arranged on both sides of the head substrate 601b via spacers with a thickness of about 500 µm, respectively.

On the lower surface (in contact with the ink 604) of the upper substrate 602a, a plurality of stirring electrodes 603 for stirring the color material components of the ink in the ink holding portion 605 are formed, which are all connected to a stirring electrode control circuit 660 to which a stirring voltage supply 661 is connected.

The ink 604 filled in the recording head contains plus-charged color material components having a charge control agent and a binder, which are dispersed and floated in an insulation solvent with a resistivity of $10^8$ Ω cm or higher in colloidal state.

The ink 604 is first filled in the ink holding portion 605 through an ink supply path 607a, and then supplied to a head end. The ink is deformed into a meniscus shape at a slit-shaped opening portion 606, as shown in FIG. 31. Near the slit-shaped opening portion 606, since the color material components are concentrated by the function of the stirring electrodes during recording, the density of the color material components are high.

At the outermost end of the head, the ink drop 604a of still higher density of the color material is ejected. The ink not ejected is returned around the head end, and then enters an ink returning (collecting) flow path 607b formed between the head substrate 601b and the lower substrate 602b, and flows into an ink circulating mechanism 608 connected to the head.

Here, since the color material density of the ink 604 in the ink returning (collecting) path 607b is lowered, the color material density is optimized by an ink density adjusting section 609 having an ink tank disposed in the ink circulating mechanism 608. Further, a pump 610 is provided in the ink circulating mechanism 608 in order to optimize the ink meniscus shape at the opening portion 606 and further to control the total flow rate of the ink 604.

In front of the head, a recording drum 611 connected to the ground potential is disposed so as to be opposed to the head with a gap of 500 µm or less, and a recording medium (e.g., paper) 612 for recording pixels on the surface thereof is wound around the recording drum.

Figure 32:
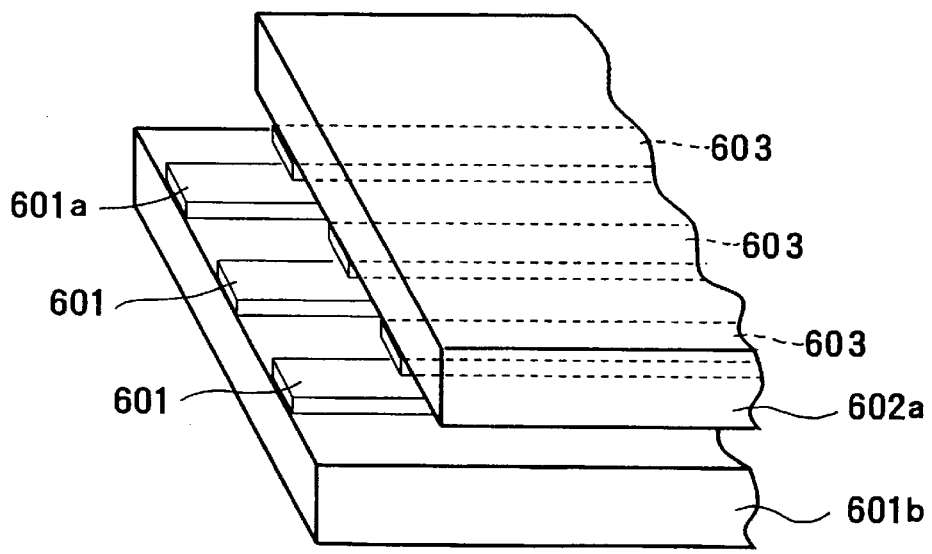
FIG. 32 is an enlarged perspective view showing the head end portion of the fifteenth embodiment of the ink jet recording apparatus shown in FIG. 31.

FIG. 32 is an enlarged perspective view showing only the end portion of the ink jet head.

As shown, the head substrate 601b is formed of a 50 µm-thick material having a low dielectric constant and a high strength such as polyimide, glass epoxy resin, phenol resin, Teflon, etc. Further, on the surface of the head substrate 601b, a plurality of rectangular recording electrodes 601a formed of copper and with a thickness of about 18 µm are arranged in a stripe shape. On the reverse surface of the upper substrate 602a, a plurality of rectangular stirring electrodes 603 formed of the same material (Cu) and with a thickness of about 18 µm are arranged in a stripe shape. The head substrate 601b projects about 1 mm from the outer end of the upper substrate 602a so that the thickness of the ink can be set to a thinner value at the outer end of the head substrate 601b.

The operation of the ink jet head constructed as described above will be explained hereinbelow.

Figure 33:
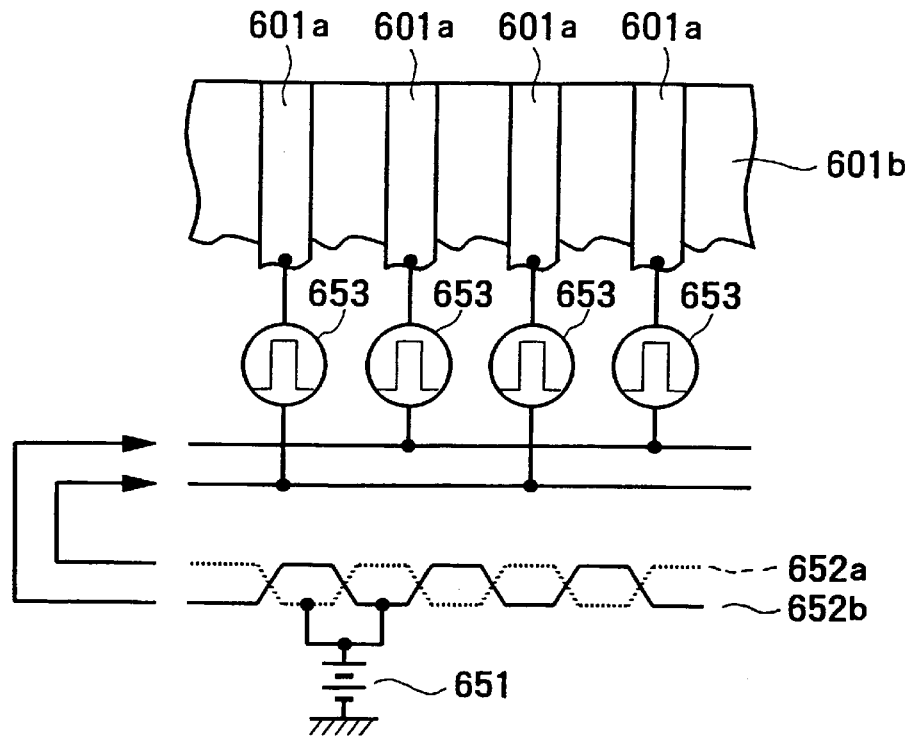
FIG. 33 is an illustration for assistance in explaining the control operation of the recording electrodes of the ink jet recording apparatus shown in FIG. 31.

To the recording electrodes 601a of the head substrate 601b, two voltages of waveforms as shown in FIG. 33 are applied by the control circuit 650. In more detail, a plurality of recording electrodes 601a are divided into two groups of even-number electrodes and odd-number electrodes, and the two voltages are obtained by superposing two continuous pluses 652a and 652b whose phases are shifted by a half period from each other upon the DC bias voltages of about 1.4 kV supplied by the recording voltage supply 651. When the voltages as described above are applied to the recording electrodes 601a, since a potential gradient (difference) reversed in a constant period can be generated and applied to the adjacent recording electrodes 601a, the ink color material components are always carried to the electrodes of lower potential. That is, since carried reciprocatingly between the respective recording electrodes 601a, the ink color material components can be always stirred. Further, the moment the potential becomes low, when a pulse signal 653 is applied to the recording electrodes 601a according to the image signals, it is possible to eject or jet the ink drops 604a, respectively.

Figure 34:
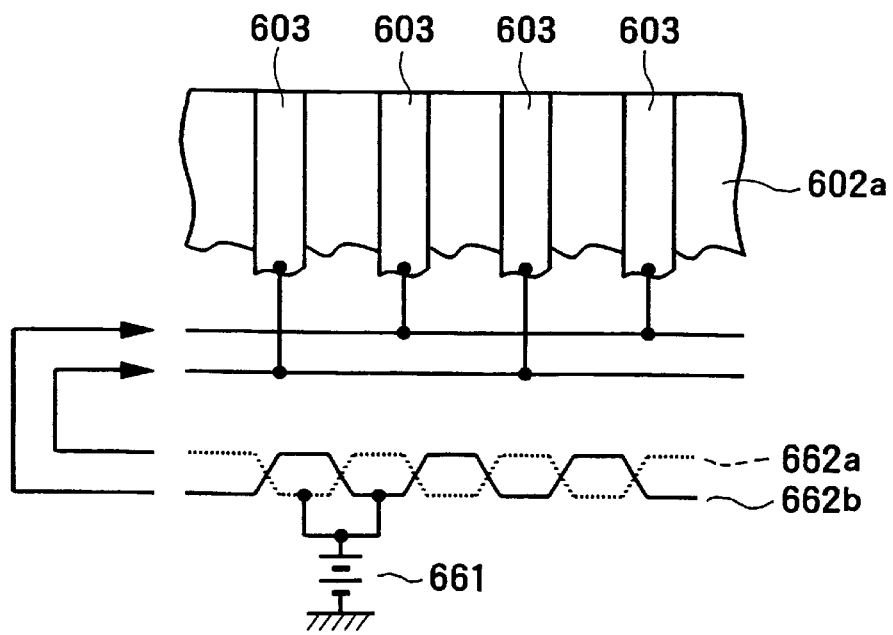
FIG. 34 is an illustration for assistance in explaining the control operation of the stirring electrodes of the ink jet recording apparatus shown in FIG. 31.

On the other hand, to the stirring electrodes 603 of the upper substrate 602a, two voltages of waveforms as shown in FIG. 34 are applied by the control circuit 50. In more detail, a plurality of stirring electrodes 603 are divided into two groups of even-number electrodes and odd-number electrodes, and the two voltages are obtained by superposing two continuous pluses 662a and 662b whose phases are shifted by a half period from each other upon the DC bias voltages supplied by the stirring voltage supply 661. When the voltages as described above are applied to the stirring electrodes 603, since a potential gradient (difference) reversed in a constant period can be generated and applied to the adjacent stirring electrodes 603, the ink color material components are always carried to the electrodes of lower potential. That is, since carried reciprocatingly between the respective stirring electrodes 603, the ink color material can be always stirred.

Here, during recording, since it is necessary to supply the ink color material components onto the recording electrodes 601a, the average voltage applied to the stirring electrodes 603 is set to a value higher than that applied to the recording electrodes 601a. For instance, when the DC bias voltage of the recording electrodes 601a ia denoted by Vpb; the amplitude of the continuous pulses 652a and 652b is denoted by Vpp; and the DC bias voltage applied to the stirring electrodes 603 is denoted by Vsb, it is possible to supply the color material components securely by adjusting these voltages so that the following relationship can be established:

$$Vsb \geq Vpb + Vpp \qquad (1)$$

In contrast with this, when the ink color material components adhered onto the recording electrodes 601a are required to be removed or when the recording is not made, the average voltage of the recording electrodes 601a is set to a value lower than that of the stirring electrodes 603. For instance, when the amplitude of the continuous pulses 662a and 662b of the stirring electrodes 603 are denoted by Vsp, these voltage are adjusted so that the following relationship can be established:

$$Vpb > Vsb + Vsp \qquad (2)$$

Here, when the average voltages can be reversed, since the ink color material components ar moved toward the ink holding portion 605, the density of the ink color material components is low at the head end, so that the components (e.g., insulation solvent) other than the color material components can be mainly held at the head end. In other words, the ink color material components are not easily adhered onto the head end. Conversely, although the ink density increases in the ink holding portion 605, since the ink color material components are always carried between the adjacent electrodes and thereby stirred, the possibility that the color material components adhere onto the electrode is low.

Further, the above-mentioned electrode voltage setting is not limited to only the above-mentioned formulae; that is, the similar effect as described above can be obtained when the duty factors of the DC bias voltage and the continuous pulse voltages 662a and 66b of the stirring electrodes are adjusted appropriately under due consideration of the potential difference of these averaged voltages.

As described above, since the stirring electrodes 603 for stirring the ink color material components are arranged in the ink holding portion 605, even if the density of the color material components returned to the ink holding portion 605 increases, it is possible to prevent the ink color material components from adhering onto the ink holding portion 605.

Further, when the stirring electrodes are arranged in the close vicinity of the recording electrodes 601a, since the color material component density at the head end can be adjusted by controlling the potential relationship between the stirring electrodes 603 and the recording electrodes 601a, it is possible to supply the ink color material components smoothly.

Figure 35:
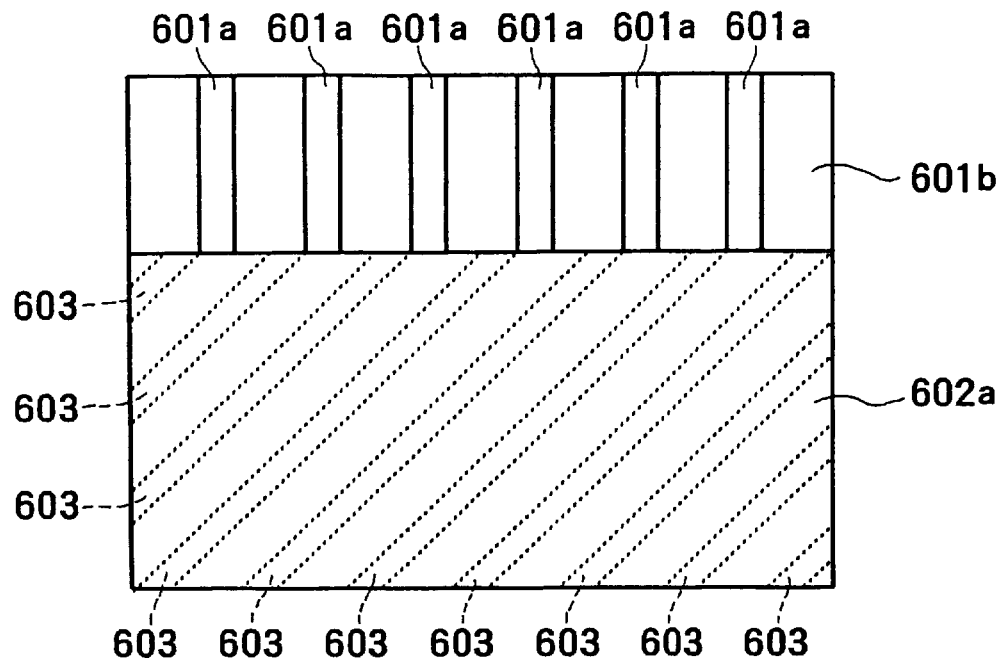
FIG. 35 is a plan view showing a first modification of the arrangement of the stirring electrodes of the fifteenth embodiment of the present invention.
Figure 36:
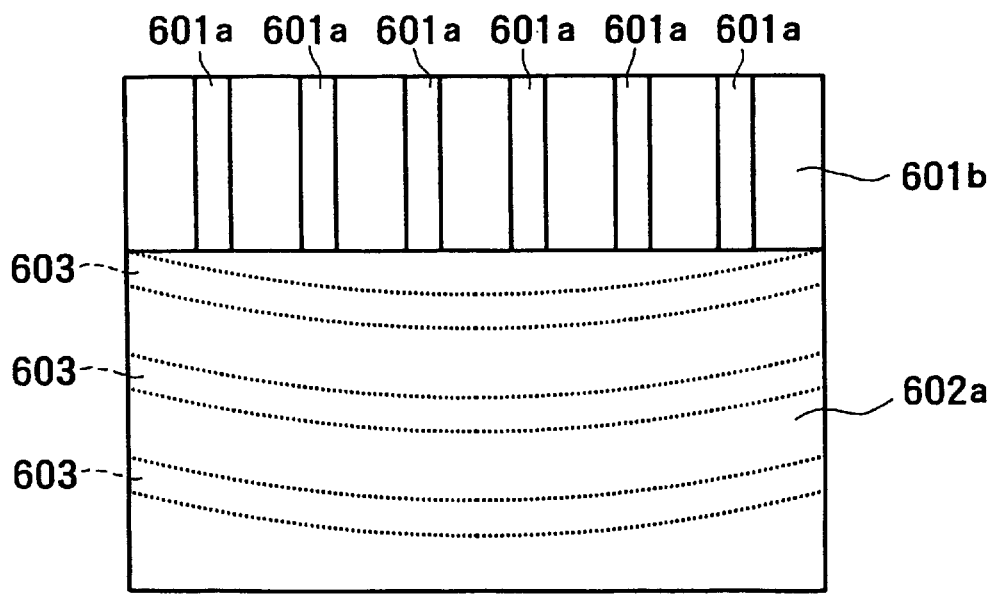
FIG. 36 is a plan view showing a second modification of the arrangement of the stirring electrodes of the fifteenth embodiment of the present invention.

In the present embodiment, although a plurality of the stirring electrodes 603 are arranged in order to stir the ink color material components in the ink holding portion 605, it is not necessarily required to match the pitch and the number of the stirring electrodes with those of the recording electrodes 601a. Further, it is unnecessary to match the arrangement directions of the electrodes between the stirring electrodes and the recording electrode. That is, even if the arrangement direction of the stirring electrodes 603 does not match that of the recording electrodes 601a, as far as a plurality of stirring electrodes 603 are arranged along the extending direction of the recording electrodes at a constant distant away from each other, the similar effect can be obtained. FIG. 35 shows an example in which the stirring electrodes 603 extend along the recording electrodes 601a obliquely; and FIG. 36 shows an example in which the stirring electrodes 603 extend as curved lines which cross the recording electrodes 601a.

Figure 37:
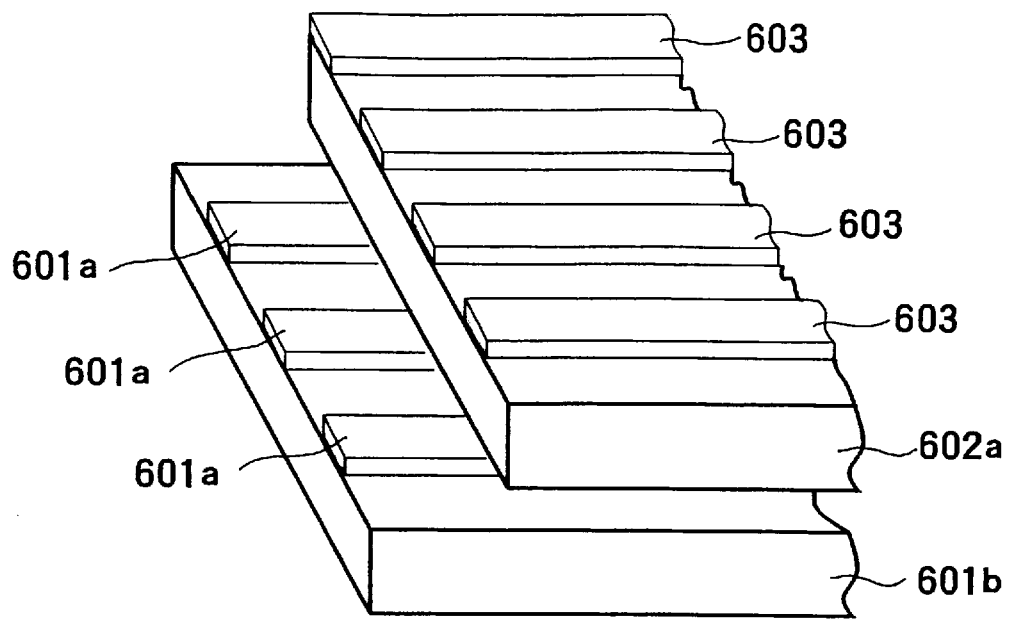
FIG. 37 is a perspective view showing a third modification of the arrangement of the stirring electrodes of the fifteenth embodiment of the present invention.

Further, in this fifteenth embodiment, although the stirring electrodes 603 are formed on the inner surface (ink side) surface of the upper substrate 602a, it is possible to form the stirring electrodes 603 on the outer surface of the upper substrate 602a, as shown in FIG. 37. In this case, since the ink 604 is not in contact with the stirring electrodes 603, it is possible to prevent the ink color material components from adhering onto the stirring electrodes 603. In this case, however, since the electric field is applied to the ink color material components via the upper substrate 602a, the influence of the electric field upon the ink color material components is low or reduced. Therefore, it is necessary to suppress the thickness of the upper substrate 602a down to about 50 μm or less, in order to obtain an electric field of a sufficient strength.

Figure 38:
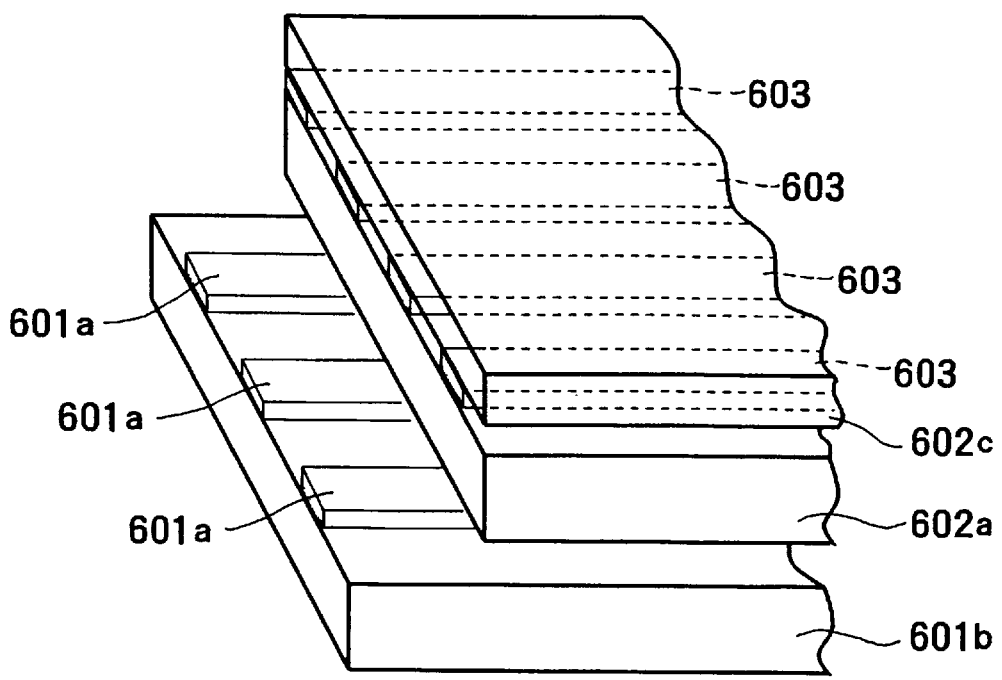
FIG. 38 is a perspective view showing a fourth modification of the arrangement of the stirring electrodes of the fifteenth embodiment of the present invention.

Further, when the thickness of the upper substrate 602a is reduced, since there exists a possibility that the mechanical strength of the upper substrate 602a is lowered, it is preferable to increase the strength of the upper substrate 602a by using a material with a high strength or by arranging another reinforcing member 602c on the stirring electrodes 603, as shown in FIG. 38.

In this connection, as the upper substrate 602a, a hard material such as silicon Si can be used, in addition to the material used for the usual flexible substrate. When Si is used as the substrate, for instance, since the stirring electrodes 603 can be formed as a thin film, it is possible to reduce the depth or height of the grooves formed by the electrodes and thereby to prevent the adhesion of the color material components. In this case, further, there exist such advantages that the electrodes of any desired patterns can be formed easily and further the mechanical strength can be also increased because Si is a hard material.

Further, in the description with reference to FIG. 34, the two continuous pulses 662a and 662b are superposed upon the DC bias voltage supplied by the stirring voltage supply 661, and the superposed voltages are applied to the stirring electrodes 603. Without being limited only thereto, it is possible to obtain the similar ink stirring effect by superposing the sine waves thereupon, instead of the continuous pulses 662a and 662b.

Further, the ink stirring means of the present invention can be arranged at any places where the ink exists. For instance, it is preferable to dispose the ink stirring means in the ink tank for supplying the ink 604, the ink flow path 607a, the ink returning (collecting) path 607b, etc, respectively.

In particular, when the apparatus is left unused for many hours, since the color material components tend to adhere, if the ink is stirred at a plurality of different places of the ink jet recording apparatus, it is possible to restore the ink 604 to the normal condition in the entire apparatus, whenever the recording operation is restarted.

(Sixteenth embodiment)

Figure 39:
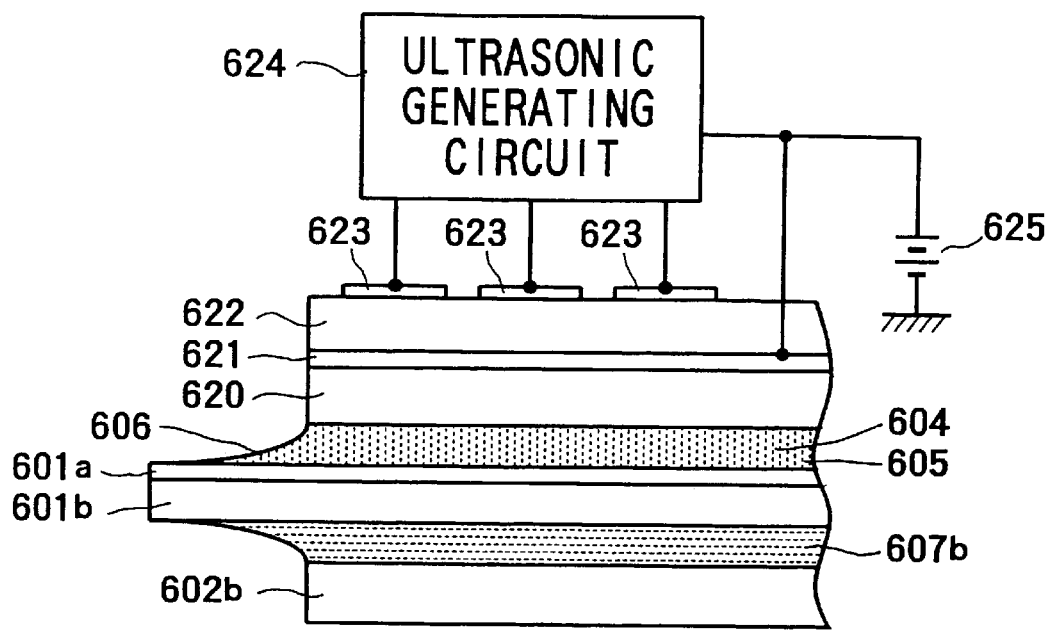
FIG. 39 is a partial enlarged cross-sectional view showing a sixteenth embodiment of the ink jet recording apparatus according to the present invention.

FIG. 39 is a partial enlarged cross-sectional view showing a sixteenth embodiment of the ink jet recording apparatus according to the present invention, in which the head top portion is enlarged.

As shown in FIG. 39, a piezoelectric crystal element 622 is mounted on the upper portion of the recording head, and further ultrasonic generating individual electrodes 623 are arranged on the upper surface of the piezoelectric crystal element 622. Further, on the lower surface of the ultrasonic generating individual electrodes 623, an ultrasonic generating common electrode 621 is arranged. In addition, There exists an ultrasonic wave interference layer 620 between the ultrasonic generating common electrode 621 and the ink holding portion 605. This sound wave interference layer 620 is a material (e.g., glass) used in common as an acoustic matching layer between the piezoelectric crystal element 622 and the ink 604.

The piezoelectric crystal element 622 is formed all over the surface or in a band shape on the common electrode 621 by use of appropriate means (e.g.. sputtering of material such as ZnO or PLZT) for controlling the thickness thereof. The ultrasonic generating individual electrodes 623 and the ultrasonic generating common electrode 621 formed on both sides of the piezoelectric crystal element 622 are connected to an ultrasonic generating circuit 624 to a bias voltage is supplied by a DC voltage supply.

The operation of the recording apparatus will be described hereinbelow.

When an ultrasonic wave is being generated, a driving signal having a frequency of several to several hundred megahertz (MHz) and a voltage of several tens to several hundreds volts (V) is applied between the ultrasonic generating individual electrodes 623 and the ultrasonic generating common electrode 621. As a result, the ultrasonic wave generated by the ultrasonic generating common electrode 621 stirs the color material components of the ink 604 in the ink holding portion 605, so that it is possible to prevent the color material components from adhering onto the other elements.

Further, in order to form an electric field for controlling the movement of the color material components between the ultrasonic generating common electrode 621 and the recording electrodes 601a, an appropriate voltage must be applied to the ultrasonic generating common electrode 621 under due consideration of the voltage applied to the recording electrodes 601a. In more detail, when the color material components are being supplied, the voltage of the ultrasonic generating common electrode 621 is set to a value higher than the average voltage of the recording electrodes 601a; and when the color material components are being returned, the voltage of the ultrasonic generating common electrode 621 is set to a value lower than the average voltage of the recording electrodes 601a. Therefore, it is necessary to supply a DC bias voltage to both the ultrasonic generating individual electrodes 623 and the ultrasonic generating common electrode 621. In this case, when the DC bias voltage of the ultrasonic generating common electrode 621 is denoted by Vub, the potential relationship must be adjusted in such a way as to satisfy the following relationship:

$$Vub \geq Vpb+Vpp \text{ (during color material supply)} \quad (3)$$

$$Vub \leq Vpb \text{ (during color material return)} \quad (4)$$

As a result, it is possible to control the movement direction of the color material components accurately. Further, without being limited only to the above-mentioned relationship as shown by (3) and (4), it is possible to adjust the voltages under due consideration of the potential difference in average voltages between the recording electrodes 601a and the ultrasonic generating common electrode 621.

When the ultrasonic wave is used as means for stirring the ink, since the ultrasonic wave can be transmitted to the ink without allowing the ink to bring into contact with the ultrasonic generating electrodes (e.g., both the ultrasonic generating common electrode 621 and the ultrasonic generating individual electrodes 623), it is possible to stir the ink 604 without adhering the ink color material components onto the electrodes.

Further, since a structural material formed by the sound wave interference layer 620, the ultrasonic generating common electrode 621, the piezoelectric crystal element 622, and the ultrasonic generating individual electrodes 623 is mounted on the upper lid of the ink holding portion 605, it is possible to increase the mechanical strength of the recording head.

Figure 40:
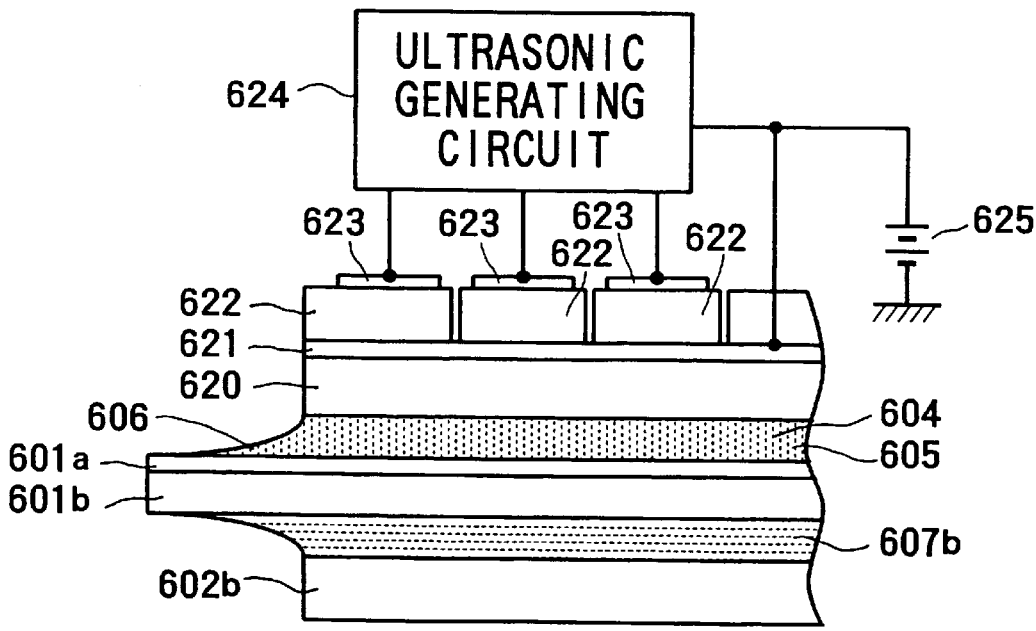
FIG. 40 is a partial enlarged cross-sectional view showing a modification of the sixteenth embodiment of the ink jet recording apparatus according to the present invention.

Further, in the ultrasonic generating means shown in FIG. 39, a single piezoelectric crystal element 622 is driven by a plurality of the ultrasonic generating individual electrodes 623 by way of example. Without being limited only thereto, it is possible to use a plurality of divided piezoelectric crystal elements 622 to stir the ink at each region more finely and securely, as shown in FIG. 40.

Further, the ultrasonic generating means of the present invention can be arranged at any places where the ink exists. For instance, it is preferable to dispose the ultrasonic generating means in the ink tank for supplying the ink 604, the ink flow path 607a, the ink returning (collecting) path 607b, etc, respectively.

In particular, when the apparatus is left unused for many hours, although the color material components tend to adhere, when the ink stirring operation is effected at a plurality of places in the recording apparatus, it is possible to restore the ink 604 to the normal condition quickly in the entire apparatus.

As described above, in the ink jet recording apparatus of the present embodiment, since the ultrasonic wave is used as the ink stirring means and thereby the ink can be stirred sufficiently without bringing the ink into contact with the stirring source, there exists such an advantage that the adhesion of the color material components onto the electrodes can be prevented perfectly, while increasing the mechanical strength of the recording head.

Further, since the ultrasonic generating sources can be disposed at a plurality of places in the recording head, the ink condition can be kept under excellent conditions at any places. Therefore, even if the apparatus is left unused for many hours, it is possible to quickly restore the ink to the normal conditions.

(Seventeenth embodiment)

Figure 41:
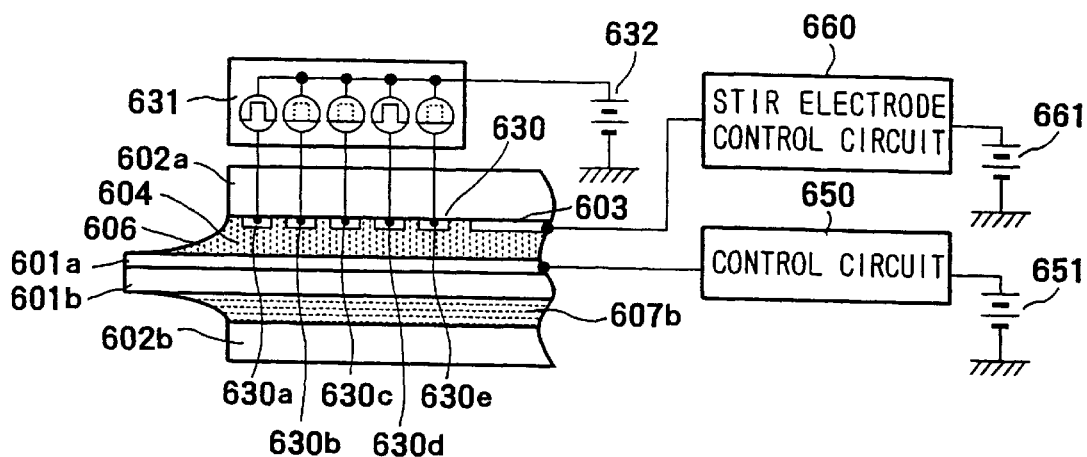
FIG. 41 is a partial enlarged cross-sectional view showing a seventeenth embodiment of the ink jet recording apparatus according to the present invention.

FIG. 41 is a partial enlarged cross-sectional view showing a seventeenth embodiment of the ink jet recording apparatus according to the present invention, in which the head end portion is enlarged.

As shown in FIG. 41, on the inner surface of the upper substrate 602a, an electrode array 630 for carrying the ink 604 is provided in a stripe shape so as to cross the recording electrodes 601a. The electrode array 630 is connected to an ink carrying driver circuit 631 to which a DC bias voltage is supplied from a DC voltage supply 632. The stirring electrodes 603 for stirring the ink are arranged in the vicinity of the electrode array 630 also in a stripe shape parallel to the recording electrodes 601a.

The operation of the ink recording head will be described hereinbelow.

Figure 42:
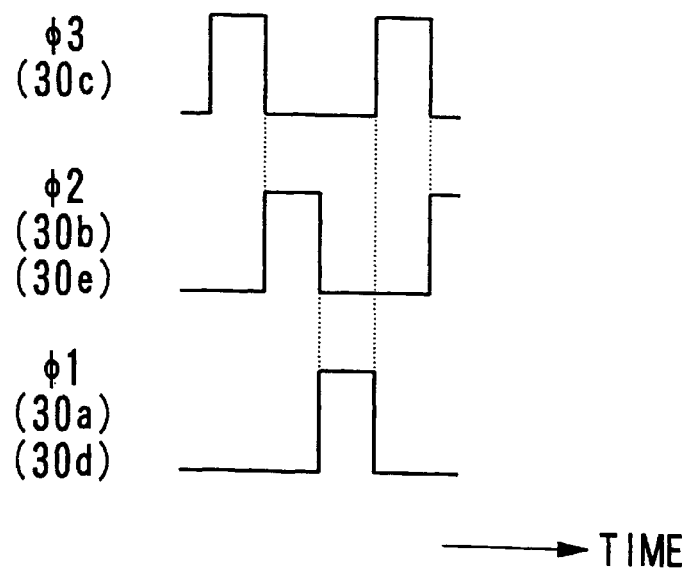
FIG. 42 is a waveform diagram for assistance in explaining the control operation of the seventeenth embodiment of the ink jet recording apparatus shown in FIG. 41.

To electrode groups 630a to 630e for constituting the electrode array 630, a DC bias voltage is supplied by the DC voltage supply 632, and further a three-phase voltage pulse train $\phi 1$, $\phi 2$, and $\phi 3$ is supplied by the carrying driver circuit 631. The phase of each of the three-phase voltage pulse train is controlled in such a way that the respective voltage application positions are shifted with the lapse of time, as shown in FIG. 42.

Here, when the ink 604 is supplied to the head end, the average voltage of the electrode array 630 is set a value higher than that of the recording electrodes 601a so that an electric field can be generated in the head end direction. Further, the phase of the three pulses is shifted as shown in FIG. 42 so that the ink color material components are moved toward the head end. Further, the average voltage of the stirring electrodes 603 arranged in the vicinity of the electrode array 630 is set a value higher than that of the electrode array 630 in order that the electrode array 630 does not prevent the movement of the color material components.

Here, when the DC bias voltage of the electrode array 630 is denoted by Vcb and the pulse amplitude is denoted by Vcp, it is possible to supply the ink securely when the these voltages are set so as to satisfy the following relationships:

$$Vpb + Vpp \leq Vcb \quad (5)$$

$$Vcb + Vcp \leq Vsb \quad (6)$$

On the other hand, the way of supplying the pulse voltages to the stirring electrodes 603 is the same as with the case of the fifteenth embodiment; that is, the stirring operation can be obtained when the potential difference between the two adjacent electrodes are reversed alternately.

Further, when the ink color material components are supplied to the head end, without being limited only to the above relationship (5) and (6), the electrodes can be driven in such a way that the following average voltage relationship can be obtained:

Recording electrodes 601*a*<Electrode array 630≦Stirring electrodes 603

In contrast with this, when the color material components are returned to the ink holding portion 605, the voltages are applied to the respective electrodes in the way opposite to the color material component supply. In more detail, the electrode groups 630*a* to 630*e* are driven in such a way that the phase relationship shown in FIG. 42 can be shifted in the opposite direction. Further, the electrodes are driven in such a way that the following average voltage relationship can be obtained Recording electrodes 601*a*>Electrode array 630≧Stirring electrodes 603

As a result, since an electric field can be generated in such a direction extending from the head end to a position away from the head end in the ink holding portion 605, the color material components can be returned smoothly.

By the way, when the ink carrying means is provided in the vicinity of the head end, the color material components can be moved in one direction in the ink holding portion 605. However, when the color material components are returned being carried continuously, since the color material components are carried away from the head end, when the color material components are supplied in the succeeding operation, since the supply distance of the color material components is lengthened, the recording start time is inevitably delayed to that extent. In addition, the possibility that the color material components adhere at the movement end increases. In contrast with this, in the present invention, since the stirring electrodes 603 are provided in the close vicinity of the electrode array 630, the color material components carried to the electrode array 630 can be stopped by the stirring electrodes 603, so that the succeeding ink supply can be started quickly. Further, since the color material components are always being stirred, the color material components will not adhere onto the electrodes. Further, in the above-mentioned driving method, the color material components can be carried quickly without obstructing the movement direction thereof.

Further, in the above description, although the stirring electrodes 603 are used for stirring the ink, the same effect can be of course obtained when the ink stirring electrodes are replaced with the ultrasonic generating means. In other words, when the relationship between the electrode array 630 and the stirring electrodes 630 is replaced with the relationship between the electrode array 630 and the ultrasonic generating common electrode 621, the similar control method can be achieved.

As described above, in the present embodiment, since the stirring means is disposed in the vicinity of the ink carrying means, there exists such an effect that the ink movement position can be determined, while preventing the color material components from adhering at the movement end.

(Eighteenth embodiment)

Figure 43:
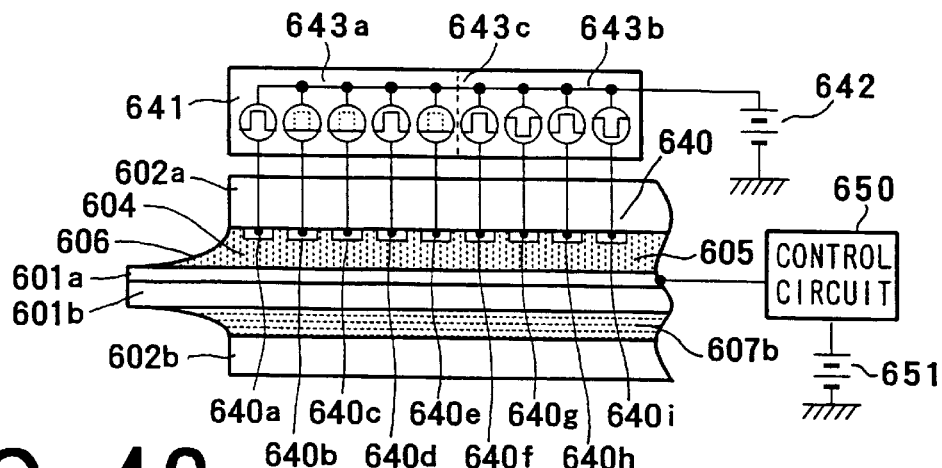
FIG. 43 is a partial enlarged cross-sectional view showing an eighteenth embodiment of the ink jet recording apparatus according to the present invention.

FIG. 43 is a partial enlarged cross-sectional view showing an eighteenth embodiment of the ink jet recording apparatus according to the present invention, in which the head end portion is enlarged.

As shown in FIG. 43, on the inner side surface of the upper substrate 602*a*, a plurality of common function electrodes 640 having both the ink carrying function and the ink stirring function are formed in a stripe shape so as to cross the recording electrodes 601*a*. These common function electrodes 640 are controlled by a common function electrode control circuit 641 to which a DC bias voltage is supplied from the a DC voltage supply 642.

In the example shown in FIG. 43, the common function electrodes 640 arranged in the ink movement region 643*a* are assigned to the moving electrode groups 640*a* to 640*e*, and the common function electrodes 640 arranged in the ink stirring region 643*b* are assigned to the stirring electrode groups 640*f* to 640*i*. Of course, the function boundary region 641*c* between the ink moving region 643*a* and the ink stirring region 643*b* can be shifted freely by the common function electrode control circuit 641.

As described above, in the ink carrying region 643*a* where the common function electrodes 640 are assigned to the moving electrode groups 640*a* to 640*e*, the ink 604 in the ink holding portion 605 is supplied or returned in accordance with the driving method as shown by FIG. 42.

On the other hand, in the ink stirring region 643*b* where the common function electrodes 640 are assigned to the stirring electrode groups 640*f* to 640*i*, the ink 604 in the ink holding portion 605 is stirred and prevented from adhesion in accordance with the driving method as shown by FIG. 34.

Further, although the potential relationship between the ink movement region 643*a* and the ink stirring region 643*b* is basically the same as with the case of the seventeenth embodiment, since the DC bias is used in common by the DC voltage supply 642, in practice, the amplitudes of the respective pulses are adjusted by the common function electrode control circuit 641.

Figure 44A:
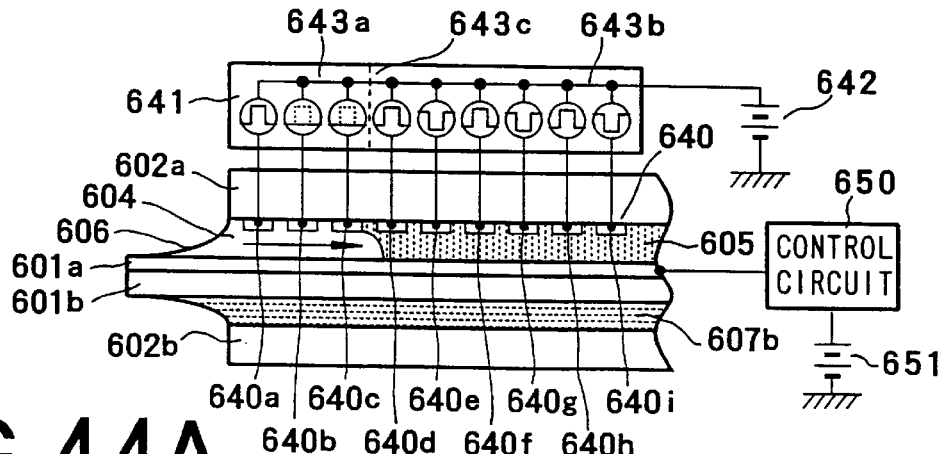
FIGS. 44A and 44B are partial enlarged cross-sectional views for assistance in explaining two examples of the control status of the eighteenth embodiment of the ink jet recording apparatus according to the present invention.

Further, the function boundary region 643*c* between the ink movement region 643*a* and the ink stirring region 643*b* is changed as follows:

For instance, in the color material components returning operation, when a short time is stopped between the one-sheet recording end and the succeeding-sheet recording start, the function boundary region 643*c* is moved to a position near the head end as shown in FIG. 44A. As a result, since the ink movement region 643*a* can be narrowed, the movement distance for returning the color material can be shortened, so that the time required to supply the color material components to the sheet during the succeeding recording can be shortened, with the result that the recording operation begins quickly.

Figure 44B:
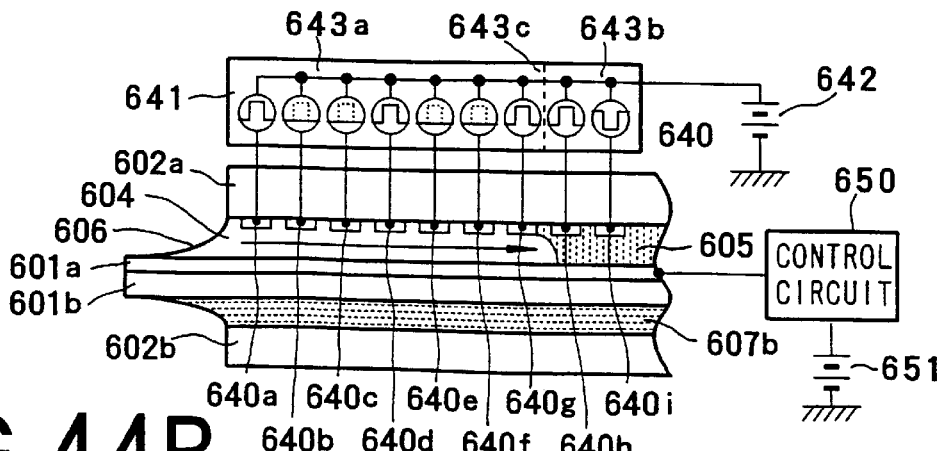

On the other hand, when kept stopped for many hours, the function boundary region 643*c* is moved to a position far away from the head end as shown in FIG. 44B, to widen the ink moving region 643*a* sufficiently. As a result, since the color material components can be returned to a position sufficiently far away from the head end, it is possible to effectively prevent the color material components from adhering onto the head end.

As described above, since the common function electrodes 640 are divided into the moving electrode groups 640*a* to 640*e* and the stirring electrode groups 640*f* to 640*i* at the ink moving region 643*a* and the ink stirring region 643*b*, respectively, the manufacturing of the electrodes can be facilitated. In addition, since any desired functions can be assigned to any electrodes by controlling the common function electrode control circuit 641, the recording apparatus can be controlled under optimum conditions and further the flexibility of the recording apparatus can be increased, so that it is possible to realize an ink jet recording apparatus of high-efficiency and high-reliability.

As described above, in the present embodiment, when the electric field is used as the stirring means, since the ink moving function and the ink stirring function can be both realized by the common electrodes, there exist such advantages that the apparatus construction can be simplified, and various controls can be made according to the situation by changing the boundary between the movement function portion and the stirring function portion.

(Nineteenth embodiment)

Figure 45:
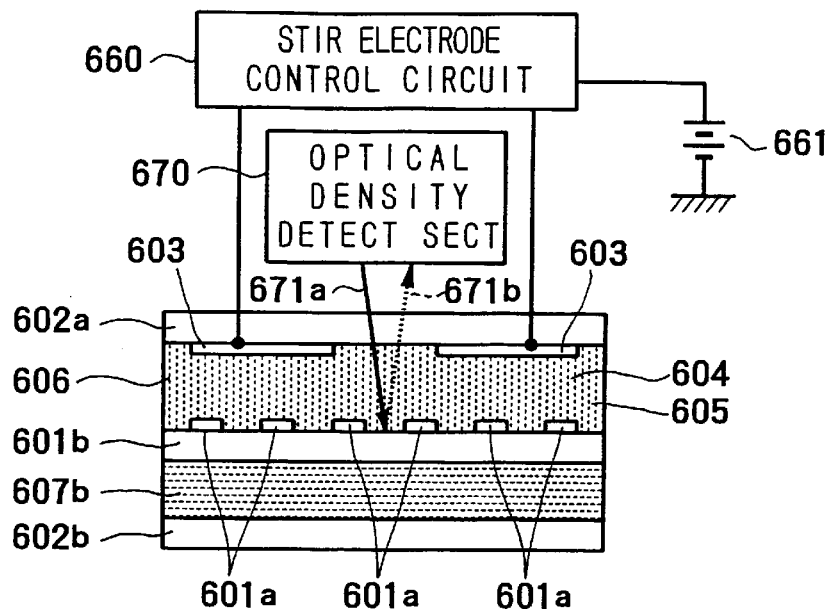
FIG. 45 is a partial enlarged cross-sectional view showing a nineteenth embodiment of the ink jet recording apparatus according to the present invention.

FIG. 45 is a partial enlarged cross-sectional view showing a nineteenth embodiment of the ink jet recording apparatus according to the present invention, in which the head end portion is enlarged and seen from the front side thereof.

As shown in FIG. 45, the upper substrate 602a is formed of a light transmissive material such as glass, and further an optical density detecting section 670 composed of light emitting elements and light receiving elements is arranged on the upper substrate 602a. The optical density detecting section 670 is connected to the stirring electrode control circuit 660 for controlling the stirring electrodes 603.

In the construction as described above, the light emitted by the optical density detecting section 670 is introduced into the ink holding portion 605 through the upper substrate 602a; that is, into the ink 604 as an incident light 671a. The incident light 671a is then reflected from the head substrate 601b as the light 671b reflected into the ink 604, and returned to the optical density detecting section 670 passing through the upper substrata 602a again.

The color material components tend to adhere onto the stirring electrodes 603 of the upper substrate 602a and onto the recording electrodes 601a of the head substrate 601b. As a result, once the color material components adhere, the light transmissibility drops markedly in the upper substrate 602a, and the light reflectivity drops markedly in the head substrate 601b. In other words, the optical density detecting section 670 can detect the degree of the color material components adhesion on the basis of the intensity of the reflected light 660. The detected results are feed-backed to the stirring electrode control circuit 660, so that it is possible to control the stirring operation according to the inside situation of the ink holding section 605.

The stirring operation by the stirring electrodes 602 is effected basically to prevent the color material components from adhering onto other parts. Therefore, as far as the color material components are not adhered, this stirring operation is not required. Therefore, for each predetermined time or after a predetermined number of papers have been recorded or before the recording apparatus has been started after a long time disuse, only when the adhesion of the color material components is detected in the ink holding portion 605 by use of the optical density detecting section 670, the pulses are supplied to the stirring electrodes 603 from the stirring electrode control circuit 660. By doing this, it is possible to reduce the load of the stirring electrode control circuit 660.

Further, since the optical density detecting section 670 can detect the color material adhesion situation on the basis of the intensity of the reflected light 671b, the stirring electrode control circuit 660 can execute an optimum stirring control on the basis of the signals detected by the optical density detecting section 670.

In other words, even if the stirring control conditions of the stirring electrodes 603 are determined the same, that is, even if the stirring electrodes 603 are controlled by the constant bias voltage, pulse width and pulse amplitude, this determined stirring operation is not necessarily suitable for various color material component adhesion situation. However, since the bias potential relationship between the recording electrodes 601a and the other control electrodes or the combination of these functions can be changed according to the stirring control situation, it is possible to obtained an optimum control conditions according to the color material component adhesion situation.

Therefore, the effective stirring operation can be achieved by changing the parameters for executing the stirring operation by use of the stirring electrodes on the basis of the feedback signals applied from the optical density detecting section 670, and further by repeating the parameter optimizing control loop.

Figure 46:
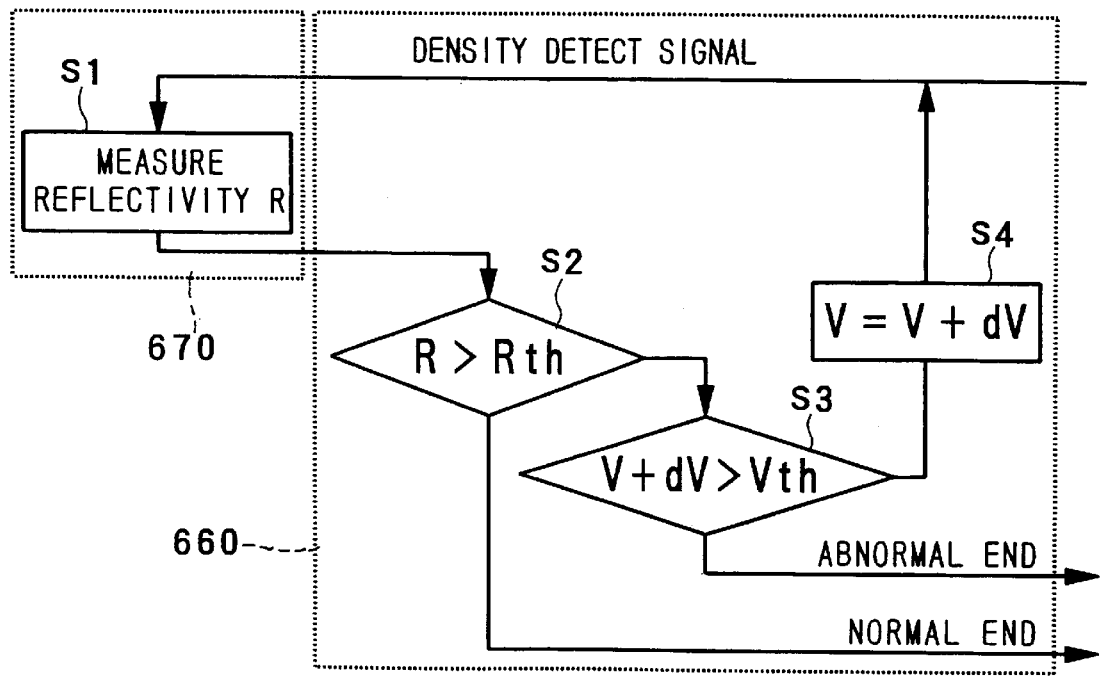
FIG. 46 is a flowchart of the control system applied to the nineteenth embodiment of the ink jet recording apparatus according to the present invention.

For instance, the optimum control can be executed by increasing the potential difference between the stirring electrodes 603 gradually, while monitoring the color material component adhesion situation, in accordance with a flowchart as shown in FIG. 46.

In FIG. 46, when a density detection signal is applied from the stirring electrode control circuit 660 to the optical density detecting section 670, the optical density detecting section 670 starts to emit light into the ink holding portion 605 to measure the intensity of the reflected light, that is, the reflection rate (R) (in step S1). This detected reflection rate R is feed-backed to the stirring electrode control circuit 660.

A threshold value Rth of the reflection rate is set to the stirring electrode control circuit 660 in order to decide the presence or absence of color material component adhesion. Therefore, the detected reflection rate R is checked as to whether larger than the threshold value Rth or not (in step S2). If the refection rate R is larger than the threshold value Rth, the absence of the color material component adhesion is decided, ending the procedure.

In contrast with this, if the refection rate R is smaller than the threshold value Rth, the presence of the color material component adhesion is decided, the control operation proceeds to a loop for correcting the stirring conditions. In this routine, a voltage increment dV is added to the potential difference between the current stirring electrodes, (e.g., the pulse amplitude V). In this case, first in step S3, the pulse amplitude V to which the increment dV is added is checked as to whether exceeds a threshold voltage value Vth. Here, although the threshold voltage value Vth is determined as the maximum voltage applicable between the stirring electrodes 603, in practice, this threshold value Vth is set to a voltage lower than the insulation breakdown voltage of air or an insulating substance between the electrodes or the maximum voltage limited by the control circuit.

Further, when the newly set voltage (V+Vth) exceeds the threshold voltage value Vth, since this indicates that the potential difference cannot be increased more, the control processing is ended, while outputting a signal indicative of an abnormal end to the outside.

In contrast with this, when the newly set voltage (V+Vth) is lower than the threshold voltage value Vth, in step S4, the voltage V is corrected to the voltage (V+dV). And the stirring electrodes 603 are controlled by the corrected voltage.

While performing the stirring operation under the new conditions, the stirring electrode control circuit 660 transmits again the density detection signal to the optical density detecting section 670, to confirm the color material component adhesion situation under the corrected conditions. In the same way as the routine as shown in FIG. 46, when the color material component adhesion is absent, the current routine ends normally. When the color material component adhesion is present, the control operation further enters the routine for correcting the stirring condition again.

As described above, since the stirring operation can be made while observing the color material component adhesion under the optimum stirring conditions, it is possible to stir the ink accurately at a high reliability. Further, the feedback control can be made at any times, even when the stirring operation is effected at all times or when the stirring operation is made at need.

For instance, when the stirring operation is effected at all time, the control operation is such that: the stirring pulse voltages are always applied from the stirring electrode control circuit 660 to the stirring electrodes for a continuous stirring operation; the color material component adhesion situation in the ink holding section 605 is confirmed by the optical density detecting section 670; once the color material components adheres, the adhered color material components are removed by changing the stirring conditions; after the color material component adhesion has been removed, and the normal stirring operation is resumed by applying the normal stirring voltage. As a result, it is possible to obtain the stirring operation under the optimum adhered color material component removal conditions at all times, that is, a highly reliable control can be obtained.

On the other hand, when the stirring operation is made at need, the ink situation in the ink holding portion 605 is always confirmed by the optical density detecting section 670. When the adhesion of the color material components is confirmed, an initial voltage pulse is applied to the stirring electrodes 603 from the stirring electrode control circuit 660 for staring the stirring operation. The stirring operation is maintained by searching the optimum conditions, until the color material component adhesion cannot be observed.

With respect to the feedback control of the optical density detecting section 670, various methods can be considered. In any method, however, since the stirring operation can be made by observing the actual color material component adhesion situation and further by changing the control conditions according to the actual situation, it is possible to increase the reliability of the stirring operation and to maintain the ink situation under excellent conditions at all times.

Further, when the stirring electrodes 603 are formed of a transparent material, since the optical density detecting section 670 can be disposed at various positions and further the color material component adhesion situation onto the stirring electrodes 603 can be monitored, the reliability of the stirring operation can be further increased.

Figure 47:
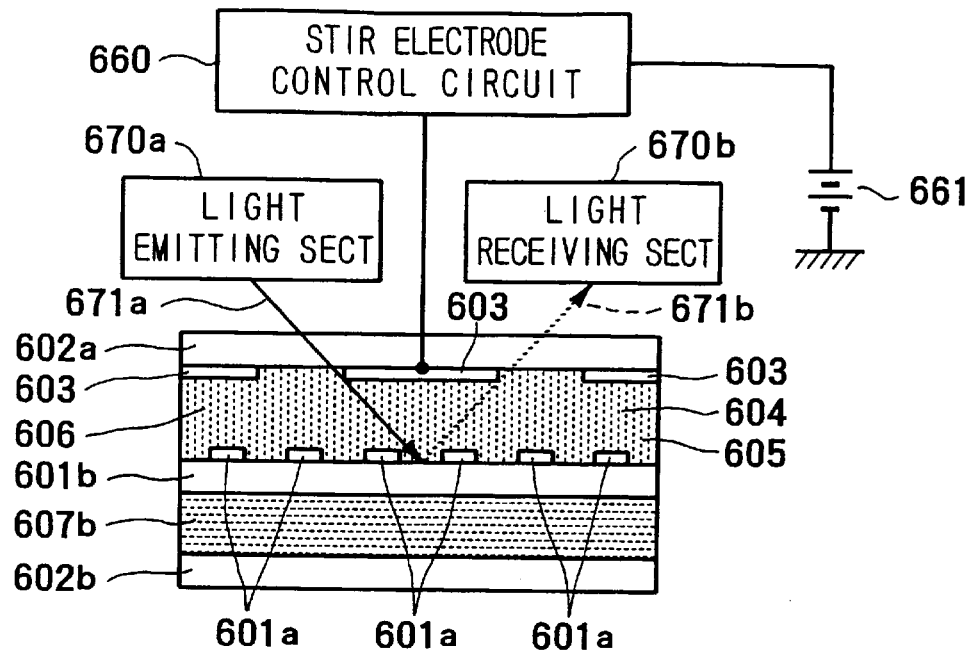
FIG. 47 is a partial enlarged cross-sectional view showing a modification of the nineteenth embodiment of the ink jet recording apparatus shown in FIG. 45.

Further, in the construction shown in FIG. 45, although the optical density detecting section 670 is constructed in such a way that the color material component adhesion situation can be observed by emitting the incident light 671a from the optical density detecting section 670 through a gap between the two stirring electrodes 603 and further by receiving the reflected light 671b through the same gap, it is possible to dispose the light emitting section 670a and the light receiving section 670b at two different positions so as to form a passage of the incident light 671a and the reflected light 671b separately in the ink holding portion 605, as shown in FIG. 47. In this case, since the incident light 671a of the optical density detecting section 670 is emitted through a gap between the two stirring electrodes 603 and the reflected light 771b is received through another gap between the two stirring electrodes 603. Therefore, since the light can be passed just under the stirring electrode, it is possible to observe the color material component adhesion situation just under the stirring electrodes 603.

Further, in FIG. 47, although the light emitting section 670a and the light receiving section 670b are shown separately, it is of course possible to combine these two sections as a single unit.

Further, in the present embodiment, although the ink 603 is stirred by the stirring electrodes 603 in the ink holding portion 605, even if the stirring means of ultrasonic waves is used, the same effect can be obtained. In the case of the ultrasonic wave stirring means, however, since many substances which do not transmit light (e.g., piezoelectric crystal element) are often used, a special consideration must be made to form the optical paths of the incident light 671a and the reflected light 771b. Basically, however, it is possible to overcome this problem by considering the shapes of the piezoelectric crystal element or by forming a light passing hole in the piezoelectric crystal element, in order to secure the light path, together with the change of the electrodes into a transparent film.

Further, in the above-mentioned embodiment, although the optical density detecting section 670 is disposed at only a single place, it is also preferable to dispose the detecting sections at plural places. In this case, since the color material stirring situations can be observed separately at various portions, it is possible to operate or control the stirring means at only a specific place, without changing the stirring conditions all over the ink head.

As described above, in the present embodiment, since the optical density detecting means is provided in the vicinity of the stirring means, the stirring means can be controlled on the basis of the detected density, so that there exists such an effect that: the ink situation in the ink holding portion can be not only always maintained under excellent conditions by observing the color material stirring conditions in the ink holding portion and by feed-backing the observed result to the stirring control section; but also the optimum stirring control can be realized according to the apparatus conditions. Further, when the optical density detecting means are provided at plural positions, since the ink stirring conditions can be detected in a wide range, the stirring operation can be controlled under the optimum conditions at plural places, respectively, so that the overall performance of the apparatus can be maintained. Further, when the transparent electrodes are adopted, since the places to which the optical density detection can be applied are widened, it is possible to further increase the apparatus performance.

(Twentieth embodiment)

Figure 48:
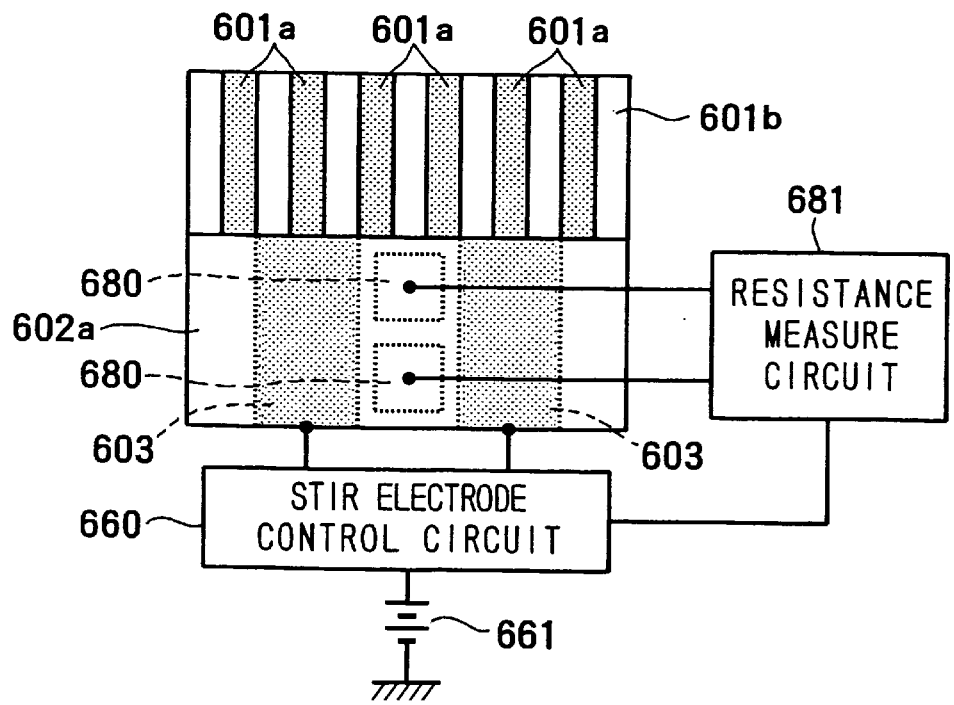
FIG. 48 is a partial enlarged plan view showing a twentieth embodiment of the ink jet recording apparatus according to the present invention.

FIG. 48 is a partial plan view showing a twentieth embodiment of the ink jet recording apparatus according to the present invention, in which the head end is seen from above.

As shown in FIG. 48, on the inner side of the upper substrate 602a, a pair of density detecting electrodes 680 are provided in the vicinity of the stirring electrodes 603. The density detecting electrodes 680 are connected to a resistance measuring circuit 681 to measure the resistance between the electrodes. This resistance measuring circuit 681 is connected to the stirring electrode control circuit 660.

In the construction as described above, the density detecting electrodes 680 is provided with such a function as to detect the ink color material component density in the ink holding portion 605 on the basis of the resistance value thereof. The detected results are feed-backed to the stirring electrode control circuit 660 to control the stirring operation.

Now, as the ink used in the ink holding portion, the volumetric resistivity of the solvent is about $10^8 \Omega$ cm and the volumetric resistivity of the color material components is about $10^{13} \Omega$ cm. When the ink as described above is used, the ink resistance increases with increasing density of the color material components, but decreases with decreasing density of the color material components. Therefore, since the ink resistance increases under the situation that the color material components adhere, as compared with the situation that no color material components adhere, it is possible to confirm the ink adherence situation on the basis of the ink resistance.

In contrast with this, when such ink that the ink resistance decreases under the situation that the color material components adhere is used, the ink is stirred when a decrease in the ink resistance is detected.

In other words, it is possible to confirm the ink stirring conditions by detecting the resistance value between the two density detecting electrodes 680 by the resistance measuring circuit 681, and the detected value is feed-backed to the stirring electrode control circuit 660 to control the ink stirring operation.

Further, the way of controlling the stirring electrode control circuit 660 on the basis of the signals feed-backed by the resistance measuring circuit 681 is quite the same as with the case of the nineteenth embodiment, and thereby the same effect as with the nineteenth embodiment can be obtained.

Further, in the method of measuring the ink density by using the density detecting electrodes 680 and the resistance measuring circuit 681, since a large space is not required and the density detecting electrodes 680 can be arranged at any places freely, as compared with the case where light is used, this method is not only suitable for reducing the size of the apparatus, but also the degree of design freedom can be increased. Further, when the stirring electrodes are used as the stirring means, it is also possible to construct the stirring electrodes 603 and the density detecting electrodes 680 in common and to use both electrodes by switching the two appropriately for alternate use. In this case, since no additional space is required for the density detection and further since the density detection position can be determined freely, it is possible to increase the degree of control freedom markedly.

In the present invention, although the change of the ink density is detected on the basis of the change of the resistance value, it is possible to obtain the similar effect by detecting the change of the electrostatic capacity. The basic construction thereof is basically the same as with the case shown in FIG. 48, in which the resistance measuring circuit is replaced with an electrostatic capacity measuring circuit. In this case, since the electrostatic capacity can be measured at a high precision, it is possible to obtain accurate data related to the ink density.

As described above, in the present embodiment, since a pair of density detecting electrodes 680 are used as the density detecting means in order to detect the stirring conditions on the basis of the resistance value between the two electrodes, the ink condition can be detected accurately without increasing the size of the ink jet recording apparatus. In particular, when the stirring electrodes are used in common, since the structure can be simplified, there exists such an effect that the apparatus can be constructed advantageously from the design and manufacturing standpoints. Further, since the ink density can be detected at any places, it is possible to increase the ink stirring controllability markedly.

Further, in the ink jet recording apparatus according to the present invention, although the respective embodiments have been described separately, it is of course possible to use one of these embodiments or to combine any ones of these embodiments freely.

As described above, to achieve the first object, in the ink jet recording apparatus for cohering and jetting the color material components contained in ink on the basis of electrostatic force, it is possible to uniformalize the density of the color material components at each electrode on the head substrate and further to prevent the color material components from adhering onto the electrodes, with the result that a stable recording can be achieved.

As described above, to achieve the second object, in the ink jet recording apparatus for cohering the color material components charged to a predetermined polarity and contained in ink by electrostatic force and then jetting the cohered color material components from the desired electrodes toward the recording paper to record an image, it is possible to prevent the charged color material components from being scattered from the ink drop jetting positions, so that a stable recording can be achieved without causing non-uniformity of the ink density.

As described above, to achieve the third object, in the ink jet recording apparatus, the color material components contained in the ink are moved by electrostatic force generated by the stripe-shaped electrodes mounted on the head substrate to circulate the ink to the ink supply position located below the ink drop jetting position on the head substrate; the slit-shaped nozzle is formed by the head substrate and the nozzle shaping surface so as to extend in the arrangement direction of the electrodes between the ink supply position and the ink drop jetting position; and the ink is moved by the capillary action of the slit-shaped nozzle to jet the ink toward the recording medium. Therefore, it is possible to form a thin ink layer having a stable thickness without being subjected to the influence of the ink pressure and the atmospheric pressure in such a way that the ink can be supplied on the head substrate to the ink jetting position by the ink circulating system, without causing nozzle clogging as with the case where individual nozzles are used, with the result that the ink drop jetting operation can be stabilized and thereby a high quality recording can be made.

As described above, to achieve the fourth object, in the ink jet recording apparatus according to the present invention, since the ink can be stirred appropriately in the ink holding portion, it is possible to prevent the ink color material component from adhering onto the inner portion of the recording head, so that a high reliable ink management can be achieved. Further, since the non-discharge (jetting) or mal-discharge (mal-jetting) of the ink can be prevented, it is possible to shorten the time required for the ink discharge or jetting in particular at the initial stage of the ink jet recording, so that a stable recording operation can be obtained.

What is claimed is:

1. An ink jet recording apparatus for recording an image by jetting ink including at least color material components onto a recording medium on the basis of electrostatic force applied to the color material components dispersed in a solvent and charged to a given polarity, said ink jet recording apparatus comprising:

a first electrode arranged at a position where said ink is supplied and configured to jet the ink in accordance with an inputted image signal;

a second electrode arranged at a position where said ink is supplied and adjacent to said first electrode; and a voltage applying circuit configured to apply voltage to said first and second electrodes in such a way that a first potential difference between said first electrode and the recording medium is lower than a second potential difference between said second electrode and the recording medium.

2. The ink jet recording apparatus according to claim 1, wherein:

said first and second electrodes are disposed on a head substrate to form part of an array of electrodes; and said voltage applying circuit is arranged to apply voltage to said array of electrodes in such a way that the first potential difference is lower than the second potential difference.

3. The ink jet recording apparatus according to claim 1, wherein:

in a given cycle, said voltage applying circuit selects said first electrode from even-numbered or odd-numbered electrodes of said array of electrodes and selects said second electrode from odd-numbered or even-numbered electrodes of said array of electrodes adjacent to said selected first electrode; and in a cycle just after said given cycle, said voltage applying circuit selects said first electrode from odd-numbered or even-numbered electrodes of said array of electrodes and selects said second electrode from even-numbered or odd-numbered electrodes of said array of electrodes adjacent to said selected first electrode.

4. The ink jet recording apparatus according to claim 1 further comprising a plate-shaped common electrode disposed opposite to said array of electrodes and substantially in parallel to said head substrate, wherein said voltage applying circuit applies voltage to said array of electrodes and said common electrode in such a way that the first potential difference is lower than the second potential difference.

5. The ink jet recording apparatus according to claim 1, wherein said voltage applying circuit applies voltage to said array of electrodes in such a way that the first potential difference is within a range in which the ink is not jetted except in a period in which the ink is expected to be jetted.

6. The ink jet recording apparatus according to claim 4, wherein said voltage applying circuit applies voltage to said array of electrodes in such a way that the first potential difference reaches a range to jet the ink after a period in which the first potential difference is within the range not to jet the ink.

7. An inkjet recording method for recording an image by jetting ink including at least color material components onto a recording medium on the basis of electrostatic force applied to the color material components dispersed in a solvent and charged to a given polarity, said ink jet recording method comprising the steps of:

applying, by a voltage applying circuit, a first voltage to a first electrode arranged at a position where said ink is supplied, said first voltage being in accordance with an inputted image signal;

applying, by said voltage applying circuit, a second voltage to a second electrode arranged adjacent to said first electrode; and setting a first potential difference between said first voltage and the recording medium so as to be lower than a second potential difference between said second voltage and the recording medium.

8. The ink jet recording method according to claim 6, wherein:

said first and second electrodes are disposed on a head substrate to form part of an array of electrodes;

said ink is supplied to said head substrate;

said voltage applying circuit applies voltage to said array of electrodes in such a way that said first potential difference is lower than said second potential difference.

9. The ink jet recording method according to claim 7, wherein, in a given cycle, said voltage applying circuit applies voltage to an even-numbered or odd-numbered electrode of said array of electrodes and an odd-numbered or even-numbered electrode of said array of electrodes as said first and second electrodes, and in a cycle just after said given cycle, said voltage applying circuit applies voltage to an odd-numbered or even-numbered electrode of said array of electrodes and an even-numbered or odd-numbered electrode of said array of electrodes as said first and second electrodes.

10. The ink jet recording method according to claim 7, wherein said voltage applying circuit applies voltage to said array of electrodes and a plate-shaped common electrode disposed opposite to said electrode array and substantially in parallel to said head substrate in such a way that said first potential difference is lower than said second potential difference.

11. The ink jet recording method according to claim 7, herein said voltage applying circuit applies voltage to said array of electrodes in such a way that the first potential difference is in a range in which the ink is not jetted except in a period in which the ink is expected to be jetted.

12. The ink jet recording method according to claim 7, wherein said voltage applying circuit applies voltage to said array of electrodes in such a way that the first potential difference reaches a range to jet the ink after a period in which the first potential, difference is within the range not to jet the ink.

* * * * *